US005572214A

United States Patent [19]

Ringel

[11] Patent Number: 5,572,214

[45] Date of Patent: Nov. 5, 1996

[54] APPARATUS AND METHOD FOR FREQUENCY SPACE MODELING

[75] Inventor: Emanuel I. Ringel, Fort Washington, Pa.

[73] Assignee: Unisys Corporation, Blue Bell, Pa.

[21] Appl. No.: 433,650

[22] Filed: May 4, 1995

[51] Int. Cl.[6] ..... G01S 13/91

[52] U.S. Cl. ..... 342/169; 342/37

[58] Field of Search ..... 342/169, 170, 342/171, 172, 30, 32, 37, 40, 44

[56] References Cited

U.S. PATENT DOCUMENTS

| | | | |
|---|---|---|---|
| 4,945,550 | 7/1990 | Krause et al. | 375/94 |
| 5,387,915 | 2/1995 | Moussa et al. | 342/40 |
| 5,432,517 | 7/1995 | Billaud et al. | 342/40 |
| 5,459,469 | 10/1995 | Schuchman et al. | 342/37 |

OTHER PUBLICATIONS

G. Knittel and V. Orlando, "ADS–Mode S", 38th Annual Air Traffic Control Association Proceedings, pp. 230–236, ATCA.

*Primary Examiner*—Michael J. Carone
*Assistant Examiner*—Christopher K. Montgomery
*Attorney, Agent, or Firm*—Joan B. Sowell, Att.; Mark T. Starr; Thomas J. Scott

[57] ABSTRACT

This is a computer-implemented model for the frequency space utilized by the Mode Select Beacon System (the Mode S system) for air traffic surveillance and control. The model simulates the operation of interrogators, transponders, and receivers, and calculates the probability of interference between transponder reply signals using a sliding window.

4 Claims, 36 Drawing Sheets

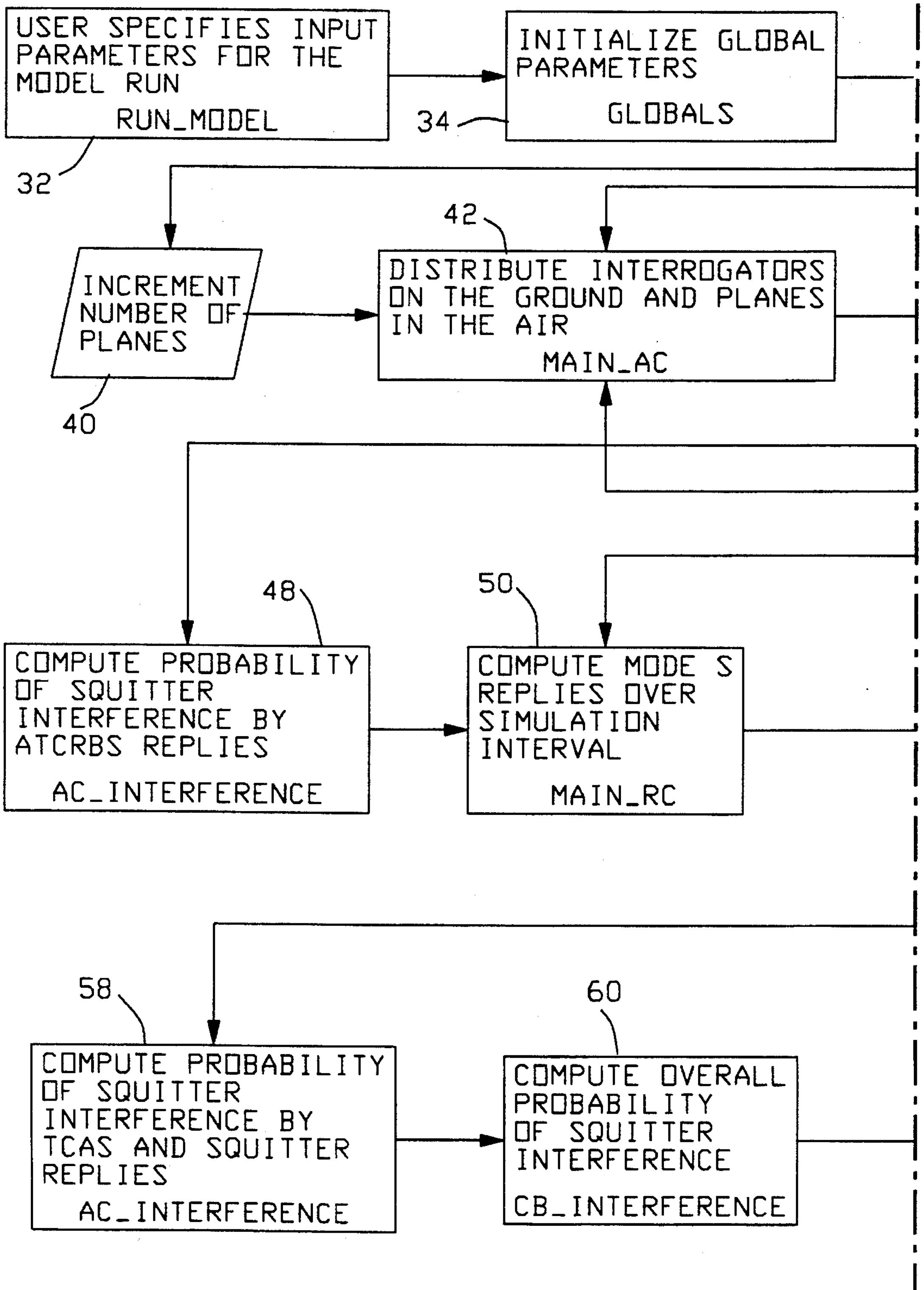
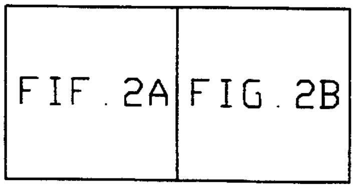
FIG. 2
FIG2A

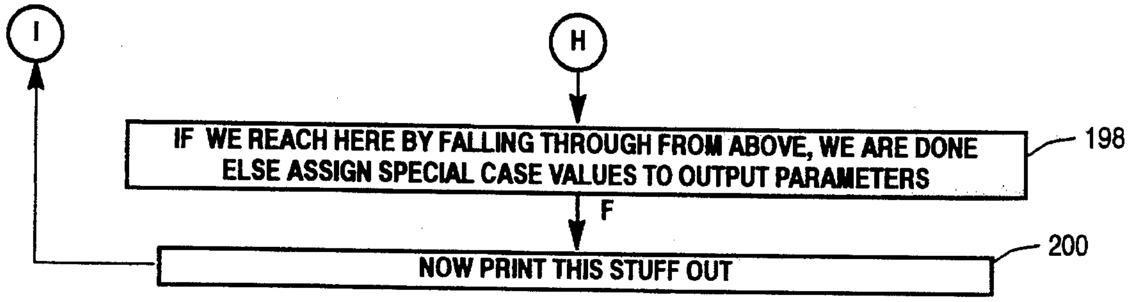
*Figure 4D*
*Figure 4*
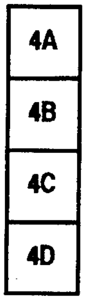

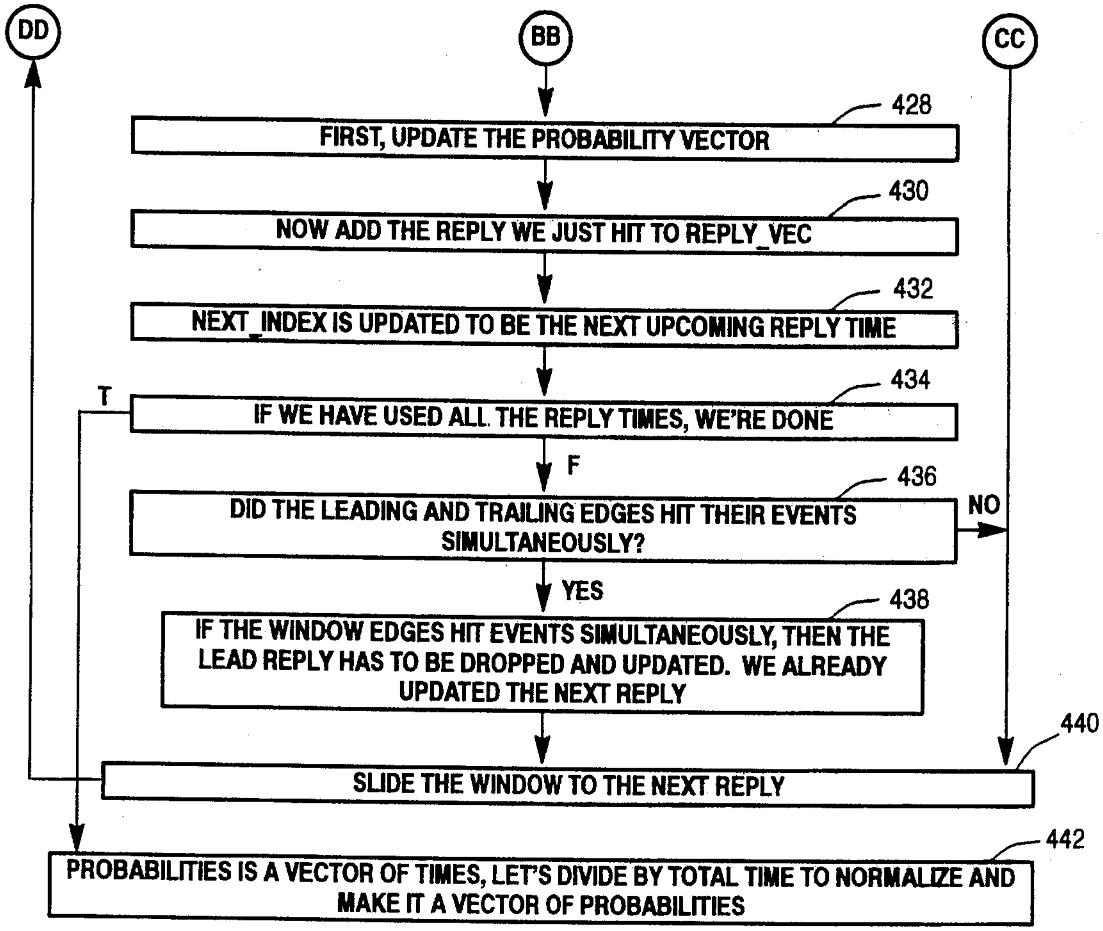
Figure 9C
Figure 9
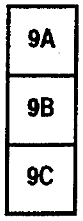

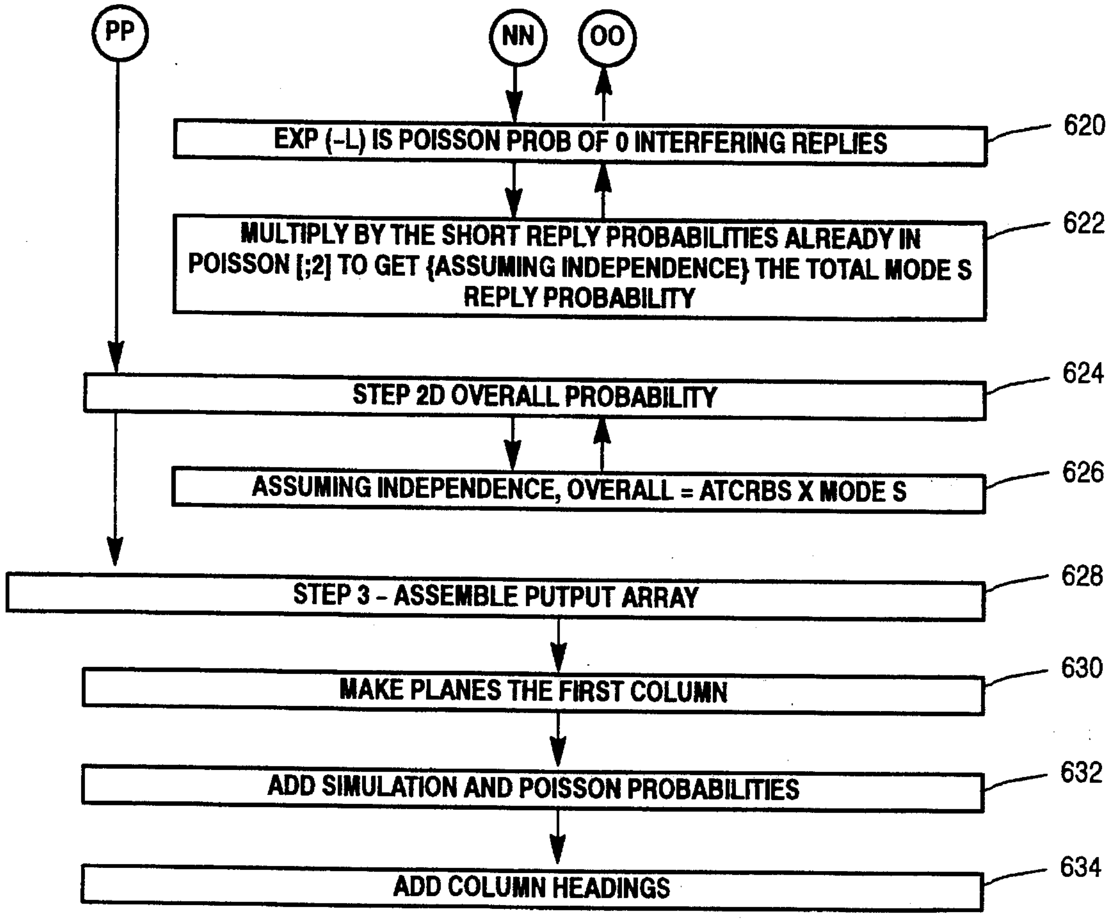
*Figure 13B*
*Figure 13*
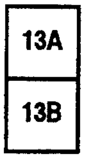

APPARATUS AND METHOD FOR FREQUENCY SPACE MODELING

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

The present invention relates to predicting or estimating and testing, and more particularly to signal testing and verification. The present invention also relates to positional tracking, and more particularly to signals for same. The present invention further relates to communications, and more particularly to signals for same.

BACKGROUND OF THE INVENTION

The Mode Select Beacon System (the Mode S system) is a secondary surveillance radar system using monopulse technology to provide higher positional accuracy than the current Air Traffic Control Radar Beacon Systems (ATCRBS). Mode S also provides discrete addressing and a bidirectional digital data link.

The Mode Select Beacon System (Mode S) is a radar beacon air traffic control system, in which coded radar pulses are sent from radar antennas on the ground and received by beacon transponders mounted in aircraft; these beacons then send coded response pulses back to the ground stations, for the purpose of aircraft tracking and communications. These same beacon transponders can also be used to send coded pulses to beacon transponders in other aircraft (air to air, as opposed to air to ground), for the purpose of aircraft collision avoidance, a system known as TCAS. The Mode S beacon transponders are also compatible with an older radar beacon system known as Air Traffic Control Radar Beacon Systems (ATCRBS).

A new use for the Mode S beacon transponders has been proposed, known variously as ADS-Mode S and GPS-Mode S. This would entail having the transponders emit additional coded pulses, called GPS squitter pulses, to enable the ground air traffic controllers to have GPS (Global Positioning System) positional information on the aircraft location, which is based on highly accurate navigational satellite data.

A potential problem with such a proposed system is that all of these coded pulses are being transmitted on the same radio frequency. Thus, the more pulses that are being emitted, the greater chance that pulses transmitted from one aircraft will interfere with a transmission from another aircraft, potentially causing both messages to be missed by the intended receiver. Before approving a plan that calls for more transmissions, the question must be answered, how many aircraft can co-exist in a given region of the sky before interference effects cause ADS-Mode S operation to fall below acceptable levels.

In G. Knittel and V. Orlando, "ADS-Mode S" in 38*th Annual Air Traffic Control Association Conference Proceedings*, pages 230–236 (ATCA, 1993), the authors considered reply interference effects on ADS-Mode S squitter and developed estimates of the maximum number of aircraft which can be handled by an ADS ground station, as a function of ATCRBS and Mode S reply levels. These estimates were made analytically, which required several explicit and implicit assumptions to make the problem analytically tractable. For example, this paper assumed that the arrival at the ADS-Mode S antenna of ATCRBS replies from many aircraft, and the probability of interference from Mode S replies, can be treated as a Poisson process. This resulted in a conservative estimate of capacity.

ADS-Mode S is an Automatic Dependent Surveillance (ADS) concept in which aircraft would transmit Global Positioning System (GPS) estimates of their position to ground stations by using the squitter capabilities of the Mode S beacon transponder. A squitter is a random, as opposed to a scheduled, transmission of data. Such a system is considered in the above-identified paper by Knittel and Orlando, in which GPS equipped aircraft would emit a long Mode S squitter containing positional information twice a second. A limiting factor in such a system is that a squitter arriving randomly at the receiving ground antenna may be destructively interfered with by replies from other transponders on the common 1090 MHz frequency. Thus, there will be some critical density of aircraft and reply rates which will cause the probability of receiving squitter positional updates to fall below an acceptable minimum.

The Knittel and Orlando paper chooses a 99.5% probability of receiving at least one ADS squitter update from an airplane every five seconds as their minimum acceptable ADS criteria. That paper then uses analytic methods to determine the maximum number of aircraft which can be handled by an ADS ground station for various reply rates, based on interference limitations.

The estimates of interference effects in the Knittel and Orlando paper are made analytically, which requires several explicit and implicit assumptions to make the problem analytically tractable. The major assumption in this analytic estimate is that the arrival of ATCRBS replies from any aircraft at the ADS-Mode S receiver antenna, and interference from Mode S replies, can each be treated as a Poisson process. This means, among other things, that the replies' arrivals are uncorrelated with one another; that the rate of reply arrivals is steady over time; and that the probability of a reply arriving at any one given instant is the same as for any other instant. Also, since the Poisson distribution is a one parameter distribution, only the total number of replies in a second is considered relevant, i.e. 10 airplanes with 150 replies per airplane per second is treated the same as you would 100 airplanes with 15 replies per airplane per second.

SUMMARY OF THE INVENTION

Accordingly, a general purpose of the present invention is to provide apparatus and method for accurately predicting the behavior of predetermined signals in a predetermined environment.

Another purpose of the present invention is to provide a complete, accurate answer to the question of how many aircraft can co-exist in a given region of the sky before interference effects cause ADS-Mode S operation to fall below acceptable levels.

A further purpose of the present invention is to provide this answer for a wide variety of user-selectable initial conditions.

Briefly, these and other objects of the present invention are provided by a computer-implemented model for the frequency space utilized by the Mode S and ATCRBS systems.

Other objects, advantages and novel features of the invention will become apparent from the following detailed description of the invention when considered in conjunction with the accompanying drawings.

DESCRIPTION OF THE PREFERRED EMBODIMENT

Figure 1:
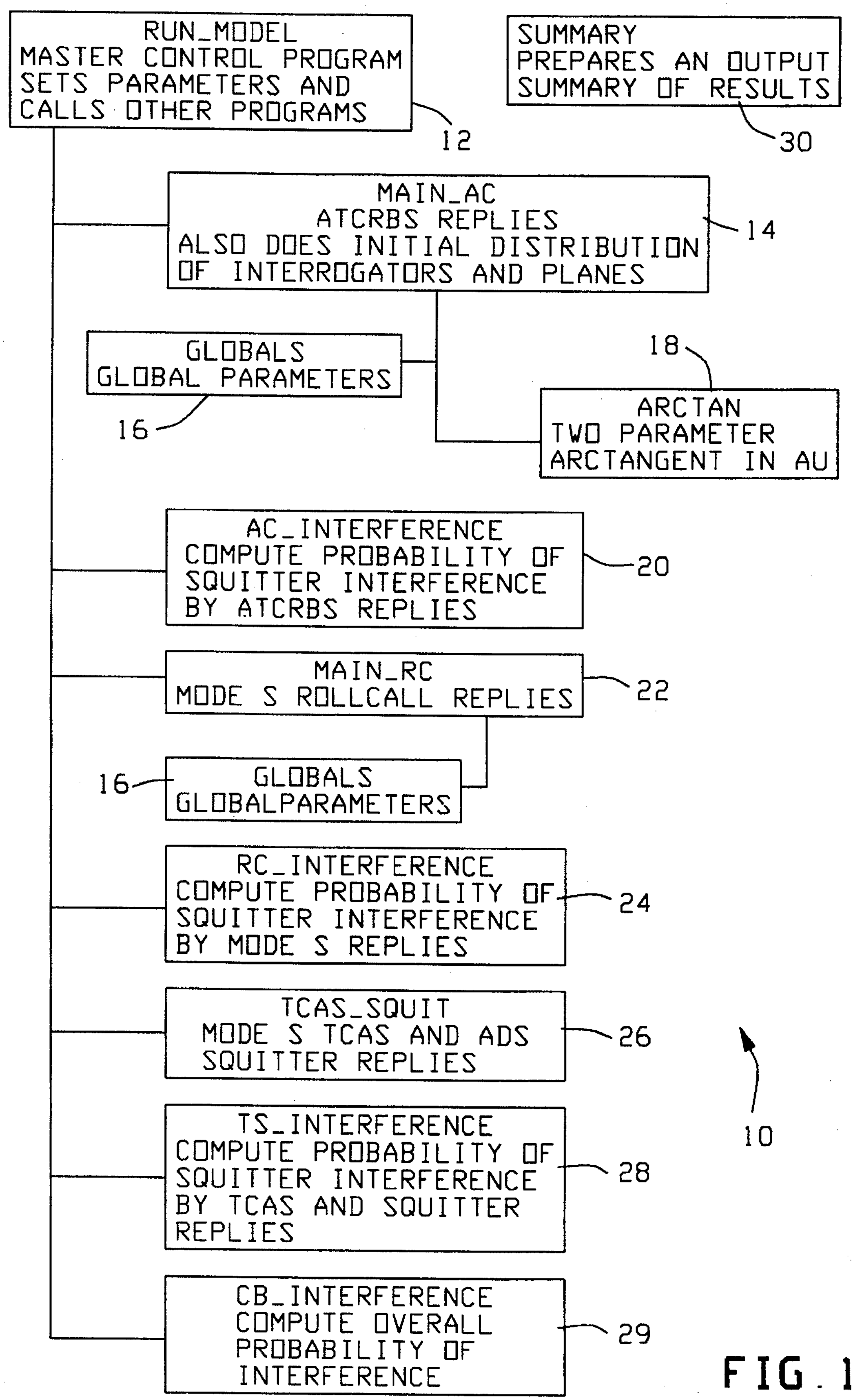
FIG. 1 is an overall block diagram of a frequency space model according to the present invention.

Referring now to the drawings, wherein like reference characters designate like or corresponding parts throughout the several views, there is shown in FIG. 1 a system 10 for modeling of a frequency space including a number of software modules, described in greater detail in the accompanying code and in the corresponding flowcharts of FIGS. 3–13. Master control program module 12 sets parameters and calls the other programs of FIG. 1. Module 14 handles ATCRBS replies and also does initial distribution of interrogators and airplanes. Module 14 uses module 16 for global parameters and module 18 providing two-parameter arctangents. Module 20 determines probability of squitter interference by ATCRBS replies. Module 22 determines Mode S rollcall replies, and also utilizes global parameters module 16. Module 24 determines the probability of squitter interference by Mode S replies. Module 26 determines Mode S TCAS and ADS squitter replies. Module 28 determines the probability of squitter interference by TCAS and squitter replies. Module 29 determines the overall probability of interference by ATCRBS replies, Mode S replies, and Mode S TCAS and ADS squitter replies. Module 12 calls modules 14, 20, 22, 24, 26, 28 and 29. Module 30 prepares an output summary of results.

Figure 2B:
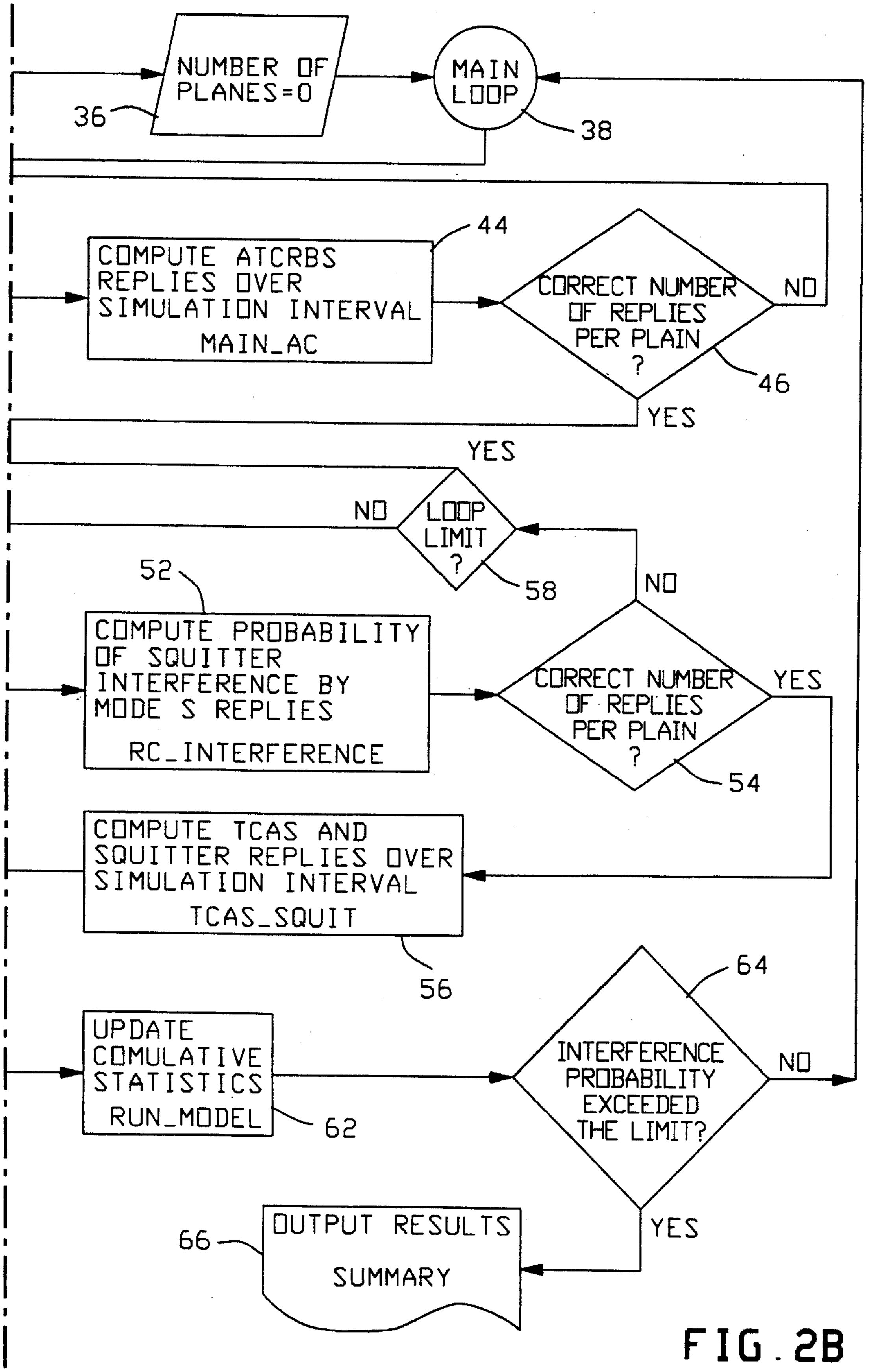
FIG. 2 is a flowchart for operation of the system of FIG. 1.

FIG. 2 illustrates the method of operation of the system of FIG. 1. FIG. 2 is a process diagram of the Mode S frequency space model of this embodiment of the present invention. At step 32, the user specifies input parameters for the model run, using module 12. At step 34, global parameters are initialized using module 16. At step 36, the initial number of airplanes considered by the model is set to 0; this number is incremented below. At step 38, the main loop is entered; this loop includes all steps of FIG. 2 except steps 32, 34 and 36 and the summary step. In this loop, first at step 40 the number of airplanes considered by the model is incremented by 5. Next, interrogators on the ground and airplanes in the air are distributed using module 14, at step 42. Next, at step 44 module 14 is used to determine ATCRBS replies over the interval being considered by the simulation. Then, at step 46, it is determined whether the correct number of ATCRBS replies per airplane has been considered; if not, then the process of FIG. 2 returns to step 42. Otherwise, the process proceeds to step 48, at which module 20 is used to determine the probability of squitter interference by ATCRBS replies, using the determination of step 44. After step 48, at step 50 module 22 is used to determine the number of Mode S replies over the interval being considered. Next, at step 52 module 24 is used to determine the probability of squitter interference by the Mode S replies found in step 50. Next, at step 54 it is determined whether steps 50 and 52 have considered the correct number of replies per airplane; if so, then the process of FIG. 2 proceeds to step 56. Otherwise, at step 58 it is determined whether the preset limit for loop iterations has been reached; if so, then the process proceeds to step 42, otherwise the process proceeds to step 50. At step 56, module 26 is used to determine the number of TCAS and squitter replies over the interval of interest. After step 56, at step 58 module 28 is used to determine the probability of squitter interference by TCAS and squitter replies. Next, at step 60 module 29 is used to determine the overall probability of squitter interference. Then, at step 62 module 12 is used to update cumulative statistics. Then, at step 64 it is determined whether the interference probability that has been found exceeds the preset limit determined at step 32; if not, then the main loop is reentered at step 38, but otherwise the output results are prepared utilizing module 30 at step 66.

In FIG. 2, italics are used to identify the name of the particular module of FIG. 1 used to implement a particular process step of FIG. 2. These modules are described in greater detail in FIGS. 3–13.

Figure 3A:
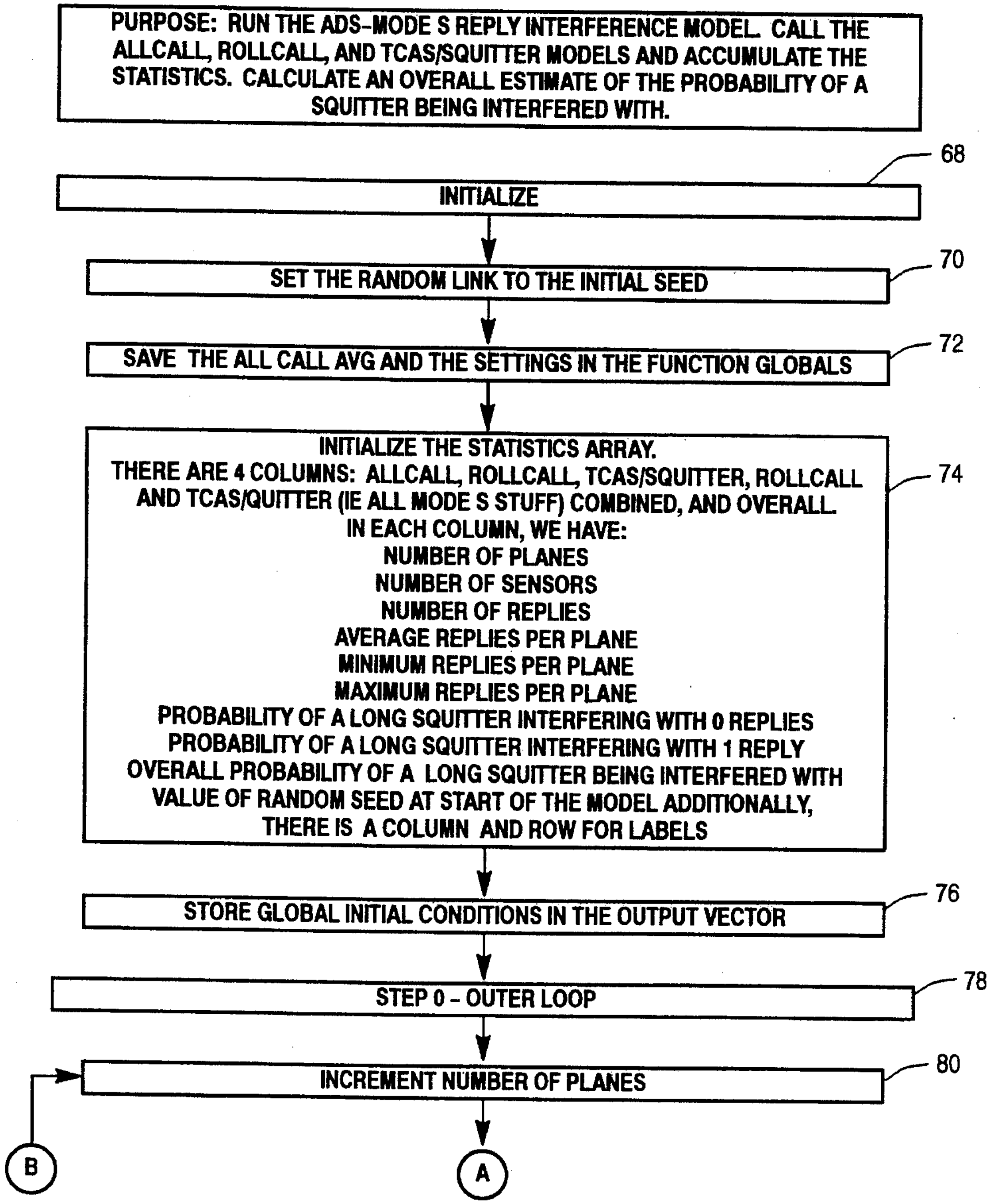
FIGS. 3–13*b* are flowcharts for computer software implementing the process of FIG. 2 and the system of FIG. 1.
Figure 3B:
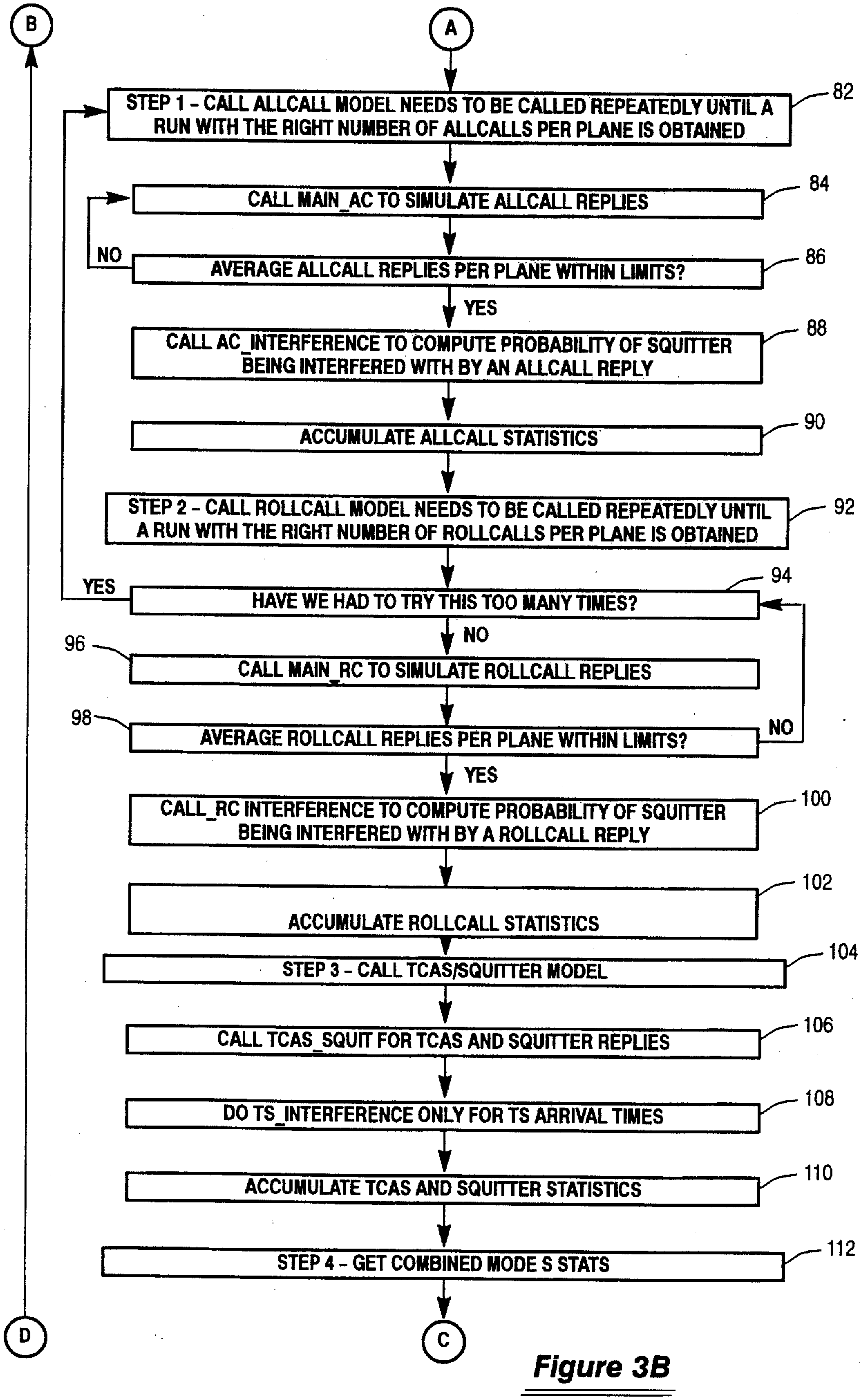
Figure 3C:
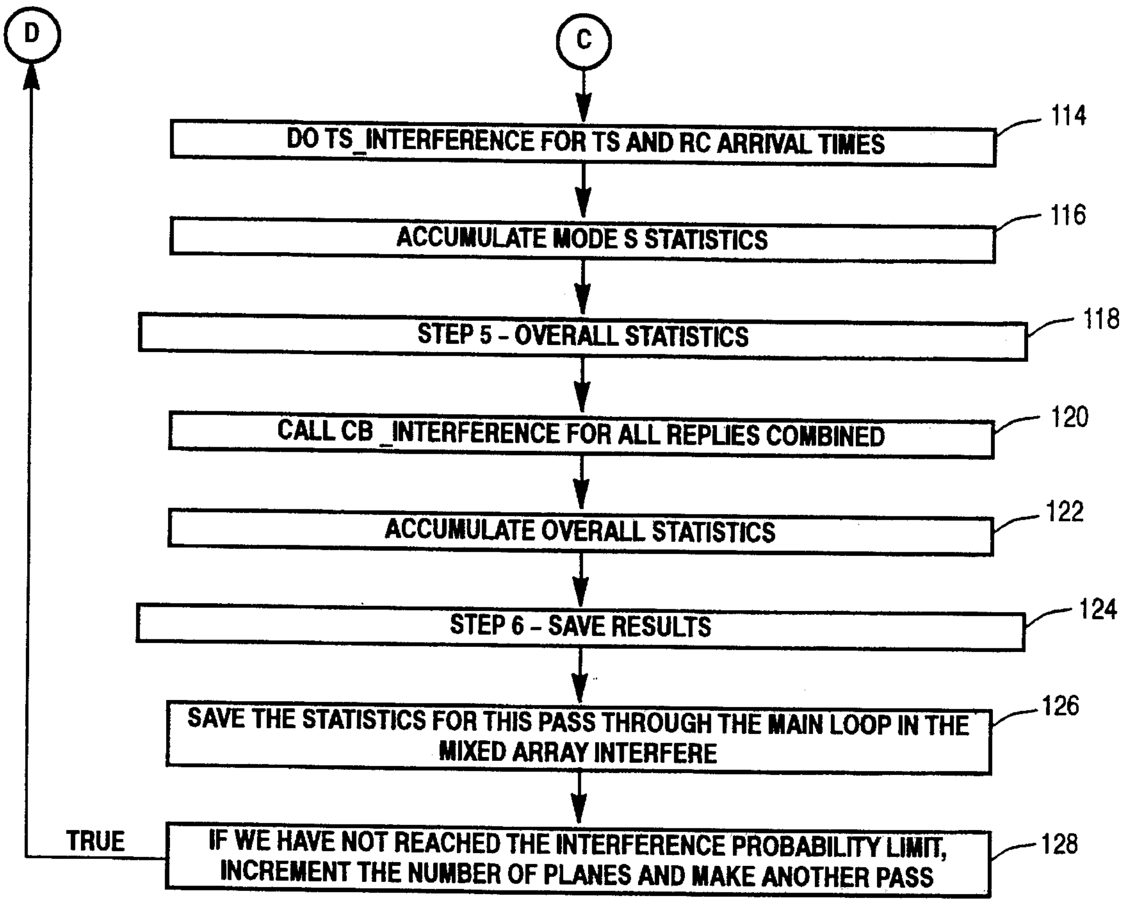
Figure 3:
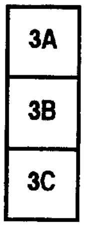

FIG. 3, made up of FIGS. 3A, 3B and 3C, is a flowchart for module 12 of FIG. 1. Module 12 is used at steps 32 and 62 of FIG. 2. Module 12 runs the ADS-Mode S reply interference model; calls the allcall, rollcall, and TCAS/squitter models and accumulates the statistics; and calculates an overall estimate of the probability of a squitter being interfered with. In FIG. 3, initialization step 68 includes setting the random link to the initial seed (step 70), saving the all call average and the settings in the function globals (step 72), initializing the statistics array (step 74) and storing global initial conditions in the output vector (step 76). Further regarding step 74, the statistics array includes five columns: allcall, rollcall, TCAS/squitter, combined Mode S (rollcall and TCAS/squitter combined), and overall. Each column has the number of airplanes, the number of sensors, the number of replies, the number of average replies per airplane, the number of minimum replies per airplane, the number of maximum replies per airplane, probability of a long squitter interfering with 0 replies, probability of a long squirter interfering with 1 reply, overall probability of a long squitter being interfered with, and value of random seed at start of the model. Additionally, there is a column and row for labels.

After steps 68–76, the outer loop is entered at step 78. As can be seen in FIG. 3, this outer loop includes all steps following step 78. At step 80, the number of airplanes is incremented. Next, at step 82 the allcall model is called; this model needs to be called repeatedly until a run with the right number of allcalls per airplane is obtained. This call includes calling module 14 to simulate allcall replies (step 84), determining whether the average allcall replies per airplane is within the preset limits (step 86), if so then calling module 20 to determine the probability of a squitter being interfered with by an allcall reply (step 88) and then accumulating allcall statistics (step 90). If at step 86 it is determined that the average allcall replies per airplane are not within the preset limits, then the process returns to step 84. After steps 82–90, at step 92 the rollcall model is called; this model needs to be called repeatedly until a run with the right number of rollcalls per airplane is obtained. This call includes determining whether this call has been made too many times (step 94), if not then calling module 22 to simulate rollcall replies (step 96), determining whether the average rollcall replies found per airplane are within preset limits (step 98), if so then calling module 24 to compute probability of squitter being interfered with by a rollcall reply (step 100) and then accumulating rollcall statistics (step 102). If at step 98 it is found that the average number of rollcall replies found per airplane are, not within the preset limits, then the process returns to the derision step 94. If at step 94 it is determined that the rollcall model has been called greater than predetermined number of permitted times, then the process returns to step 82. After steps 92–102, at step 104 the Tcas_squitter model is called. To do so, module 26 is called for TCAS and squitter replies (step 106), module 28 is performed only for TS arrival times (step 108) and TCAS and squitter statistics are accumulated (step 110). After steps 104–110, at step 112 the combined Mode S statistics are obtained. This includes performing module 28 for TS and RC arrival times (step 114) and accumulating the combined Mode S statistics (step 116). After steps 112–116, at step 118 the overall statistics are determined. This is accomplished by calling and performing module 29 for all replies combined (step 120) and then accumulating the overall statistics (step 122). After steps 118–122, at step 124 the previously determined results are saved. This includes saving the statistics for this pass through the main loop in the mixed array of interference (step 126) and then determining whether the interference, probability limit has been reached (step 128); if so, then module 12 is exited, otherwise the process of FIG. 3 returns to step 80 where the number of airplanes considered is incremented and another pass through the module 12 is begun.

Figure 4A:
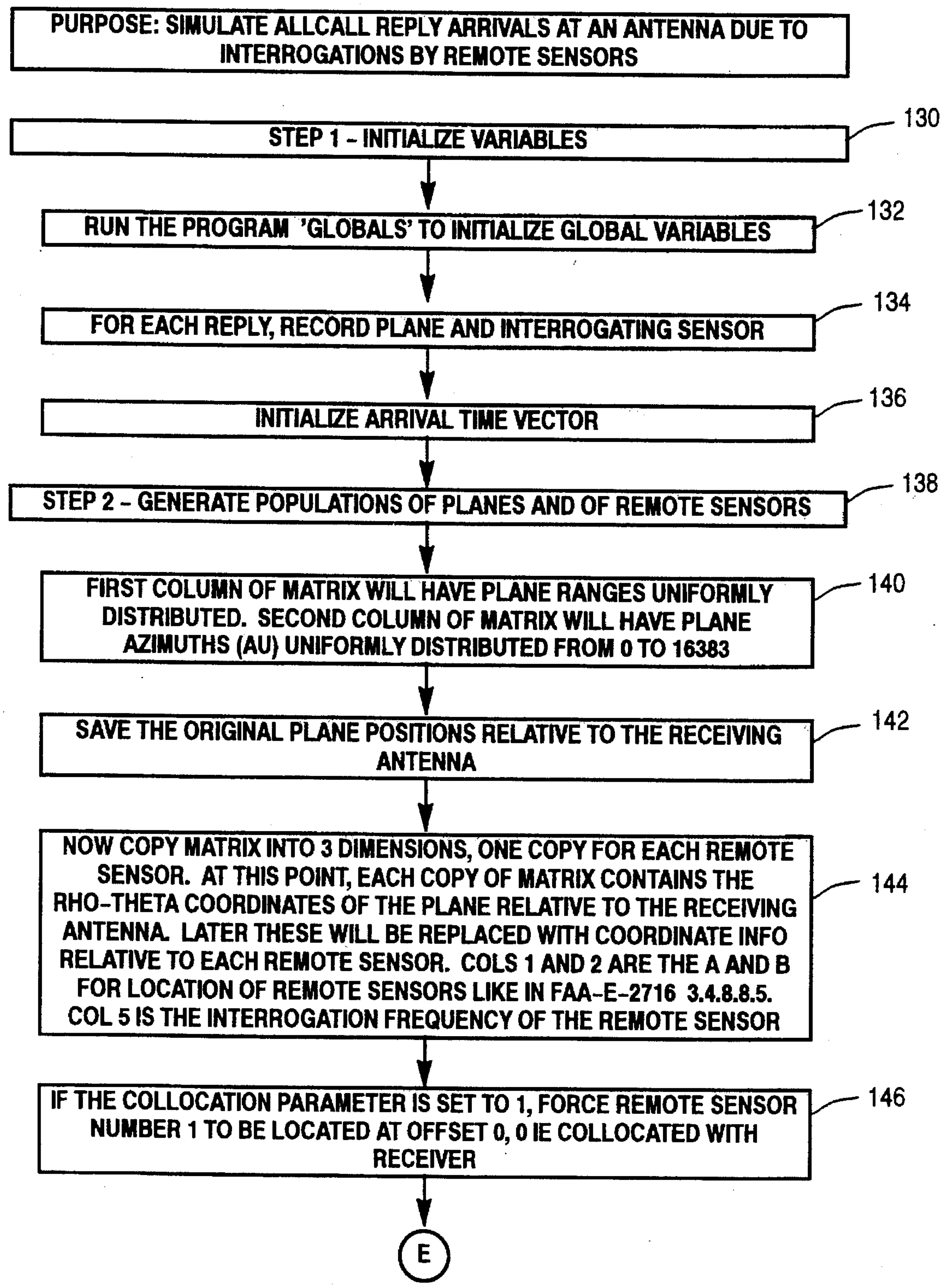
Figure 4B:
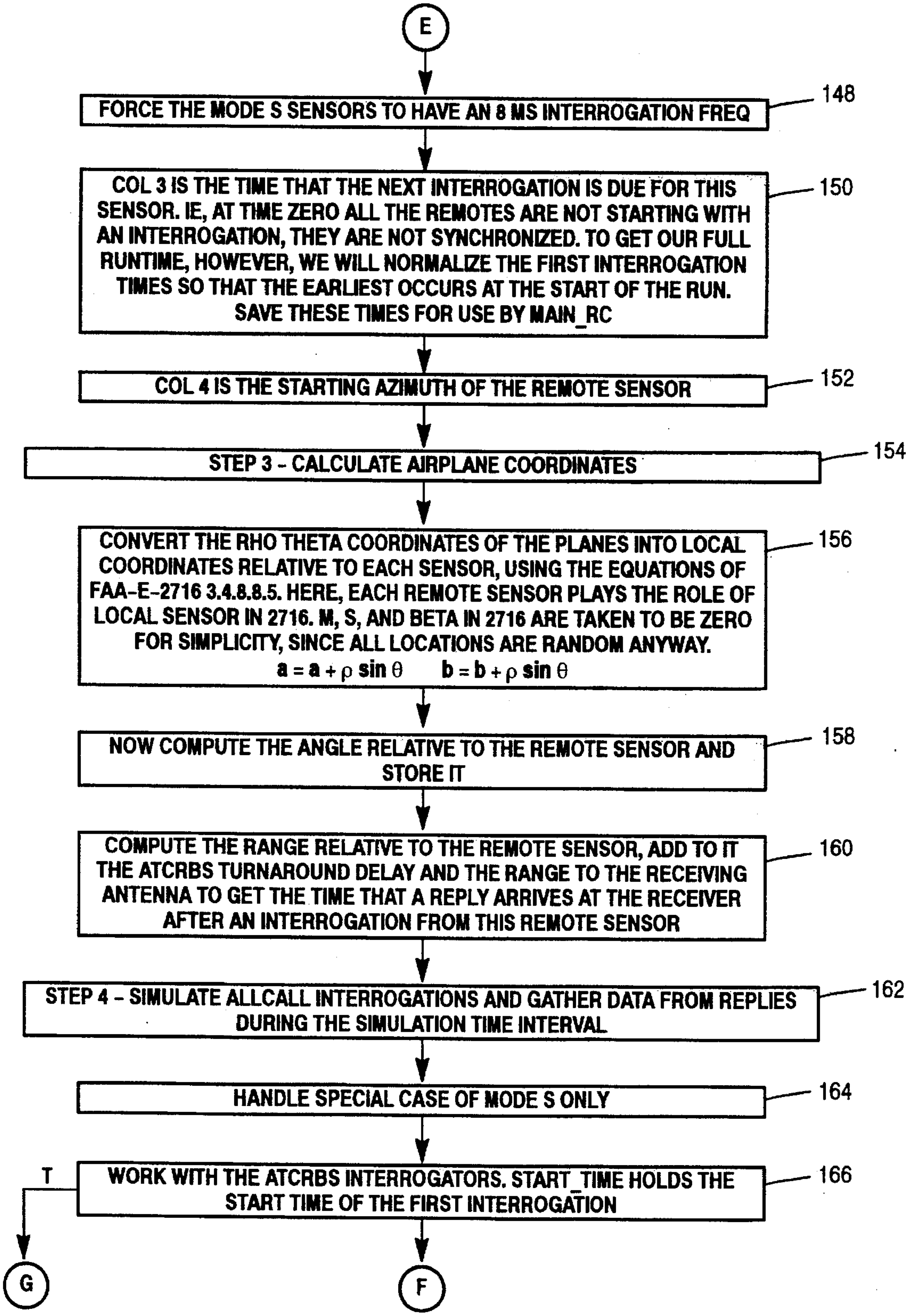
Figure 4C:
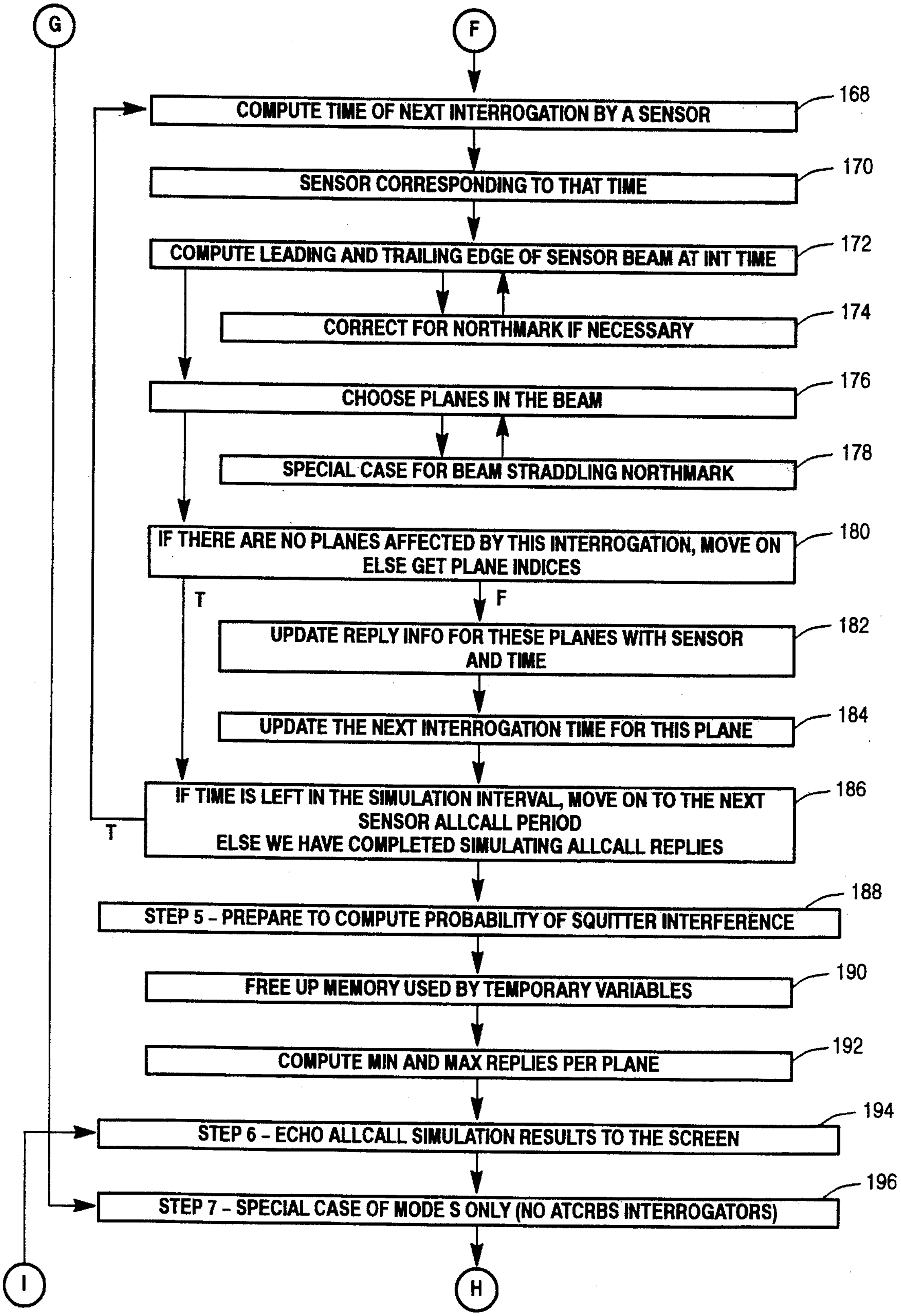

FIG. 4, made up of FIGS. 4A, 4B, 4C and 4D, shows a flowchart for module 14 of FIG. 1. Module 14 is used at steps 42 and 44 of FIG. 2. Module 14 simulates allcall reply arrivals at an antenna due to interrogations by remote sensors. FIG. 4, at step 130, variables are initialized. This is accomplished by run module 16 to initialize global variables (steps 1–3), for each reply from module 16, recording the corresponding airplane and interrogating sensors (step 134) and initializing the arrival time vector (step 136). After steps 130–136, at step 138 there is generated the population of airplanes and of remote sensors then being considered. This is accomplished by generating a matrix. The first column has airplane ranges uniformly distributed. The second column has airplane azimuths (au) uniformly distributed from 0 to 16383 ($2^{14}-1$) (step 140). Step 140 is followed by saving in the new matrix the original airplane positions relative to the receiving antenna (step 142), copying for matrix into 3 dimensions, one copy for each remote sensor (step 144), if the collocation parameter is set to 1, then forcing remote sensor number 1 to be located at offset 0,0 i.e. collocated with receiver (step 146), forcing the Mode S sensors to have an 8 millisecond interrogation frequency (step 148), placing into column 3 of the 3 dimensional matrix the time that the next interrogation is due for each corresponding sensor (step 150) and in that matrix providing column 4 with the starting azimuth of the corresponding remote sensor (step 152). At step 144, when the matrix is being copied into 3 dimensions, at this point, each copy of the matrix contains rho-theta coordinates of the airplane relative to the receiving antenna. Later, these coordinates will be replaced with coordinate information relative to each remote sensor. For each copied matrix, columns 1 and 2 are the a and b for location of remote sensors like in Department of Transportation Federal Aviation Administration Specification FAA-E-2716 & AMEND.-2, *Mode Select Beacon System* (*Mode-S*) *Sensor* (Mar. 24, 1993) section 3.4.8.8.5 "Conversion of Remote Sensor Coordinates", which is hereby incorporated by reference herein (including pages 324, page 325 with SCN-8 (change 14)and page 326 with SCN-11 (change 17). Further regarding step 150, column 3 of each copied matrix shows the time that the next interrogation is due for this sensor. That is, at time zero, all of the remote sensors are not starting with an interrogation, they are not synchronized. To get the full run time, however, the first interrogation times are normalized so that the earliest interrogation occurs at the start of the run. These times are saved for use by module 22.

In FIG. 4*b*, after steps 138–152 airplane coordinates are calculated at step 154. To do this, the rho-theta coordinates of the airplanes are converted into local coordinates relative to each remote sensor, using the equations of FAA specification FAA-E-2716 section 3.4.8.8.5 discussed above (step 156), the angle relative to the remote sensor is determined and stored (step 158), and then the time is determined that a reply arrives at the receiver after an interrogation from the remote sensor (step 160). At step 156, each remote sensor plays the role of local sensor in FAA specification FAA-E-2716 section 3.4.8.8.5, and values m, s and beta in that section are taken to be zero for simplicity, since all locations are random anyway. The conversation of step 156 utilizes the expressions $a=a+\rho \sin \theta$ and $b=b+\rho \cos \theta$. Step 160 is accomplished by determining the range relative to the remote sensor, and then adding to that value the ATCRBS turnaround delay and the range to the receiving antenna to obtain the time that a reply arrives at the receiver after an interrogation from this remote sensor. After steps 154–160, step 162 simulates allcall interrogations and gathers data from replies during the simulation time interval. This is accomplished by first determining whether this is the special case of Mode S only (step 164), if not then finding the start time of the first ATCRBS interrogators (step 166), determining the time of next interrogation by such a sensor (step 168), identifying the sensor corresponding to the time of step 168 (step 170), computing the leading edge and trailing edge of that sensor's beam at that interrogation time (step 172) correcting for northmark if necessary (step 174), choosing one or more airplanes within the beam of step 172 (step 176) but considering the special case for the beam straddling northmark (step 178), determining whether there are any airplanes affected by this interrogation (step 180) and if so obtaining the indices for those airplane(s) by updating the reply information for those airplane(s) with sensor identification and interrogation time (step 182) and then updating the next interrogation time for these airplane(s) (step 184), and then determining whether time is left in a simulation interval, and if so then moving on to the next sensor allcall period (step 186) by returning to step 168. At step 180, if there are no planes affected by that interrogation, then the process moves to step 186. If at step 186 no time is left in the simulation interval, then simulating allcall replies completed and the process moves on to step 188. If at step 164 it is determined that a special case of Mode S interrogations only is present, then the process proceeds to step 196, further discussed below.

In FIG. 4C, after step 162–186 have been completed, at step 188 the process prepares to determine a probability of squitter interference. This is accomplished by first bringing up memory used by temporary variables in earlier step (step 190) and then determining the minimum and maximum replies per airplane (step 192). After steps 188–192, at step 194 the allcall simulation results are echoed the video display screen. After step 194, step 196 reacts to whether a special case of Mode S interrogators only is present with no ATCRBS interrogators present. This is accomplished by determining whether step 196 has been reached by following steps 166–194 in sequence (step 198) as opposed to jumping to step 196 directly from step 164 because the special case is present and if so then exiting module 14. If step 196 has been reached by jumping to that step directly from step 164, then special case values are assigned to the output parameters and then the results are printed out at step 200. After step 200, the process returns to step 194.

Figure 5:
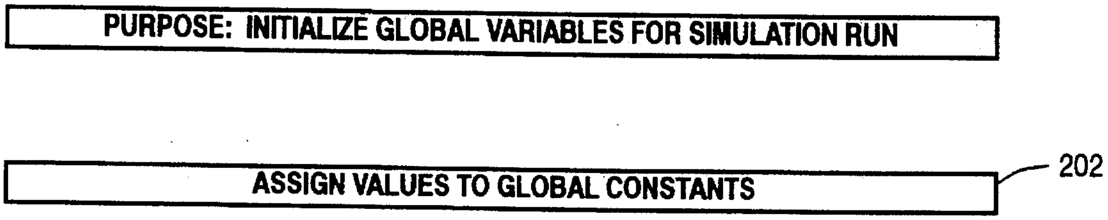

Module 16 of FIG. 1, used at step 34 of FIG. 2 and step 132 of FIG. 4A, is summarized by FIG. 5. Globals module 16 initializes global variables for a simulation run. At step 202 of FIG. 5, values are assigned to global constants.

Figure 6:
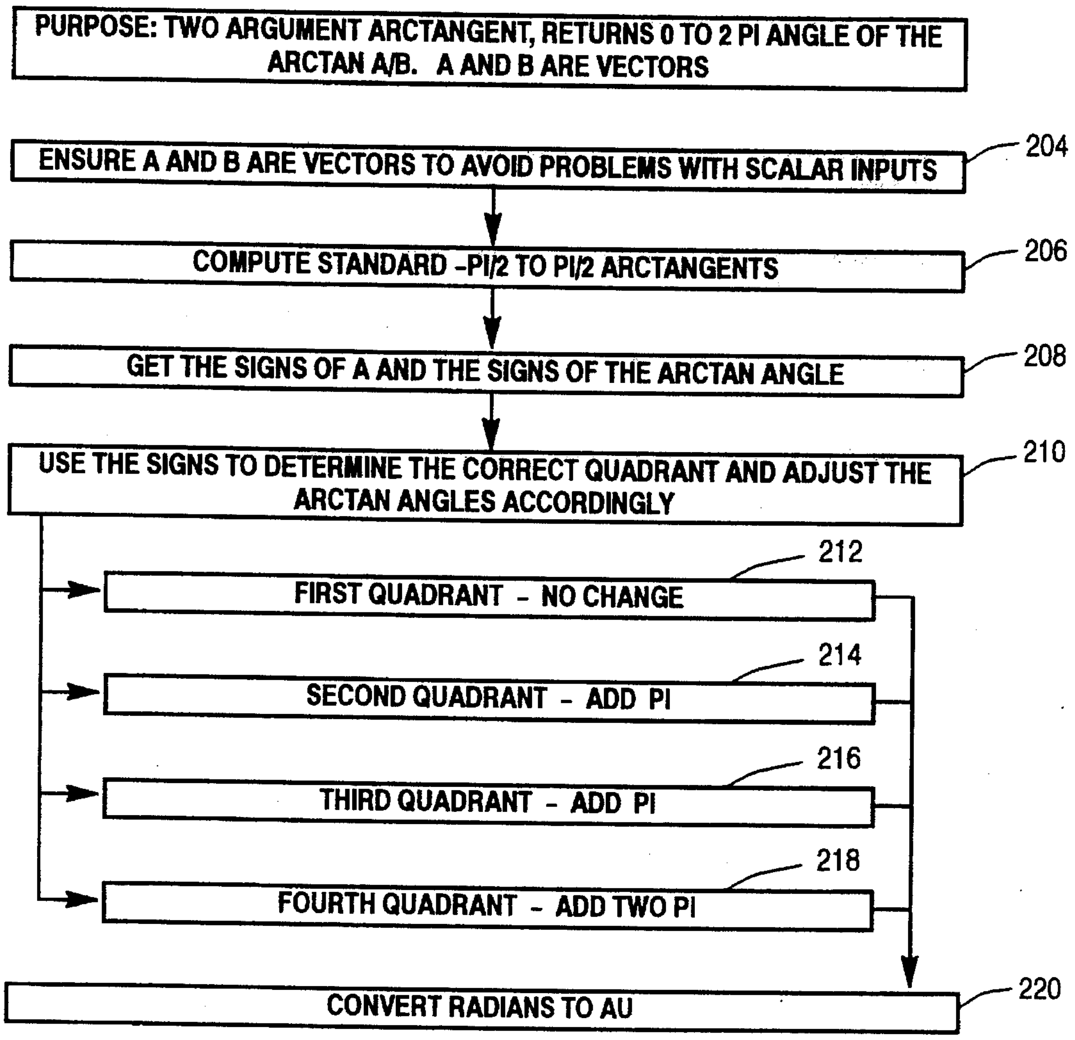

FIG. 6 shows a flowchart for ARCTAN Module 18 of FIG. 1. ARCTAN Model 18 is used by Module 14 at step 158 of FIG. 4B. ARCTAN Module 18 determines an arctangent from 2 arguments, returning a 0 to 2 pi angle for ARCTAN a/b where a and b are vectors. Step 204 of FIG. 6 checks to ensure that a and b are vectors, to avoid problems with scalar inputs. Step 206 determines the value of the arctangent of a/b in the range of −pi/2 to +pi/2; this can be accomplished by using the arctangent function that comes as part of the APL language, by a look-up table or by any other well-known method. However, step 206 will only calculate the arctangent value within a quadrant, but will not determine in which quadrant of a 360 degree (2 pi radians) circle that value would fall. That is accomplished by steps 208–218. Step 208 obtains the signs of a and the angle found at step 206. Next, step 210 uses the signs found at step 208 to determine the correct quadrant, and adjusts the ARCTAN angle value of step 206 accordingly, using one of steps 212–218. If the angle is in the first quadrant, then the ARCTAN value of step 206 is not changed (step 212). If the angle is in the second quadrant, then a value of pi (180 degrees) is added to the value of step 206 (step 214). If the angle is found to be in the third quadrant, at step 216 then the value of pi (180 degrees) is added to the value found at step 206. If the angle is found to be in the fourth quadrant, then a value of 2 pi (360 degrees) is added to the value found at step 206 (step 218). After any of steps 212–218, the process then goes to step 220, where the value in radians found using steps 204–218 is converted to azimuth units (au).

Figure 7A:
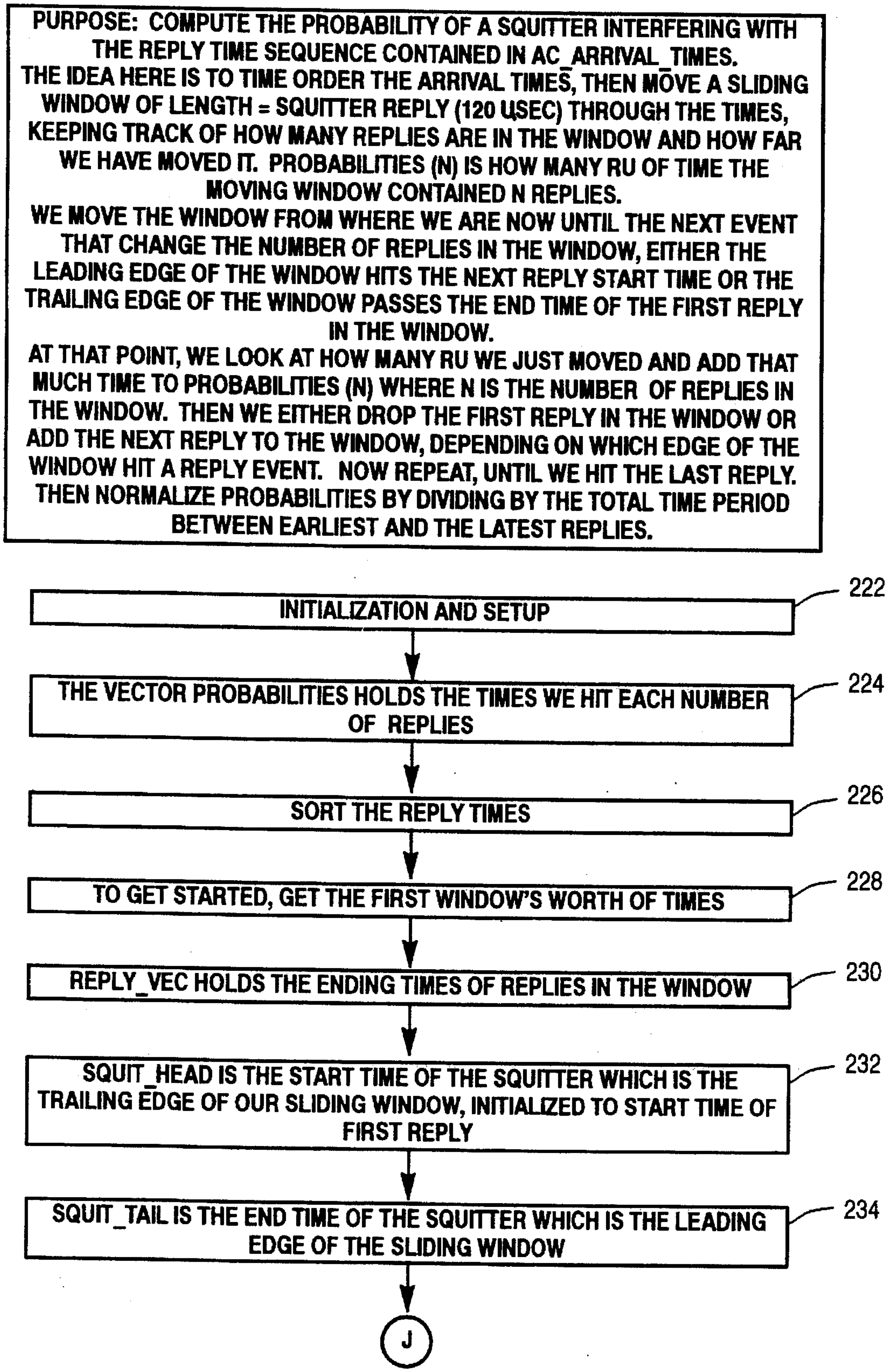
Figure 7B:
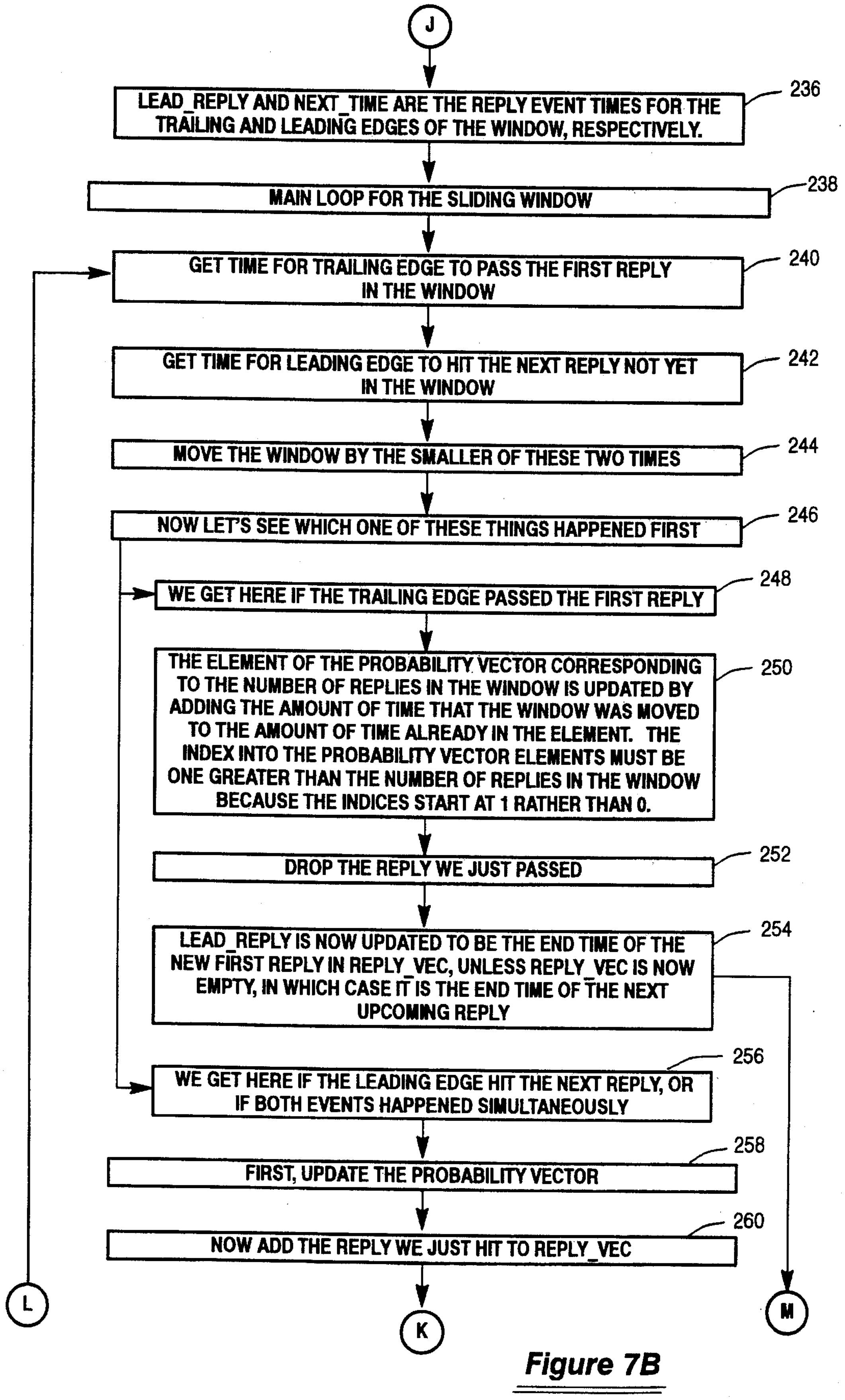
Figure 7C:
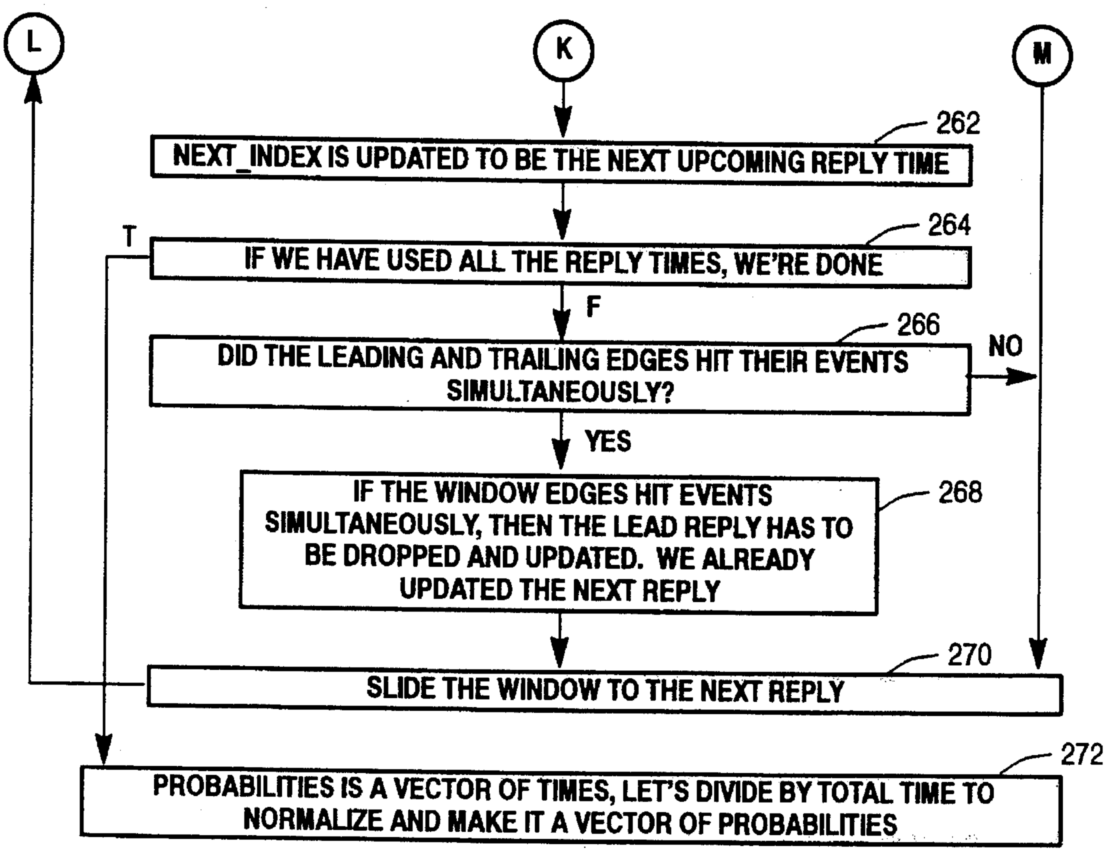
Figure 7:
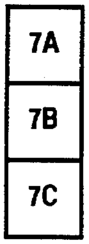

FIG. 7, made up of FIGS. 7A, 7B and 7C, is a flowchart for Ac_interference module 20 of FIG. 1. Module 20 is used at step 48. Module 20 determines the probability of a squitter interfering with the reply time sequence contained in the vector ac_arrival_times created by main_ac module 14. Module 20 time orders these arrival times, and then moves a sliding window having a length of one squitter reply (120 microseconds) through those times, keeping track of how many replies are in the window and how far the window has been moved. Probabilities [n] is how many ru of time the moving window contained n replies. The window is moved from its initial location until the next event that changes the number of replies in the window; either the leading edge of the window hits the next reply start time, or the trailing edge of the window passes the end time of the first reply in the window. At that point, it is determined how many ru of time the window has just been moved; that amount of time is added to the vector probabilities [n] where n is the number of replies in the window. Next, either the first reply in the window is dropped or the next reply to the window is added, depending on which edge of the window (leading or trailing) hit a reply event. The above process of moving the window until n changes, and the subsequent processing, is repeated until the window reaches the last reply. Next, the probabilities found by the preceding steps are normalized by dividing the values of the probabilities by the total time period between earliest and latest replies. That time period is determined by keeping track of how far the window has been moved.

In FIG. 7A, initialization and setup step 222 includes defining the probabilities vector as holding the times that each number of replies is found by the moving window (step 224), sorting those reply times (step 226), initially obtaining the reply times for the first window (step 228), defining vector variable reply_vec as holding the ending times of replies in the moving window(step 230), defining variable squit_head as the start time of the squitter which is the trailing edge of the sliding window, where that edge has been initialized to be at the start time of the first reply (step 232), defining variable squit_tail as the end time of the squitter which is the leading edge of the sliding window (step 234) and defining variables lead_reply and next_time as the reply event times for the trailing and leading edges of the moving window, respectively (step 236). Next, at step 238, the main loop of the sliding window, referred to in the preceding paragraph, is performed. This main loop includes steps 240–270. Step 240 obtains the time for the trailing edge of window to pass the first reply in the window. Next, step 242 obtains the time for the leading edge of the window to hit the next reply not yet in the window. Next, step 244 moves the window by the smaller of the two times of step 240 and 242. Next, in step 246 it is determined whether the window is moved because the trailing edge passed the first reply (step 248), or because the leading edge of the window hit the next reply or both such events happened simultaneously (step 256). If step 248 applies, then at step 250 the element of the probability vector corresponding to the number of replies in the window is updated by adding the amount of time that the window was moved to the amount of time already contained in that element. The index into the probability vector elements must be one greater than the number of replies in the window because the indices start at 1 rather than 0; thus an index of 1 corresponds to the element for 0 replies, an index of 2 corresponds to the element for 1 reply, etc.

After step 250, the reply just passed by the trailing edge is dropped (step 252), after step 252, the value of lead_reply is updated to be the end time of the new first reply in variable reply_vec, unless reply_vec is now empty, in which case variable lead_reply is updated to the end time of the next upcoming reply (step 254). After step 254, the window is slid to the next reply at 270, after which the process returns to step 240. However, if instead step 256 applies, then the probability vector is updated similarly to step 250 (step 258) and then adding to variable reply_vec the reply just hit by the sliding window (step 260). After step 260, the value of variable next_index is updated to be the next upcoming reply lime (step 262). After step 262, at step 264 it is determined whether all the reply times have been used; if so, then the main loop for the sliding window is exited and the process goes to the probability normalization step 272. At step 272, each of the probabilities constitutes one element of a vector of times, which is now divided by total time to normalize that vector and make that vector a vector of probabilities. However, if at step 264 it is determined that not all of the reply times have been used, then the process instead proceeds to step 266. At step 266, it is determined whether the leading and trailing edges of the window hit their events (a new event not previously in the window and the oldest event still in the window, respectively) simultaneously; if not, then the process proceeds to step 270 at which the window is slid to the next reply, after which the process goes to step 240. However, if at step 266 it is determined that the leading and trailing edges of the window hit their events simultaneously, then at step 268 the lead reply is dropped and updated (the next reply having already been updated), after which the process proceeds to step 270 and then step 240.

Figure 8A:
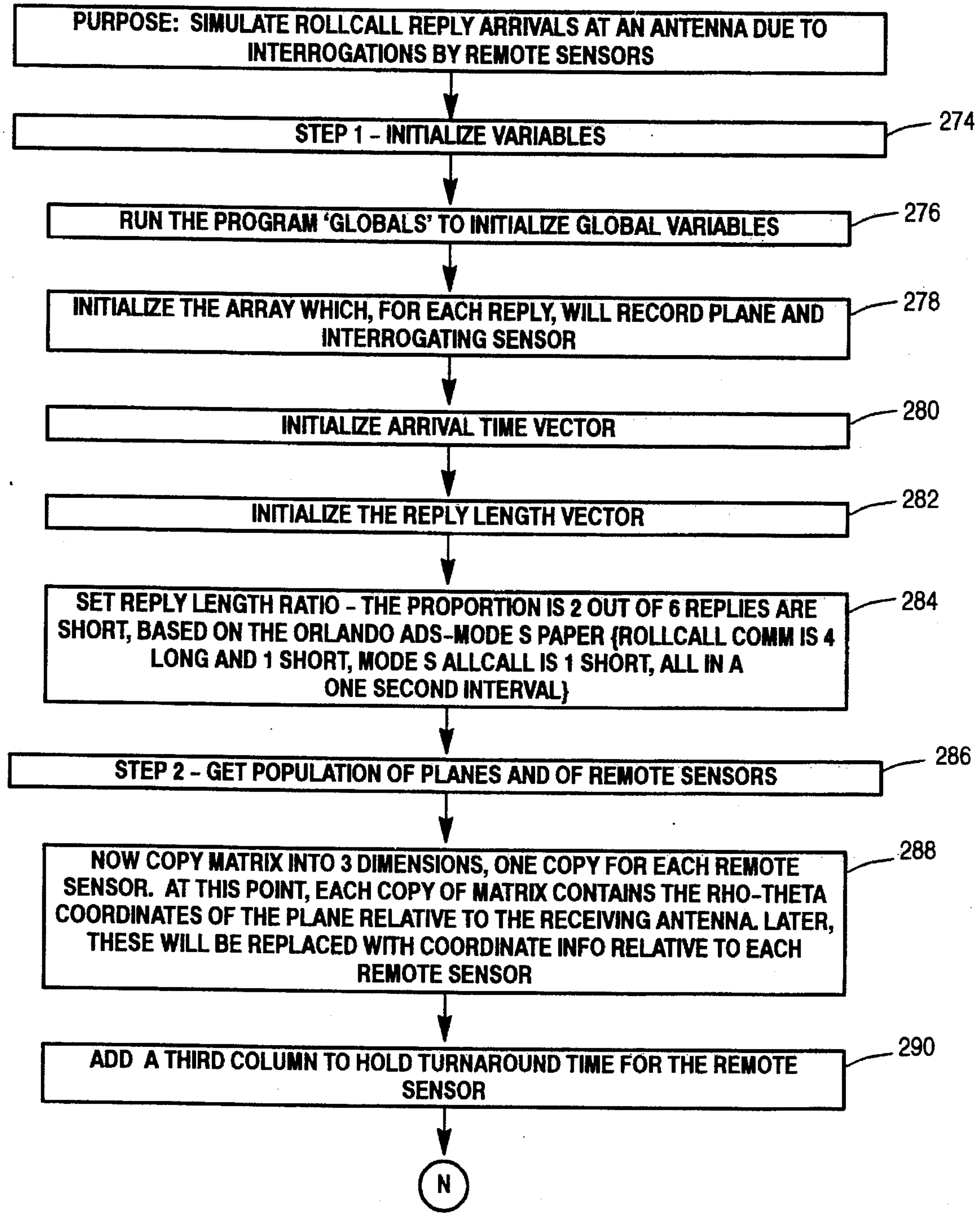
Figure 8B:
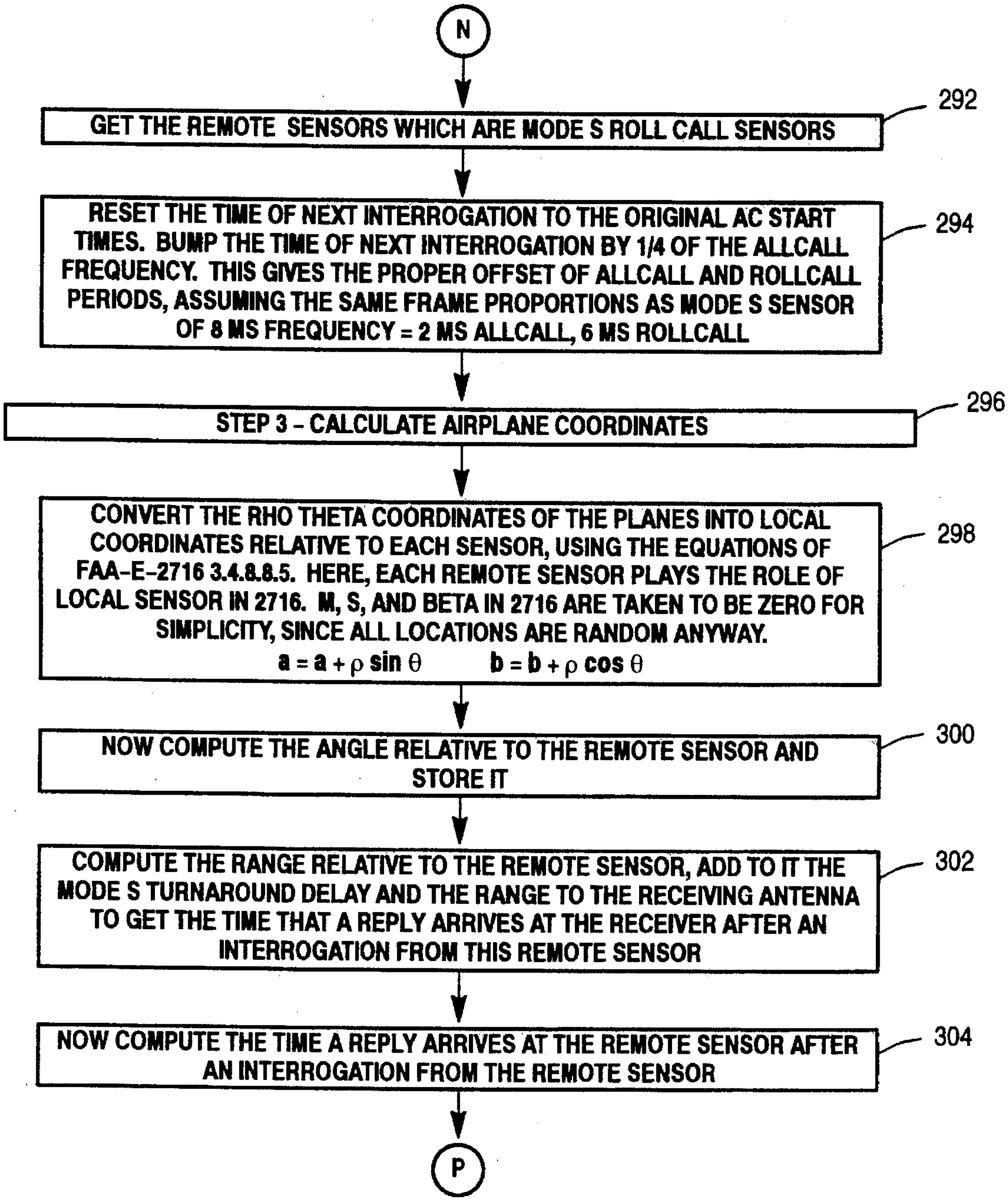
Figure 8C:
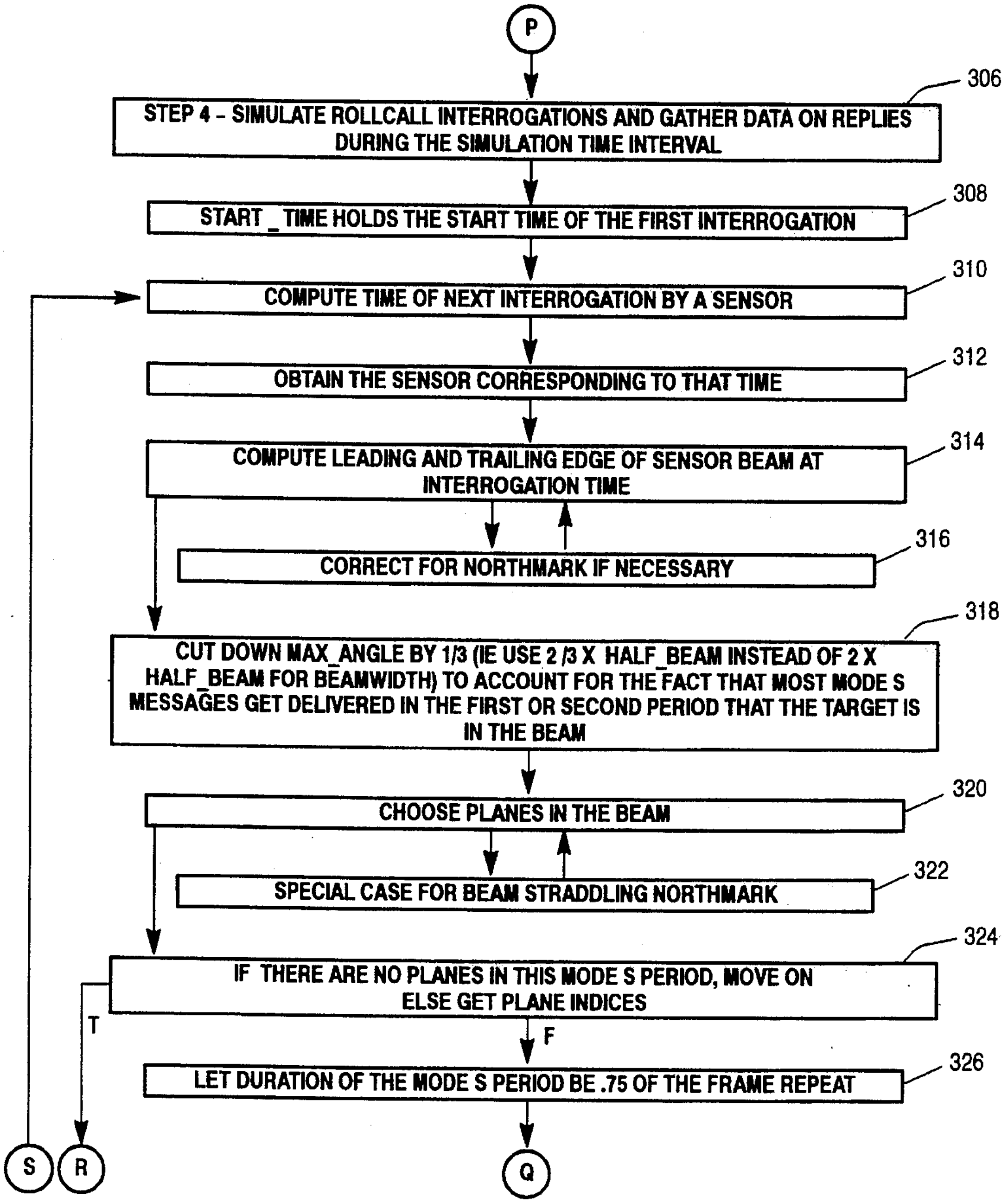
Figure 8D:
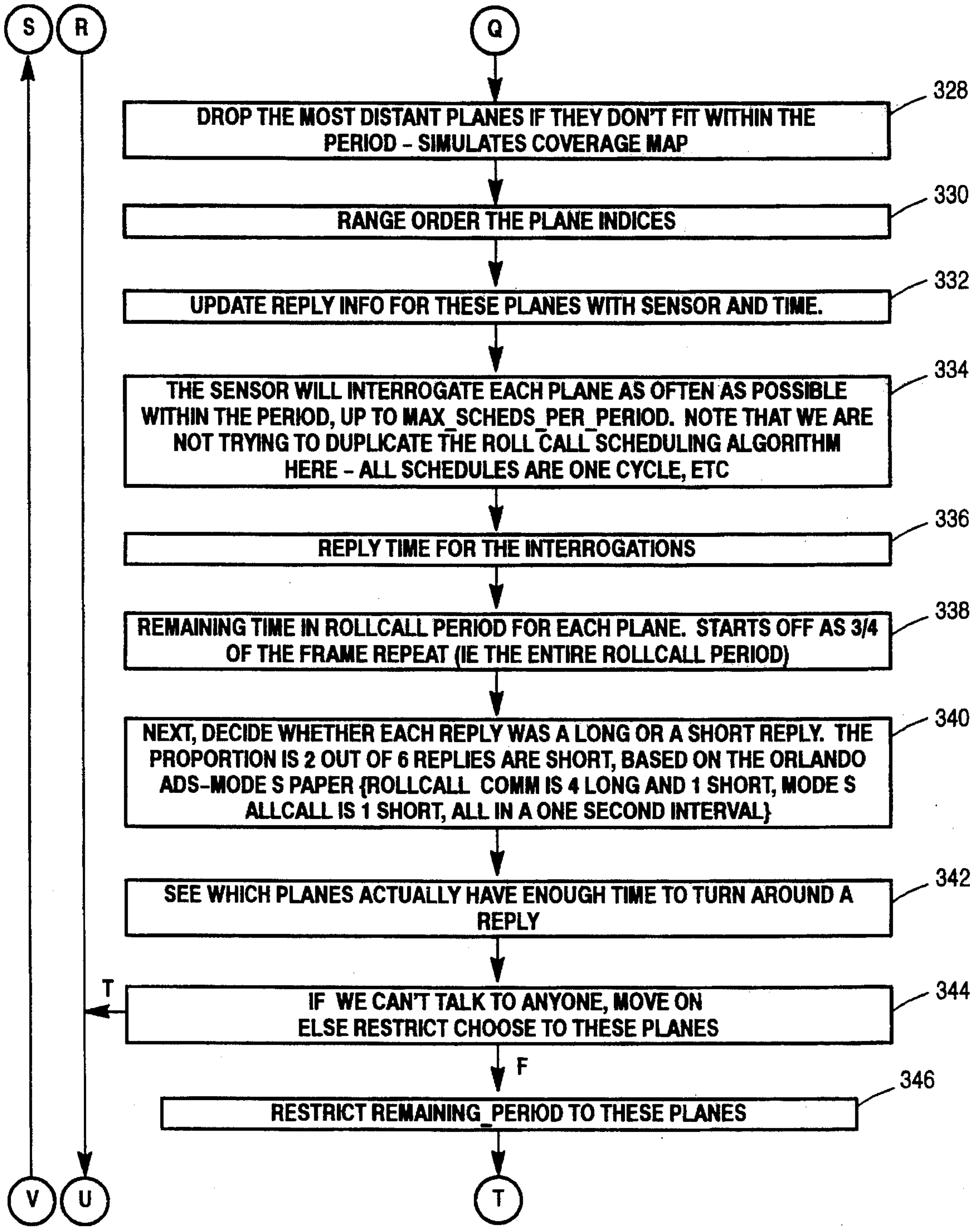
Figure 8E:
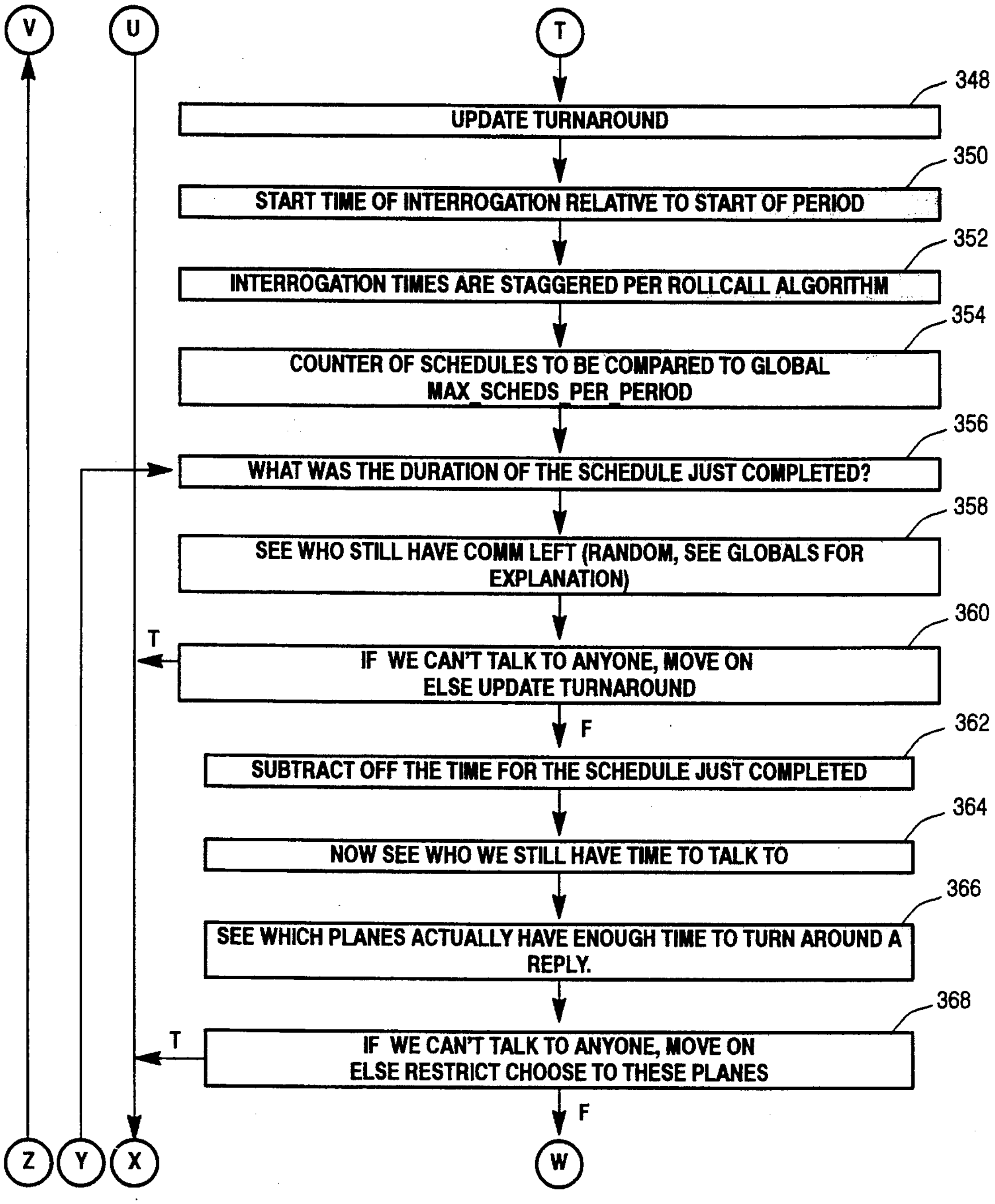
Figure 8F:
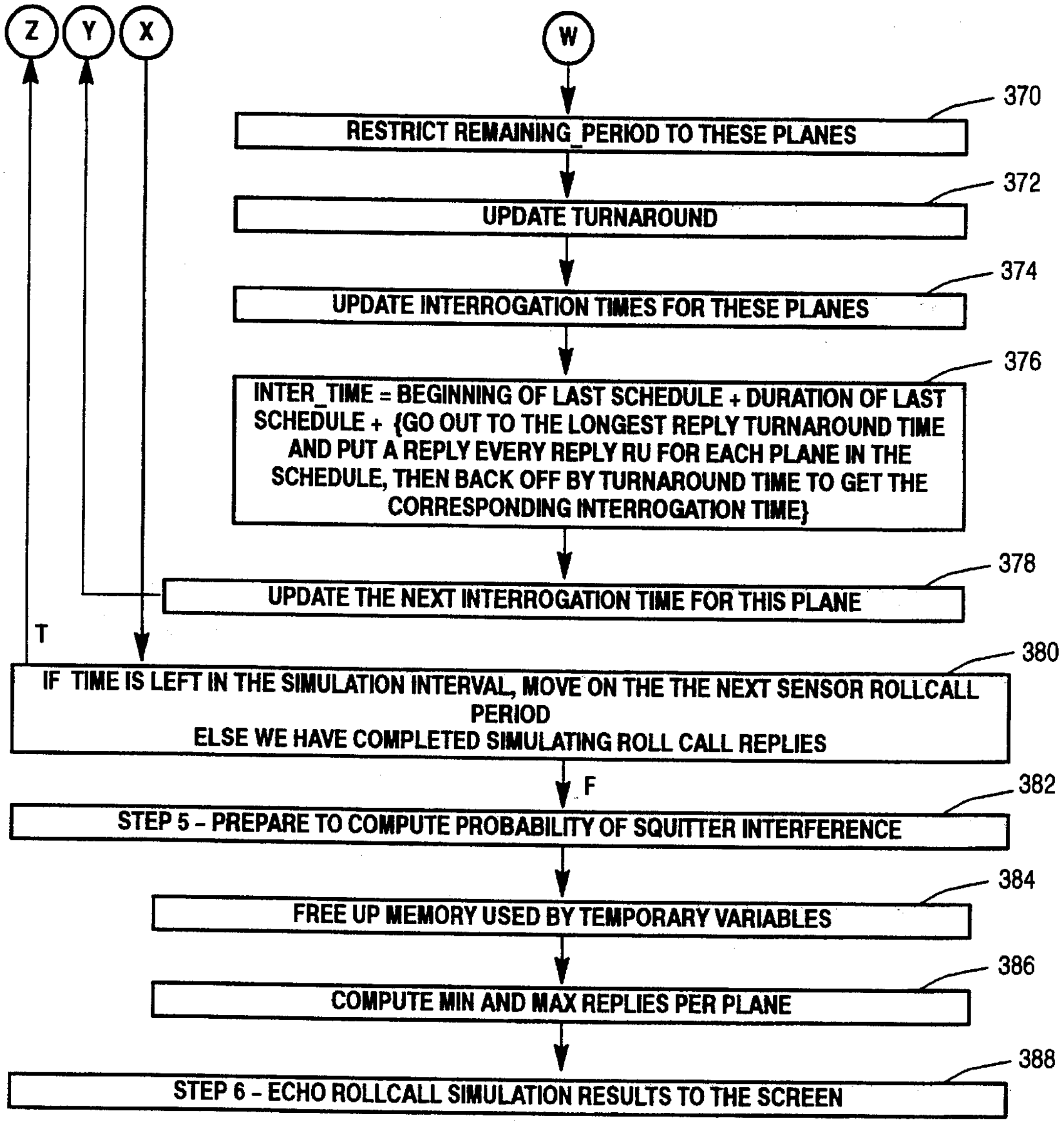
Figure 8:
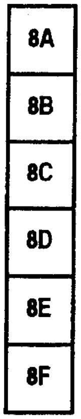

FIG. 8, which is made up of FIGS. 8A, 8B, 8C, 8D, 8E, and 8F shows a flowchart for main_rc module 22 of FIG. 1. Module 22 is used at step 50 of FIG. 2. As shown in FIG. 1, Module 22 utilizes globals module 16. Module 22 simulates rollcall reply arrivals at an antenna to interrogations by remote sensors. Module 22 begins with step 274 of FIG. 8A, at which variables are initialized. This is accomplished by running module 16 to initialize global variables (step 276), then initializing the array which, for each reply, will record the airplane producing the reply and the interrogating sensor requesting that reply (step 278), initializing the arrival time vector (step 280), initializing the reply length vector (step 282) and setting the reply length ratio (step 284). Further regarding step 284, the proportion for the reply ratio is 2 out of 6 replies are short, based on the Knittel and Orlando paper. That paper assumed that rollcall communications are 4 long and 1 short replies, and Mode S allcall is one short reply, all in a one second interval. After steps 274–284, at step 286 the population of airplanes and of remote sensors is obtained. This is accomplished by copying the matrix into 3 dimensions, one copy for each remote sensor (step 288), adding a third column to the matrix to hold turnaround time for the remote sensor (step 290), obtaining the identity of the remote sensors which are Mode S rollcall sensors (step 292) and resetting the time of the next interrogation to the original allcall start times, bumping the time of next interrogation by ¼ of the allcall frequency (step 294). Further regarding step 288, when the matrix is copied into 3 dimensions, each copy of the matrix then contains the rho theta coordinates of the airplane relative to the receiving antenna; later, these coordinates will be replaced with the coordinate information relative to each remote sensor instead of relative to the receiving antenna. Further regarding step 294, resetting and bumping the time of next interrogation gives the proper offset of allcall and rollcall periods, assuming the same frame proportions, as for a Mode S sensor of 8 millisecond frequency: 2 milliseconds allcall, plus 6 milliseconds rollcall. After steps 286–294, the airplane coordinates are determined at step 296. This is accomplished by converting the rho theta coordinates of the airplanes into local coordinates relative to each sensor (step 298), then determining the angle relative to the remote sensor and storing that angle (step 300), determining the range relative to the remote sensor, and adding to that range the Mode S turnaround delay and the range to the receiving antenna to get the time that a reply arrives at the receiver after an interrogation from this remote sensor (step 302) and then determining the time a reply arrives at the remote sensor after an interrogation from the remote sensor (step 304). The coordinate conversion of step 298 is here accomplished using the equations of FAA specification FAA-E-2716 section 3.4.8.8.5, with each remote sensor being treated as a local sensor for purposes of that standard and with the values of m, s, and $\beta$ in that standard being set to zero for simplicity (since all locations are random anyway). For step 298, the expressions $a=a+\rho \sin \theta$ and $b=b+\rho \cos \theta$ are used.

After steps 296–304, step 306 of FIG. 8C simulates rollcall interrogations and gathers data on replies during the simulation time interval. This is accomplished by step 308–380 of FIG. 8C–8E in the following manner. At step 308, variable start_time is provided with the start time of the first interrogation. Step 310 determines the time of next interrogation by a sensor. Step 312 obtains the sensor corresponding to the time of step 310. Step 314 determines the leading and trailing edge of the beam of that sensor at interrogation time, correct for northmark if necessary at step 316. Next, at step 318 the value of the variable max_angle is reduced by ⅓ to account for the fact that most Mode S messages get delivered in the first or second period that the target is in the beam. Next, step 320 chooses airplanes that are present in that sensor beam; step 322 addresses the special case for the sensor beam straddling the northmark. Next, at step 324 it is determined whether there are any airplanes in this Mode S period; if not, then the process jumps to step 380 of FIG. 8F to move on. If at step 324 it is determined that one or more airplanes are present in this Mode S period, then the process obtains the indices of such airplane(s) and goes to step 326. Next, at step 326, the duration of the Mode S period is set to be 75 percent of the frame repeat duration. At step 328 of FIG. 8D, the most distant such airplanes are dropped if they do not fit within the period; this criteria simulates a coverage map. Next, step 330 range orders the indices of the remaining airplane(s). Next, at step 332 reply information for those airplanes is updated with sensor and time. Then, at step 334 the simulated sensor interrogates each such airplane as often as possible within the period, up to a preset limit of max_scheds_per_period. Step 334 is not trying to duplicate the roll call scheduling algorithm; all schedules are one cycle, etc. Then, step 336 calculates reply time for the interrogations. Then, step 338 calculates the remaining time in the roll call period for each selected airplane. This remaining time starts off as 75% of the frame repeat time (i.e. the entire rollcall period). Next, at step 340 it is determined whether each reply was a long reply or a short reply. As discussed above, the proportion is 2 out of 6 replies are short, according to the Knittel and Orlando paper. Next, step 342 sees which of the selected airplanes actually have enough time to turn around a reply. Next, at step 344 it is determined whether sufficient time remains to interrogate any more airplanes; if not, then the process jumps to step 380 of FIG. 8F. If at step 344 it is determined that sufficient time remains to interrogate one or more airplanes, then at step 346 the remaining period is restricted to those airplanes found at step 342 to actually now have enough time to turnaround a reply. After step 346, step 348 of FIG. 8E updates the turnaround times. Next, step 350 determines the start time of the interrogation relative to start of the period. Then, at step 352 the interrogation times are staggered per rollcall algorithm. Then, at step 354 the counter of schedules is compared to the value of global max_scheds_per_period. Then, at step 356 the duration of the schedule just completed is determined. Next, at step 358 it is determined which airplanes still have communications left. Next, at 360 if insufficient time remains to talk to anyone or receive any further communications, then the process jumps to step 380; otherwise, updating turnaround is begun by going to step 362. Step 362 subtracts off the time for the schedule just completed, after which step 364 determines which airplanes there is still time to talk to, and at step 366 it is determined which airplanes actually have enough time to turnaround a reply. After step 368, if insufficient time remains to talk with any further airplanes, then the process jumps to step 380; otherwise, permitted communications are restricted to the airplanes identified at step 366 and the process goes to step 370. At step 370, the remaining period is restricted to the airplanes identified at step 366, after which step 372 updates turnaround. Then, step 374 updates interrogation times for these airplanes. Then, at step 376, the value of variable inter_time is determined to be equal to the beginning of the last schedule plus a duration of the last schedule plus a third value. This third value is determined by going out to the longest reply turnaround time and putting a reply every reply ru spacing for each airplane in the schedule, then backing off by turnaround time to get the corresponding interrogation time. After step 376, step 378 updates the next interrogation time for this airplane, and the process then goes to step 356 of FIG. 8E.

At step 380, if time remains in the simulation interval, then the process moves on to the next sensor rollcall period by going to step 310 of FIG. 8C; otherwise, simulation of rollcall replies has been completed and the process moves to step 382. Step 382 prepares to compute probability of squitter interference by freeing up memory used by temporary variables (step 384) and then computing the minimum and maximum replies per airplanes (step 386). After steps 382–386, at step 388 rollcall simulation results are echoed to the display screen.

Figure 9A:
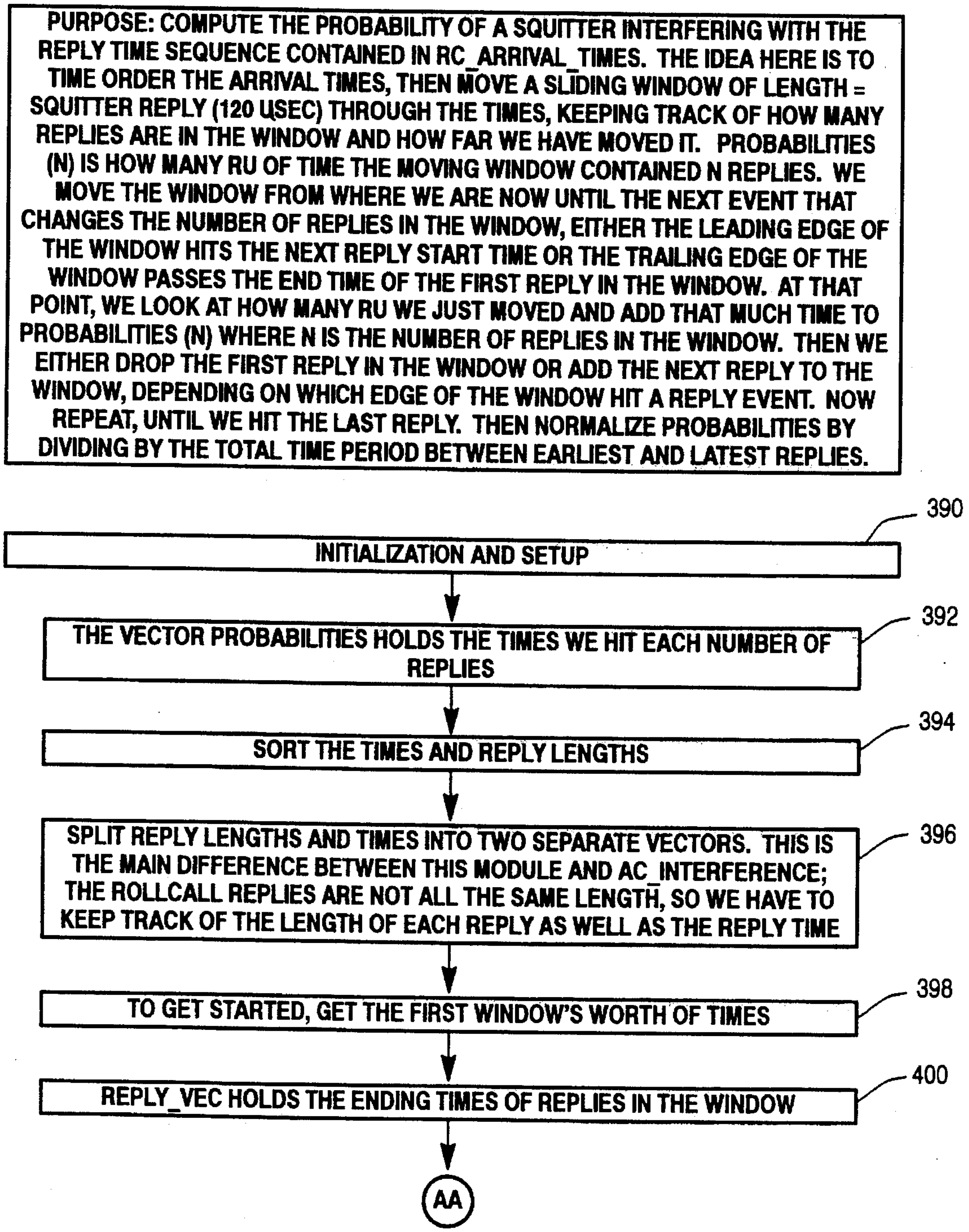
Figure 9B:
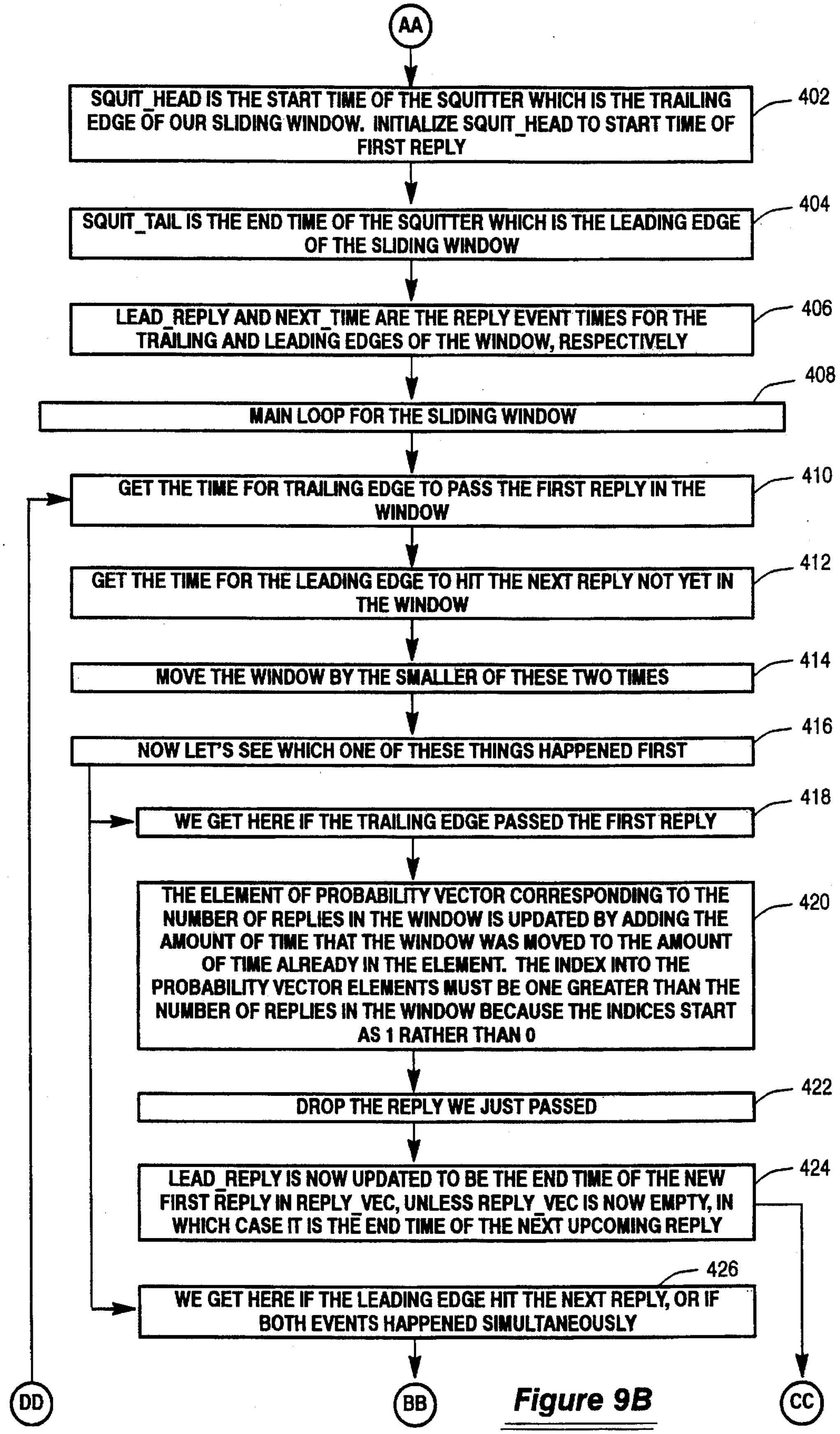

FIG. 9, made up of FIGS. 9A, 9B and 9C, is a flowchart for rc_interference module 24 of FIG. 1. Module 24 is used at step 52 of FIG. 2. Module 24 determines the probability of a squitter interfering with the reply time sequence contained in variable rc_arrival_times. The arrival times are time ordered, and then a sliding window having a length equal to one squitter reply time (120 microseconds) is moved through the arrival times, keeping track of how many replies are in the window and how far the window has been moved. Probabilities [n] is how many ru of time the moving window contained n replies. The window is moved from its initial location until the next event that changes the number of replies contained in the window; either the leading edge of the window hits the next reply start time or the trailing edge of the window passes the end time of the first reply in the window. At that point, the amount of time in ru moved is determined and then added to the vector probabilities [n] where n is the number of replies in the window. Then, either the first reply in the window is dropped from the window, or the next reply to the window is added, depending on which edge (leading or trailing) of the window hit a reply event. The above process is repeated until the last reply is reached. The resulting probabilities are then normalized by dividing the probabilities by the total time period between the earliest and latest replies. Module 24 begins with initialization and setup step 390. Step 390 is accomplishing by defining the vector probabilities as holding the times that each number n of replies is hit or encountered (step 392), sorting the times and the reply lengths (step 394), splitting the reply lengths in times into two different vectors (step 396), obtaining the first window's worth of times (step 398), defining variable reply_vec as holding the ending times of replies in the window (step 400), defining variable squit_head as the start time of the squitter which is the trailing edge of the sliding window and initializing variable squit_head to the start time of the first reply (step 402), defining variable squit_tail as the end time of the squitter which is the leading edge of the sliding window (step 404) and defining variable lead_reply and variable next_time as the reply event times for the trailing and leading edges of the window, respectively (step 406). Step 396 is the main difference between module 24 and module 20; the rollcall replies are not all the same length, so it is necessary to keep track of the length of each reply as well as the reply time. After steps 390–406, the main loop for the sliding window is entered (step 408). This main loop is accomplished by steps 410–440. Step 410 obtains the time for the trailing edge to pass the first reply in the window. Next, step 412 obtains the time for the leading edge of the window to hit the next reply not yet in the window. Then, step 414 moves the window by the smaller of the 2 times of the steps 410 and 412. Next, at step 416, it is determined which of 2 things happened first (step 418 or step 426). If the window is moved because its trailing edge passed the first reply (step 418), then the probability vector is updated similarly to step 250 (step 420), dropping the reply that the window just passed (step 422), and updating variable lead_reply to be the end time of the new first reply in variable reply_vec, unless variable reply_vec is now empty, in which case variable lead_reply is updated to be the end time of the next upcoming reply (step 424); the process then goes to step 440, where the window is slid to the next reply, followed by jumping to step 410. If the window was instead moved because the leading edge of the window hit the next reply, or if the trailing edge passed the first reply and the leading edge hit the next reply simultaneously (step 426), then the probability vector is updated (step 428), the reply that just entered the window is added to reply_vec (step 430), and variable next_index is updated to be the next upcoming reply time (step 432). After step 432, if all reply times have been used, then the loop is completed and the program jumps to step 442; otherwise the program moves to step 436 (step 434). At step 436, it is determined whether the leading and trailing edges of the window hit their respective events simultaneously: if not, then the window is slid to the next reply at step 440 and the program goes to step 410, otherwise at step 438 if the window edges hit events simultaneously, then the lead reply is dropped and updated (step 438) and the window is slid to the next reply (step 440) and the program jumps to step 410. At step 438, there is no need to update the next reply because that has already been updated. At step 442, since the probabilities vector is a vector of times, it is now divided by total time to normalize it and make it a vector of probabilities.

Figure 10A:
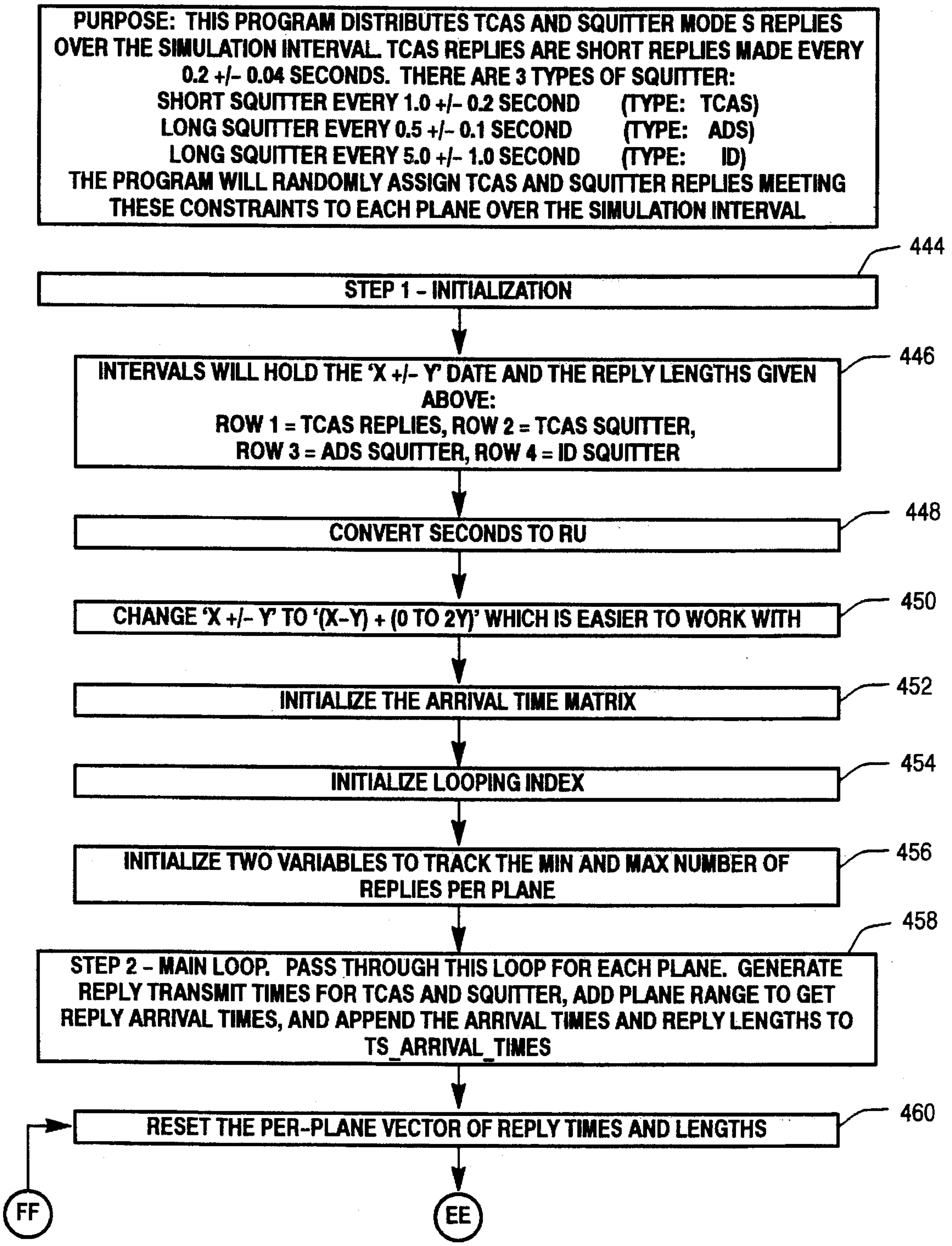
Figure 10B:
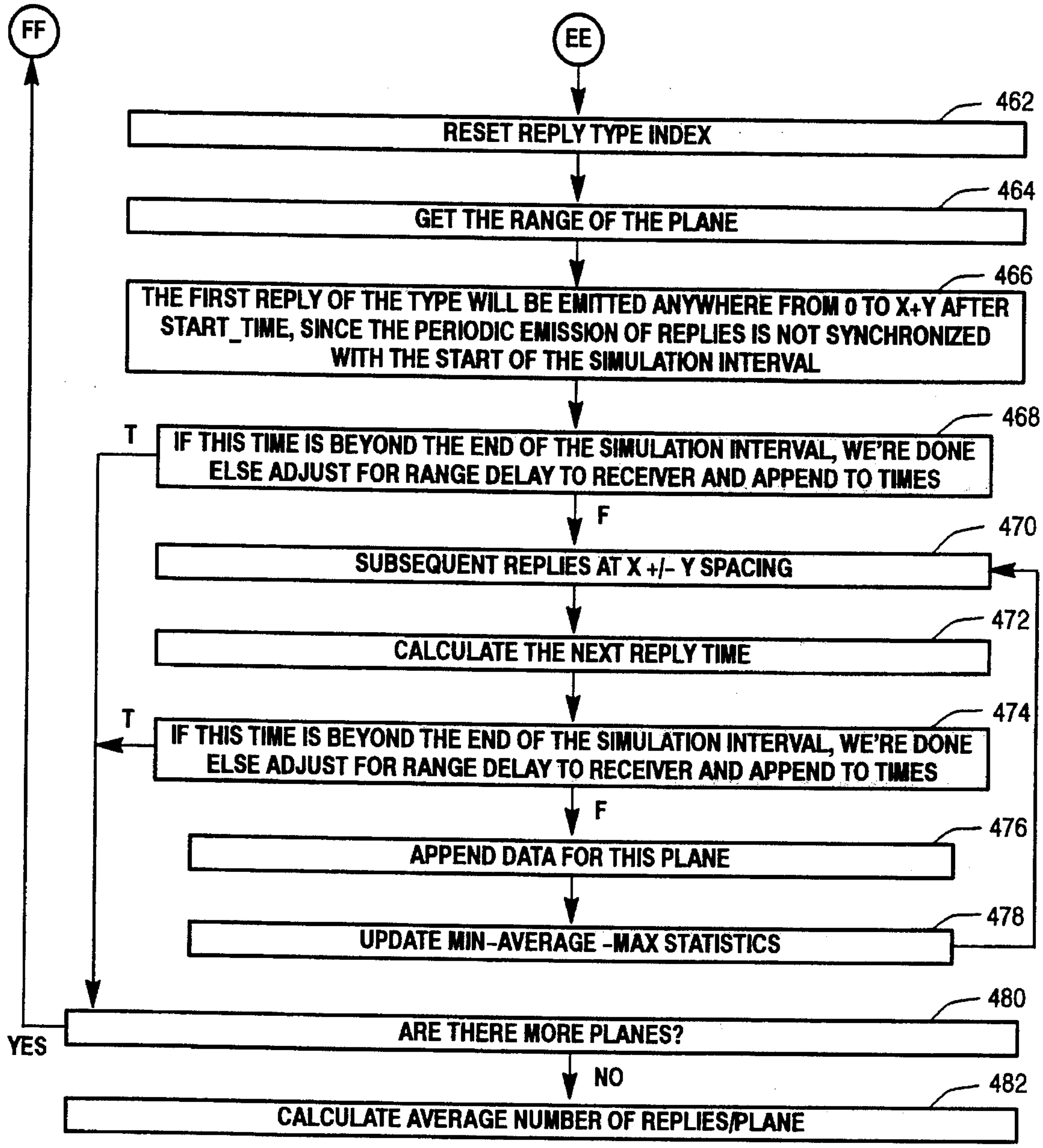
Figure 10:
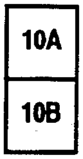

FIG. 10, which is made up of FIGS. 10A and 10B, shows a flowchart of module 26 of FIG. 1. Module 26 is used at step 56 of FIG. 2. Module 26 distributes TCAS and squitter Mode S replies over the simulation interval. TCAS replies are short replies made every 0.2±0.04 seconds. There are 3 types of squitter. Short squitter (type: TCAS) is made every 1.0±0.2 seconds. Long squitter (type: ADS-Mode S) is made every 0.5±0.1 seconds. Long squitter (type:identification) is made every 5.0±1.0 seconds. Module 26 randomly assigns TCAS and squitter replies meeting these constraints to each airplane over the simulation interval. In FIG. 10A, initialization occurs at step 444. This is accomplished by assigning rows in the variable Intervals to each type of reply (step 446), converting seconds to ru (step 448), converting the expression for time to one that is easier to work with (step 450), initializing the arrival time matrix (step 452), initializing the looping index (step 454), and initializing two variables to track the minimum and maximum number of replies per airplane (step 456). At step 446, intervals will hold the "x±y" data and the reply lengths given above as follows: row 1 is for TCAS replies, row 2 is for TCAS_ squitter, row 3 is for ADS-Mode S squitter, and row 4 is for id squitter. At step 450, the above expressions of the form "x±y" are converted to "(x−y)+(0 to 2y)" which is easier to work with. After steps 444–456, at step 458 the main loop is entered. A pass is made through the main loop for each airplane. The main loop generates reply transmit times for TCAS and squitter replies, adds airplane range to get arrival times, and appends the arrival times and reply lengths to variable ts_arrival_times. In the main loop, step 460 resets the per-airplane vector of reply times and lengths. Step 462 resets the reply type index. Step 464 obtains the range of the airplane being considered for this pass through the main loop. Step 466 defines that the first reply of the type will be emitted anywhere from 0 to x+y after starting time, since the periodic emission of replies is not synchronized with the start of the simulation interval. Next, if the elapsed time is beyond the end of the simulation interval, then this pass through the main loop is exited and the process moves to step 480; otherwise, an adjustment is made for range delay to receiver, and the reply time is appended to the reply data for this airplane. At step 470, subsequent replies are defined to be at x±y spacing. At step 472, the next reply time is determined. After steps 470 and 472, at step 474 if the elapsed time is beyond the end of the simulation interval, this pass through the main loop is terminated and the process moves to step 480; otherwise the adjustment is made for a range delay to the receiver, and the process moves to step 476. At step 476, the data for this reply is appended to the reply data for that airplane. Next, step 478 updates minimum-average-maximum statistics for that airplane. After step 478, the process moves to step 470. At step 480, it is determined whether any airplanes remain to be considered; if so, then a new pass through the main loop is begun by having the process move to step 460, otherwise the process moves to step 482 where the average number of replies per airplane is determined.

Figure 11A:
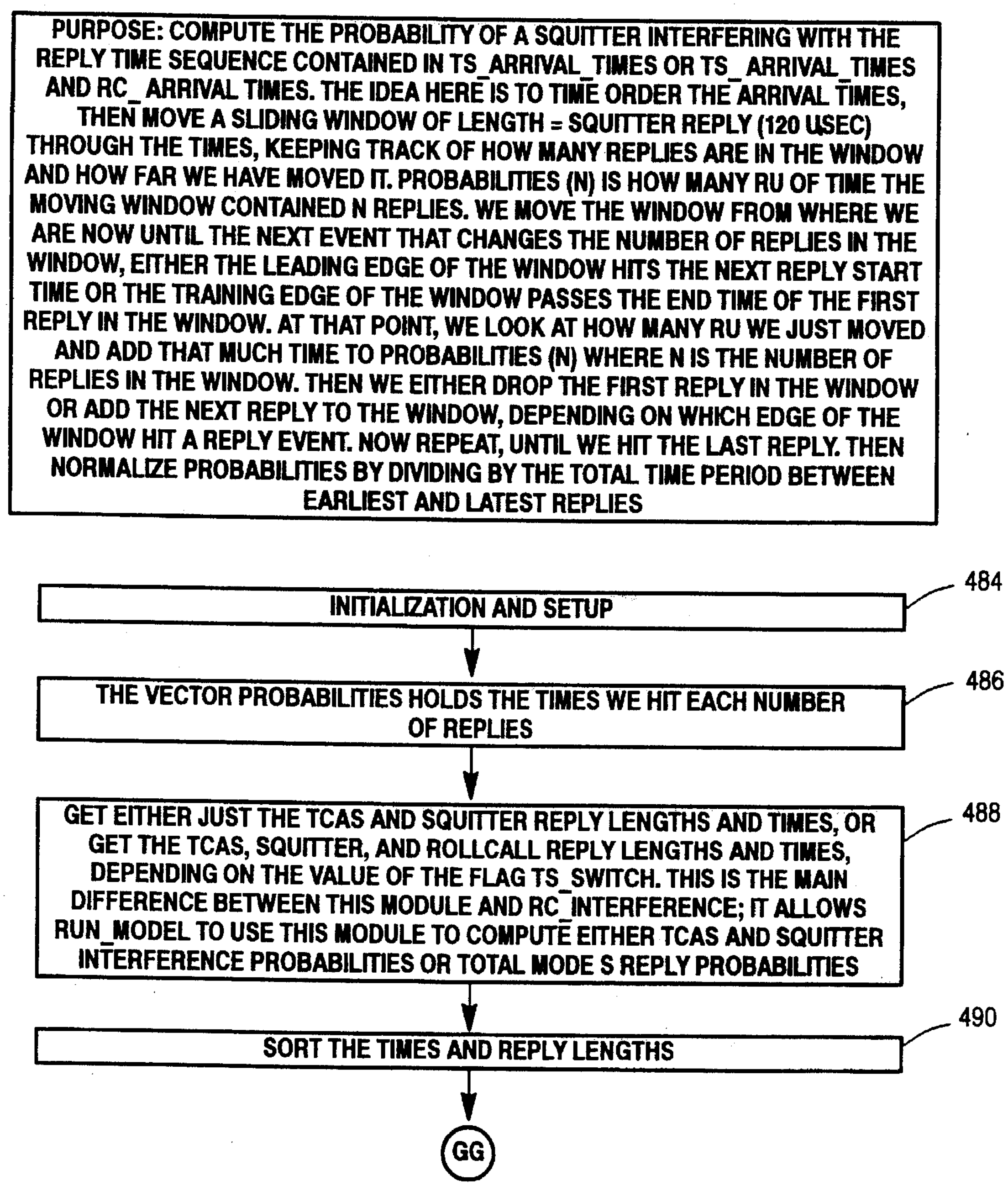
Figure 11B:
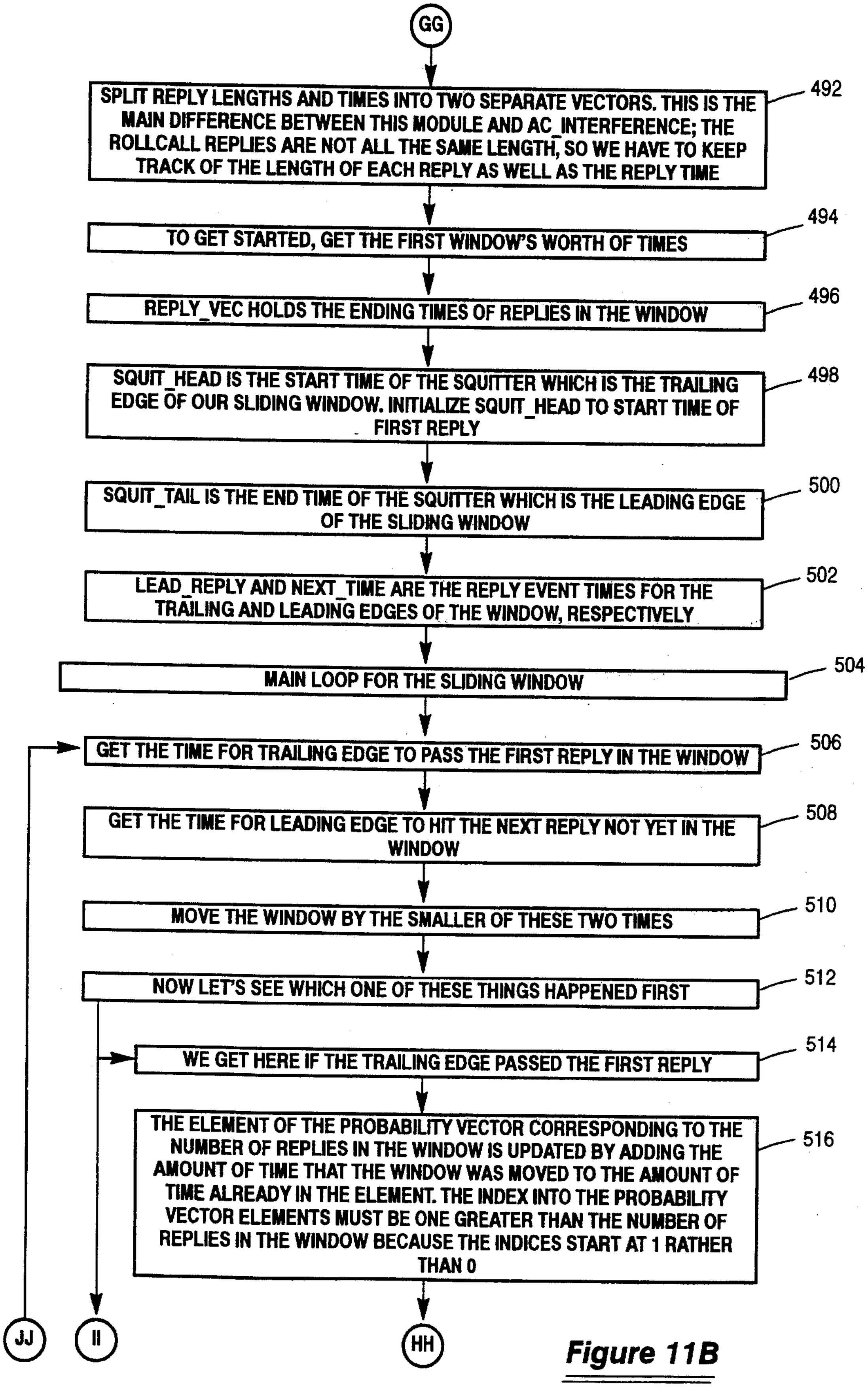
Figure 11C:
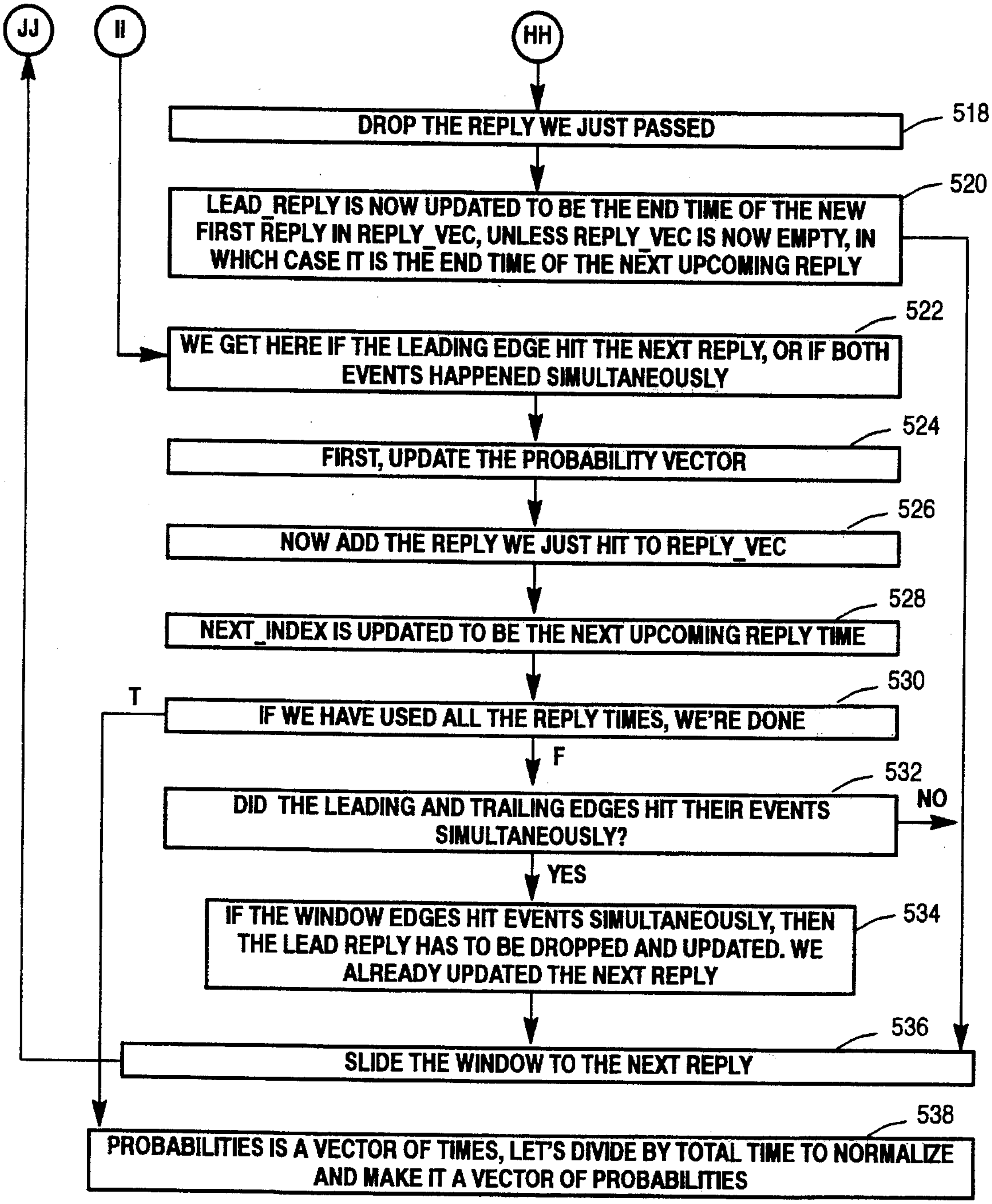
Figure 11:
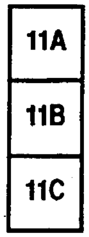

FIG. 11, which is made up of FIGS. 11A, 11B and 11C, shows a flowchart for module 28. Module 28 is used at step 58 of FIG. 2. Module 28 determines the probability of a squitter interfering with the reply time sequence contained in variables ts_arrivals_times, or ts_arrival_times and rc_arrival_times. Module 28 time orders the arrival times, then moves a sliding window of length equal to 1 squitter reply (120 usec) through the arrival times, keeping track of how many replies are in the window and how far the window has been moved. Vector probabilities [n] is how many ru of time the moving window contained n replies. The window is moved from one location until the next event that changes the number of replies in the window; either the leading edge of the window encounters the next reply start time, or the trailing edge of the window passes the end time of the first reply in the window. At that point, when the number of replies in the window changes, it is determined how many ru the window is moved from its previously recorded position, and that amount of time is added to vector probabilities [n] where n is the number of replies in the window. Next, either the first reply in the window is dropped, or the next reply is added to the window, depending on which edge of the window encountered a reply event. The above process of sliding and stopping the window is then repeated until the last reply is encountered. The probabilities are then normalized by dividing them by the total time period between the earliest and latest replies. In FIG. 11, initialization and setup (step 484) is accomplished by steps 486–502 in succession. Step 486 defines the vector probabilities as holding the times that each number of replies is encountered. Step 488 obtains either just the TCAS and squitter reply lengths and times, or obtains the TCAS, squitter and rollcall reply lengths and times, depending on the value of the flag ts_switch. This is the main difference between Module 28 and Module 24; this difference allows Module 12 to use Module 28 to determine either TCAS and squitter interference probabilities or total Mode S reply probabilities. Step 490 sorts the times and reply lengths. Step 492 splits reply lengths and times into two separate vectors. This is the main difference between module 28 and module 20; the rollcall replies are not all the same length, so module 28 keeps track of the length of each reply as well as the reply time. To get started, step 494 obtains the first window's worth of times. Step 496 defines variable reply_vec as holding the ending times of replies in the window. Step 498 defines variable squit_head as the start time of the squitter which is the trailing edge of our sliding window. Step 498 also initializes variable squit_head to the start time of the first reply. Step 500 defines variable squit_tail as the end time of the squitter which is the leading edge of the sliding window. Step 502 defines variable lead_reply and variable next_time as the reply event times for the trailing and leading edges of the window, respectively.

After steps 484–502, the main loop is entered at step 504. The main loop includes steps 506–536. Step 506 obtains the time for the trailing edge of the window to pass the first reply in the window. Step 508 obtains the time for the leading edge of the window to hit the next reply not yet in the window. Step 510 moves the window by the smaller of the two times of steps 506 and 508. Next, at step 512 it is determined which of the two events of steps 506 and 508 happen first; step 514 or step 522 will follow step 512. Step 514 is reached if the trailing edge passed the first reply, and is followed by steps 516, 518, 520 and 536. Step 516 updates the probability vector similarly to step 250. Step 518 drops the reply that just has been passed. Step 520 updates variable read_reply to be the end time of the new first reply in variable reply_vec, unless reply_vec is now empty, in which case lead_reply is updated to be the end time of the next upcoming reply. After step 520, the process moves to step 536 at which the window is slid to the next reply, after which the process returns to step 506. Step 522 is reached instead of step 514 if the leading edge encountered the next reply, or if the leading edge encountered the next reply simultaneously with the trailing edge passing the first reply. Step 522 is followed by steps 524–530 in succession. Step 524 updates the probability vector. Step 526 adds the reply that just been encountered to variable reply_vec. Step 528 updates variable next_index to be the next upcoming reply time. At step 530, it is determined whether all of the reply times have been used; if so, the main loop is exited by having the process moved to step 538, otherwise the process moves to step 532. At step 532 it is determined whether the leading and trailing edges of the window encountered their respective events simultaneously, if not, then the process moves to step 536 where the window is slid to the next reply, after which the process returns to step 506. If step 532 finds that the leading and trailing edges of the window encountered their respective events simultaneously, then at step 534 the lead reply is dropped and updated, the next reply having already been updated. After step 534, the process moves to step 536 which slides the window to the next reply, after which the process goes to step 506. At step 538, the probabilities vector, being a vector of times, is divided by total time to normalize its values and to make it a vector of probabilities.

Figure 12A:
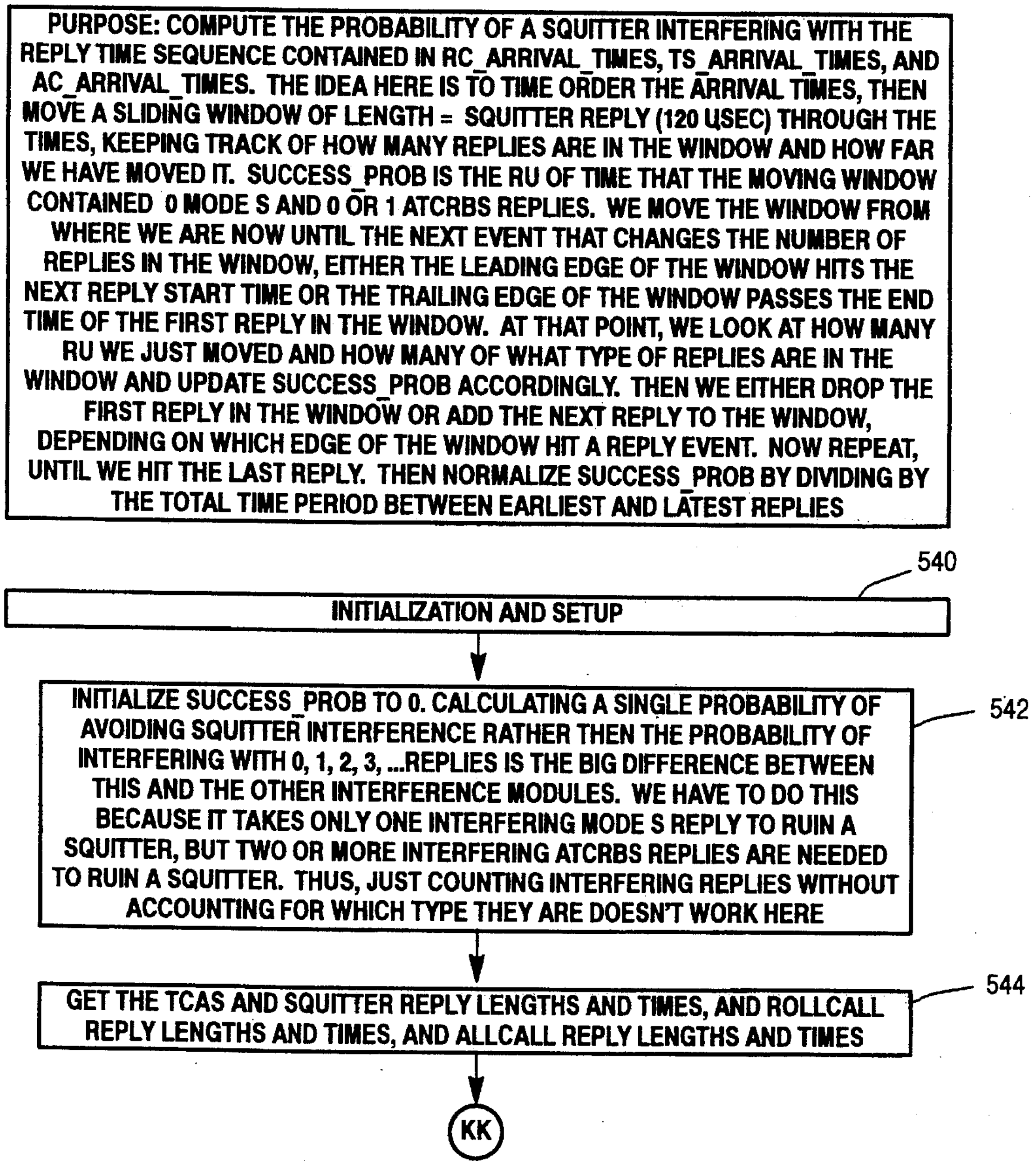
Figure 12B:
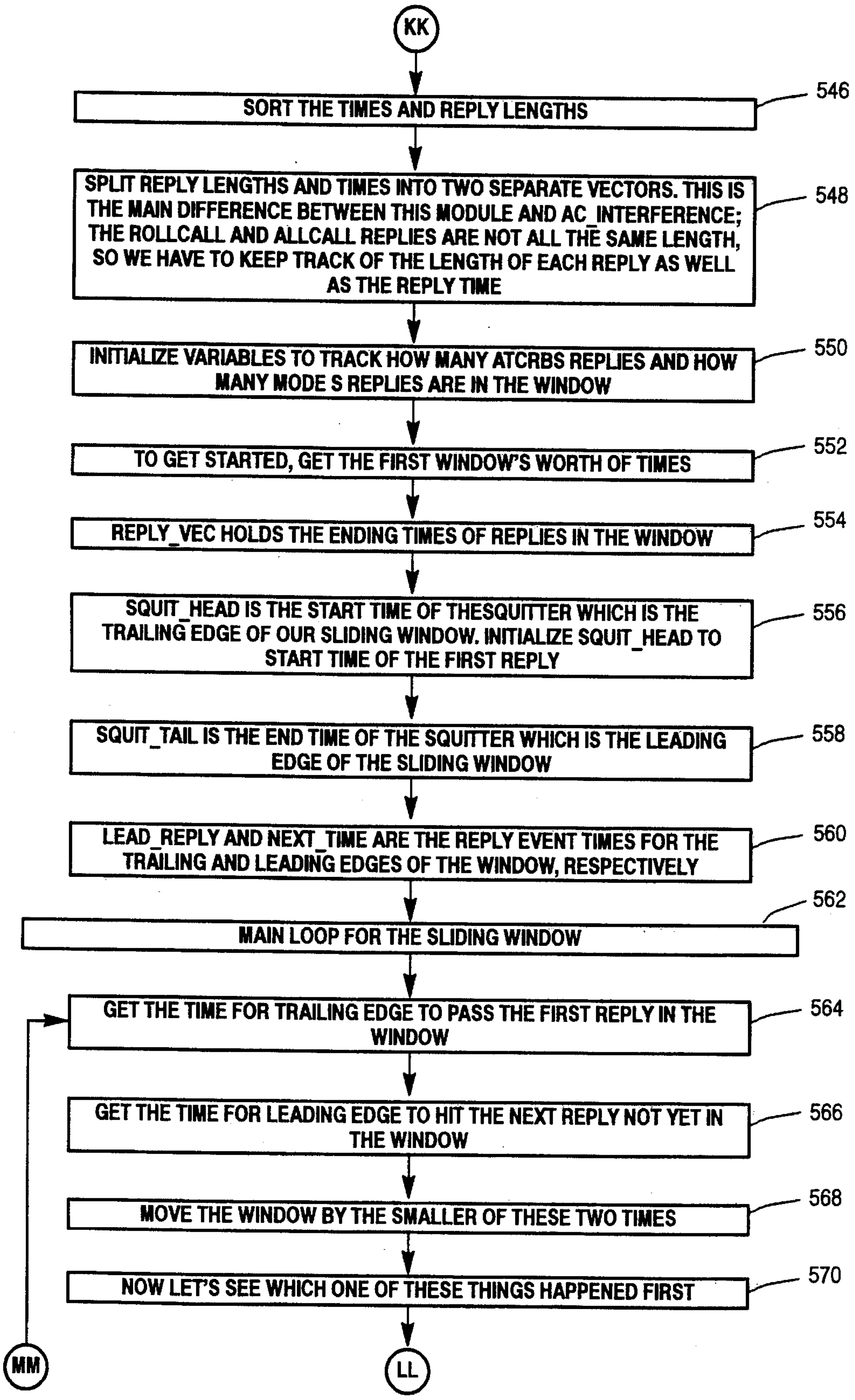
Figure 12C:
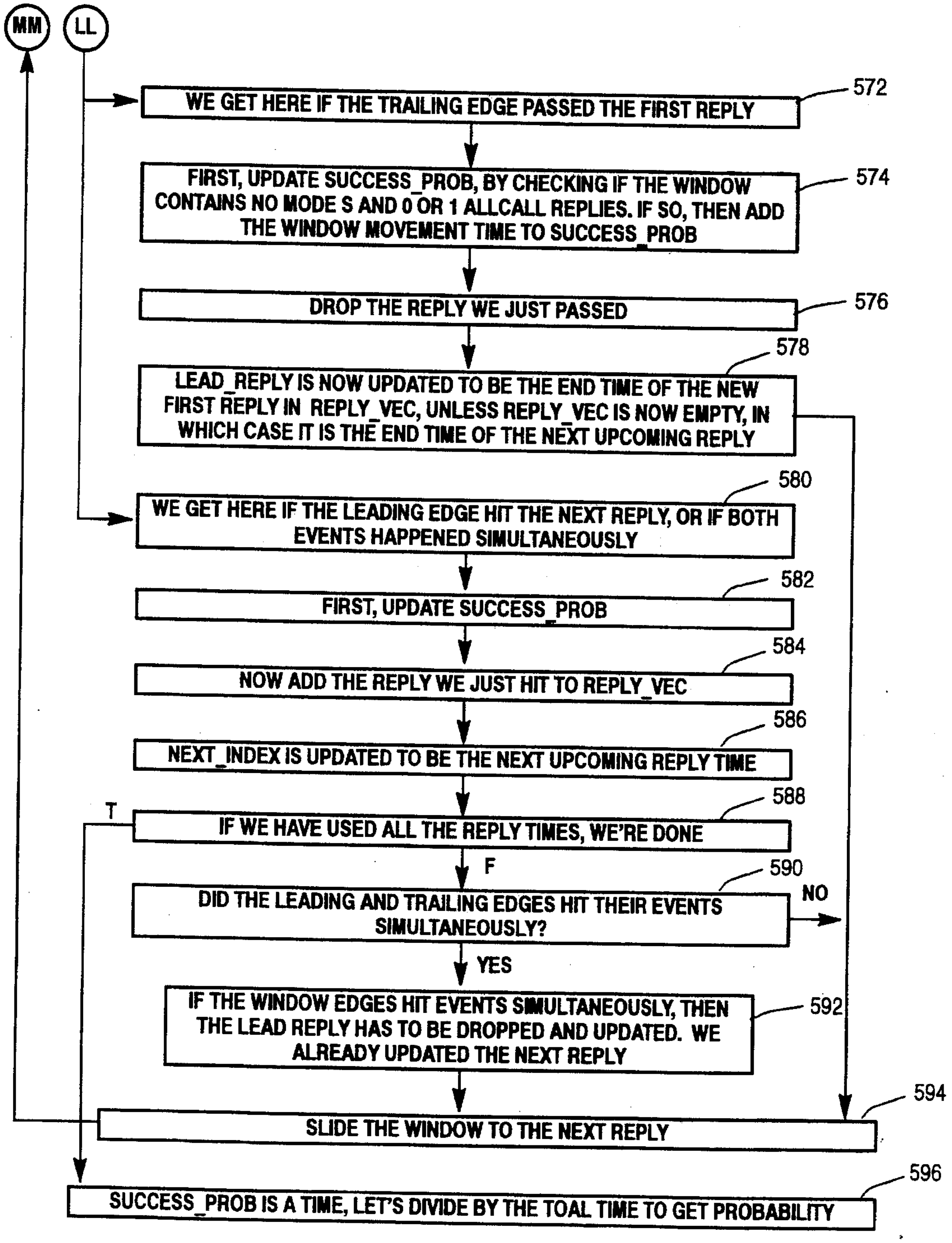
Figure 12:

FIG. 12, which is made up of FIGS. 12A, 12B and 12C, shows a flowchart for module 29 of FIG. 1. Module 29 is used at step 60 of FIG. 2. Module 29 determines the probability of a squitter interfering with a reply time sequence contained in variables rc_arrival_times, ts_arrival_times, and ac_arrival_times. Module 29 time orders the arrival times, and then moves a sliding window of length equal to one squitter reply (120 microseconds) through the times, keeping track of how many replies are in the window and how far that window has been moved. Variable success_prob is the ru of time that moving window contained 0 Mode S and 0 or 1 ATCRBS replies. The window is moved from one position until the next event that changes the number of replies in the window; either the leading edge of the window encounters the next reply start time, or the trailing edge of the window passes the end time of the first reply in the window. At that point, it is determined how many ru the window has just been moved and how many of what type of replies are in the window; variable success_prob is then updated accordingly. Next, either the first reply in the window is dropped from the window, or the next reply is added to window, depending on which edge (leading or trailing) of the window encountered a reply event. The above process is then repeated, until the last reply is encountered. Variable success_prob is then normalized by dividing it by the total time period between the earliest and latest replies considered by this process. Initialization and setup step 540 of FIG. 12A is accomplished by step 542–560 in succession. Step 542 initializes variable success_prob to 0. An important difference of module 29 from interference modules 20, 24 and 28 is that module 29 determines a single probability of avoiding squitter interference rather than the probability of interfering with 0, 1, 2, 3, . . . replies. Module 29 does this because it takes only one interfering Mode S reply to ruin a squitter reply, but two or more interfering ATCRBS replies are needed to ruin a squitter. Thus, just counting interfering replies without accounting for which type they are would be insufficient. Step 544 obtains the TCAS and squitter reply lengths and times, and rollcall reply lengths and times, and allcall reply lengths and times. Step 546 sorts the times and reply lengths of step 544. Step 548 splits the reply length and times into separate vectors. This is the main difference between module 29 and module 20; the rollcall and allcall replies are not all the same length, so it is necessary to keep track of the length of each reply as well as the reply time. Step 550 initializes variables to track how many ATCRBS replies and how many Mode S replies are in the window. To get started, step 552 obtains the first window's worth of times. Step 554 defines variable reply_vec as holding the ending times of replies in the window. Step 556 defines variable squit_head as the start time of the squitter which is the trailing edge of the sliding window. Step 556 also initializes variable squit_head to the start time of the first reply. Step 558 defines variable squit_tail as the end time of the squitter which is the leading edge of the sliding window. Step 560 defines variables lead_reply and next_time as the reply event times for the trailing and leading edges of the window, respectively. After steps 540–560, the main loop for the sliding window is entered (step 562). The main loop for the sliding window includes steps 564–594. Step 564 obtains the time for the trailing edge of the window to pass the first reply in the window. Step 566 obtains the time for the leading edge of the window to encounter the next reply not yet in the window. Step 568 moves the window by the smaller of the two times of steps 564 and 566. Step 570 determines which of the two events of steps 564 and 566 happened first. The process moves from step 570 to step 572 or step 580. Step 572 is reached from step 570 if the trailing edge of the window passes the first reply in the window. Step 572 is followed by steps 574, 576, 578 and 594, in succession. Step 574 updates variable success_prob, by checking if the window contains no Mode S and 0 or 1 allcall replies; if so, then the window movement time is added to variable success_prob. Step 576 drops the reply that has just been passed by the window. Step 578 updates variable lead_reply to be the end time of the new first reply in variable reply_vec, unless reply_vec is now empty, in which case variable lead_reply is instead updated to be the end time of the next upcoming reply. After step 578, the process moves to step 594, which slides the window to the next reply, after which the process returns to step 564. Step 580 would be reached instead of step 572 from step 570 if the leading edge of the window encounters the next reply, or if the leading edge hits the next reply and the trailing edge passes the first reply simultaneously. Step 580 is followed by steps 582, 584, 586 and 588 in succession. Step 582 updates variable success_prob. Step 584 adds to variable reply_vec the reply that has just been encountered by the leading edge of the sliding window. Step 586 updates variable next_index to be the next upcoming reply time. Step 588 determines whether all of the reply times have now been used; if so, then the main loop is exited and the process moves to step 596, otherwise the process moves to step 590. Step 590 determines whether the leading and trailing edges of the sliding window encountered their respective events simultaneously; if so, then the process moves to step 592, otherwise the process moves to step 594. At step 592, the lead reply is dropped and updated, the next reply having been already updated. From step 592 the process goes to step 594. Step 594 slides the window to the next reply, after which the process returns to step 564 for another pass through the main loop. Since the variable success_prob is time, at step 596 it is divided by total time to get probability.

Figure 13A:
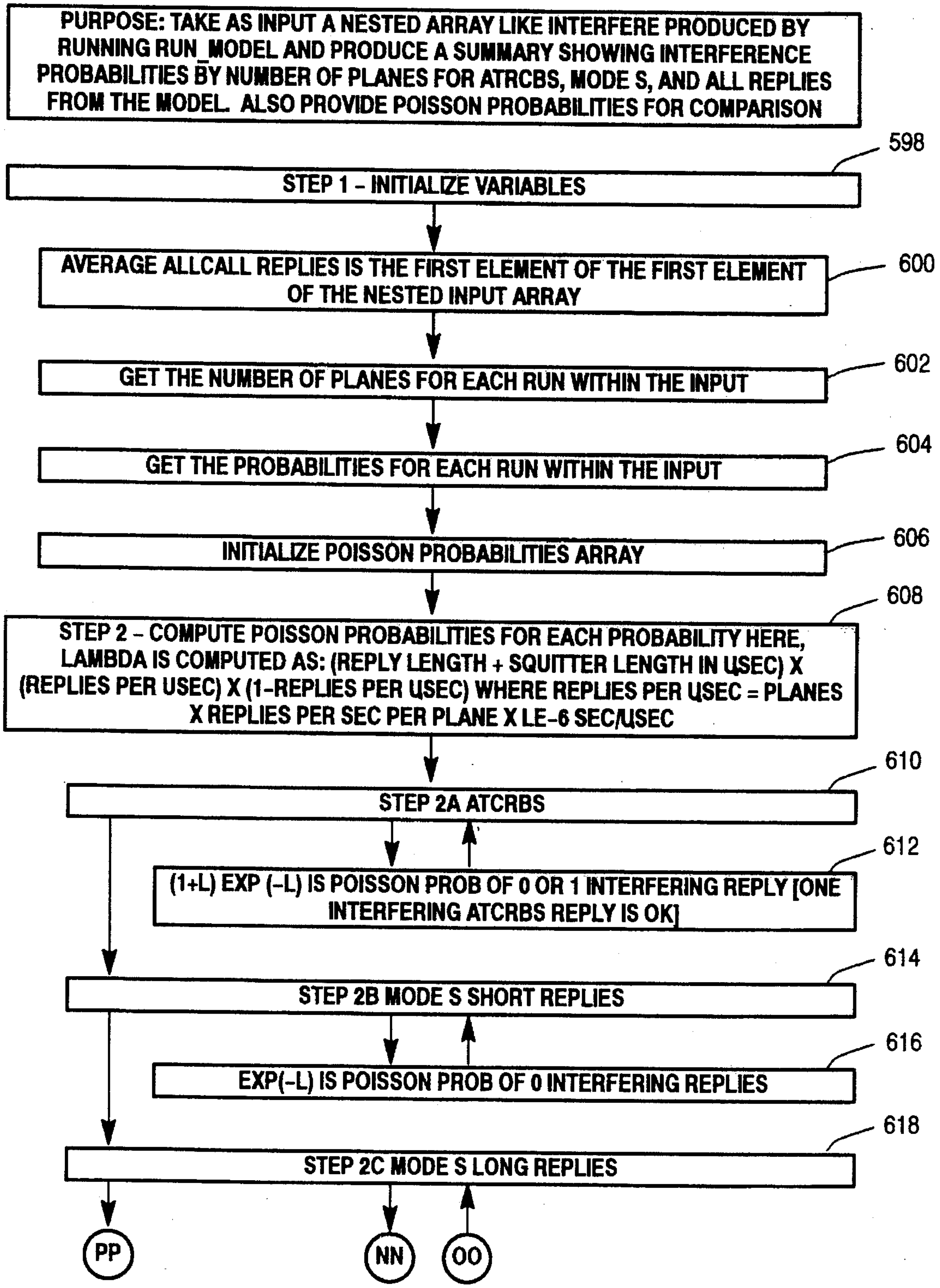

FIG. 13, made up of FIGS. 13A and 13B, is a flowchart for summary module 30 of FIG. 1. Summary module 30 is used at step 66 of FIG. 2. Summary module 30 takes a matrix or nested array showing signal interference produced by running module 12, and produces a summary showing interference probabilities by numbers of airplanes for ATRCBS replies, Mode S replies, and total replies from the model. Module 30 also provides Poisson probabilities for comparison. Module 30 begins by initializing variables (step 598), which is accomplished by step 600, 602, 604 and 606 successively. Step 600 defines average allcall replies as the first element of the nested input array. Step 602 obtains the number of airplanes for each run within that input array. Step 604 obtains the probabilities for each run within the input array. Step 606 initializes a Poisson probabilities array. After step 598–606, the Poisson probabilities are determined (step 608) using step 610–626. For this purpose, for each probability, lambda is computed as: (reply length+squitter length in microsecond)×(replies per microsecond)×(1-replies per microsecond) where replies per microsecond is equal to number of airplanes×replies per second per airplane×$10^{-6}$ seconds per microsecond. Poisson probabilities are determined for ATCRBS replies using steps 610 and 612. At step 612, (1+lambda) exp(−lambda)is Poisson probability of 0 or 1 interfering reply; presence of one interfering ATCRBS reply is acceptable. Poisson probabilities for Mode S short replies are determined using steps 614 and 616. At step 616, exp(−lambda) is determined and is used as the Poisson probability for 0 interfering replies. The Poisson probability for Mode S long replies are determined by Steps 618, 620 and 622. At step 620, exp (−lambda) is determined and is defined as a Poisson probability of 0 interfering replies. Next, at step 622, the value of step 620 is multiplied by the short reply probabilities determined at steps 616 to obtain (assuming independence) the total Mode S reply probability. The overall probability is then determined using steps 624 and 626. Assuming independence, step 626 defines the overall probability as the product of the ATCRBS probability (steps 610 and 612) and the total Mode S reply probability (step 622). Next, step 628 assembles the output array using the results of the preceding steps. This is accomplished using steps 630, 632 and 634 in succession. Steps 630 makes airplanes the first column of the output array. Step 632 adds simulation and Poisson probabilities to the array. Step 634 adds column headings. Thus, module 30 uses the probabilities determined by steps 32–64 of FIG. 2, and furthermore provides Poisson results for comparison therewith.

In the simulation model, a population of Mode S aircraft is distributed in the sky surrounding a receiving antenna. A set of interrogators is positioned in the surrounding areas. The behavior of the interrogators is defined by a set of parameters: are they ATCRBS/Mode S or ATCRBS only interrogators, interrogation frame pattern, antenna rotation rate and beamwidth, boresight azimuth and location in the frame pattern at the start of the simulation.

The model is modular in design. There are separate modules to simulate ATCRBS interrogations and replies, Mode S RollCall interrogations and replies, and TCAS and squitter replies. Other modules use this reply data to compute an estimate of the probability of an ADS squitter arriving at the receiving antenna being interfered with by a reply.

Parameter values used for the model runs are based on current Mode S system parameters and on the message workloads in Table 1 of the Knittel and Orlando paper.

Table 1 below compares simulation results with the analytic results from Table 2 of the Knittel and Orlando paper. Six sector antenna estimates are simply the omni antenna estimates multiplied by 2.5, the empirical improvement factor based on experience used by Knittel and Orlando. They are provided for comparison purposes only; note that the high degree of variation in the simulation results, discussed further below, makes it dangerous to extrapolate in this fashion.

approximately 120. Also observe within each second, the wide spread in replies per plane from minimum to maximum.

This variability is due to the natural variation in the number of interrogations seen by the population of planes in any given second, as the rotating antennas of the various remote interrogators sweep into and out of the receiving antenna's area of coverage.

The Mode S Frequency Space Model provides a method of answering the question, how many aircraft can co-exist in a given region of the sky before interference effects cause ADS-Mode S operation to fall below acceptable levels. There are a wide variety of input conditions which the answer depends on, such as the number of ground interrogators, ATCRBS interrogation rates, location of aircraft in the sky, Mode S message workloads, TCAS squitter rates, receiver antenna characteristics, etc. The model allows the user to specify these input conditions and simulate ATCRBS, Mode S, TCAS, and ADS-Mode S operation for some period of time, and then evaluate the probability of successful reception of a GPS squitter pulse by the receiving antenna. By making model runs under varying initial conditions, estimates are obtained of the number of aircraft that can successfully be tracked using ADS-Mode S, as a function of ATCRBS, Mode S, and TCAS workload.

The Mode S Frequency Space model is a simulation model developed in the APL programming language, specifically, APL*PLUS III for Windows by Manugistics, Inc. In the simulation model, a population of Mode S aircraft is distributed in the sky surrounding a receiving antenna. A set of interrogators is positioned in the surrounding areas. The

TABLE 1

ADS-Mode S 5 Second Update with 99.5% Reception Probability

| | | | Maximum Aircraft | | | |
|---|---|---|---|---|---|---|
| | | | Original Analytic Estimate | | Simulation Results | |
| | Replies/Aircraft/Second | | Omni | Six Sector | Omni | Six Sector |
| Case | ATCRBS | Mode S | Antenna | Antenna | Antenna | Antenna* |
| 1 | 120 | 14 | 85 | 215 | 110 | 275 |
| 2 | 60 | 14 | 140 | 350 | 170 | 425 |
| 3 | 0 | 14 | 280 | 700 | 300 | 750 |

*These values are for comparison purposes only.

Figure 14:
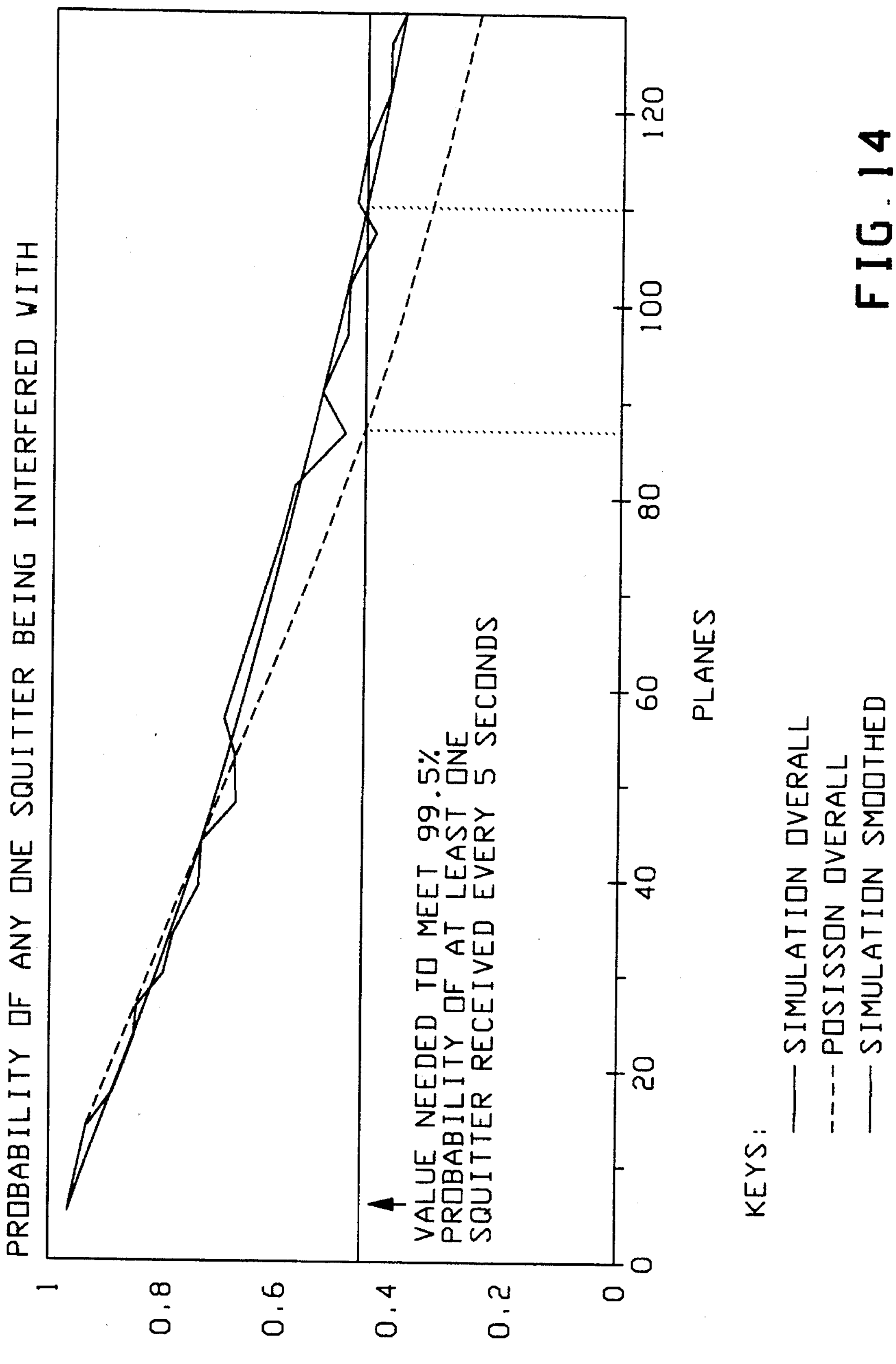
FIG. 14 compares results for the system of FIG. 1 and the Knittel and Orlando paper.

The analytic and simulation results are also plotted graphically versus number of planes for Case 1 of the table, in FIG. 14. The smoothed simulation values are an exponential least squares fit to the simulation results, of the form $y=Ae^{Bx}$. This smoothing agrees well with the average of multiple model runs made at the same plane and message loading conditions.

Figure 15:
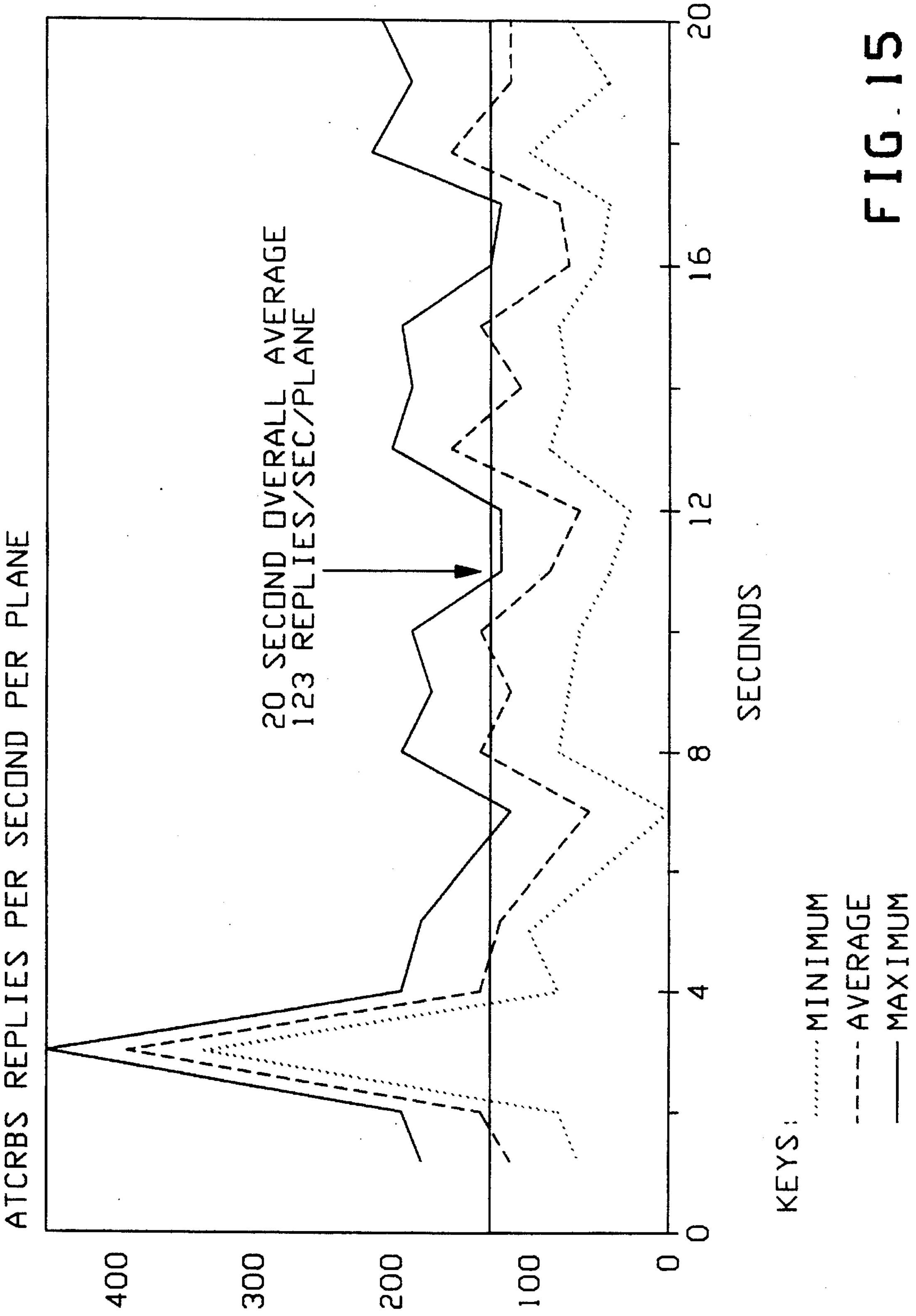
FIG. 15 shows another example of results for the system of FIG. 1.

Another result of the simulation runs was to bring out the extreme variability in the results on both a per plane and a per second basis. FIG. 15 illustrates this.

FIG. 15 reflects the result of a 20 second run made for a population of 110 planes at a nominal rate of 120 ATCRBS messages per second. Statistics were gathered on a per second basis every second. Just the ATCRBS message statistics are shown for simplicity. Observe the extreme variation in the average number of ATCRBS replies per plane from second to second (which is reflected in the squitter interference probability), varying from a low of 54 to a high of 400, even though the overall average is behavior of the interrogators is defined by a set of parameters: are they ATCRBS/Mode S or ATCRBS only interrogators, interrogation frame pattern, antenna rotation rate and beamwidth, boresight azimuth and location in the frame pattern at the start of the simulation. The model then makes a series of runs with these interrogators, continually increasing the size of the aircraft population until the interference limit is reached.

The processes of FIGS. 3–13 can be implemented in software. An example of such software is given in subsequent pages in the APL software programming language, specifically APL*PLUS III for windows by Manugistics, Inc. The names of the modules shown in the following code correspond to the module names shown in FIGS. 1–13. An example of such software, in the language described above, is given in the following pages. APL code listings of the model are provided below.

MODE S FREQUENCY MODEL

```
∇ RUN_MODEL INIT_SEED;PASSCOUNT;COUNT;SEED;GLOBAL_INFO
  ⍝
  ⍝ EMANUEL RINGEL 3/94
  ⍝
  ⍝ RUN THE ADS-MODE S REPLY INTERFERENCE MODEL.
  ⍝ CALL THE ALLCALL, ROLLCALL, AND TCAS/SQUITTER MODELS AND
  ⍝ ACCUMULATE THE STATISTICS.  CALCULATE AN OVERALL ESTIMATE OF
  ⍝ THE PROBABILITY OF A SQUITTER BEING INTERFERED WITH
  ⍝
  ⍝ INITIALIZE
  ⎕WGIVE 8000
  ⎕RL←INIT_SEED ⍝ SET THE RANDOM LINK TO THE INITIAL SEED
  ALL_CALL_AVG←120 ⍝ AVERAGE NUMBER OF ALLCALL REPLIES PER PLANE
  GLOBAL_INFO← ⊂ALL_CALL_AVG (⎕VR 'GLOBALS') ⍝ SAVE THE ALL CALL AVG AND THE
  ⍝                                             SETTINGS IN THE FUNCTION GLOE
     ALS
  STATISTICS← 11 6 ⍴0 ⍝ INITIALIZE THE STATISTICS ARRAY.
  STATISTICS[;1]← '' 'PLANES' 'SENSORS' 'REPLIES' 'AVG REP/PLANE' 'MIN REP/P
     LANE' 'MAX REP/PLANE' 'P[0]' 'P[1]' 'TOTAL P' '[]RL'
  STATISTICS[1;]← '' 'ALLCALL' 'ROLLCALL' 'TCAS/SQUIT' 'TOTAL MODE S' 'TOTAL
     '
  ⍝ THERE ARE 4 COLUMNS:  ALLCALL, ROLLCALL, TCAS/SQUITTER,
  ⍝ ROLLCALL AND TCAS/SQUITTER (IE ALL MODE S STUFF) COMBINED,
  ⍝ AND OVERALL.
  ⍝ IN EACH COLUMN, WE HAVE:
  ⍝    NUMBER OF PLANES
  ⍝    NUMBER OF SENSORS
  ⍝    NUMBER OF REPLIES
  ⍝    AVERAGE REPLIES PER PLANE
  ⍝    MINIMUM REPLIES PER PLANE
  ⍝    MAXIMUM REPLIES PER PLANE
  ⍝    PROBABILITY OF A LONG SQUITTER INTERFERING WITH 0 REPLIES
  ⍝    PROBABILITY OF A LONG SQUITTER INTERFERING WITH 1 REPLY
  ⍝    OVERALL PROBABILITY OF A LONG SQUITTER BEING INTERFERED WITH
  ⍝    VALUE OF RANDOM SEED AT START OF THE MODEL
  ⍝ ADDITIONALLY, THERE IS A COLUMN AND ROW FOR LABELS
  ⍝
  HOW_MANY_PLANES←0
  INTERFERE←,GLOBAL_INFO ⍝ STORE GLOBAL INITIAL CONDITIONS IN THE OUTPUT VEC
     TOR
  ⍝ STEP 0  -  OUTER LOOP
  MASTER_LOOP:
  HOW_MANY_PLANES←HOW_MANY_PLANES+5
  ⍝
  ⍝ STEP 1 - CALL ALLCALL MODEL
  ⍝ NEEDS TO BE CALLED REPEATEDLY UNTIL A RUN WITH THE RIGHT NUMBER
  ⍝ OF ALLCALLS PER PLANE IS OBTAINED
  TRY_AGAIN:
  PASSCOUNT←1
  AC_LOOP:
  SEED←⎕RL
  MAIN_AC
  →(((0.85×ALL_CALL_AVG)≤AVG)∧AVG≤1.15×ALL_CALL_AVG)/SKIP_AC
  PASSCOUNT←PASSCOUNT+1
  →(PASSCOUNT≤17)/AC_LOOP
  SKIP_AC:
  AC_INTERFERENCE ⍝ MOVE THIS HERE FROM MAIN_AC TO SAVE TIME
```

```
STATISTICS[1+ι10;2]←HOW_MANY_PLANES,NUM_ATCRBS,(¯1↑ρAC_ARRIVAL_TIMES),AVG,
   MIN,MAX,PROBABILITIES[1 2],(+/PROBABILITIES[1 2]),SEED
⍝
⍝ STEP 2 - CALL ROLLCALL MODEL
⍝ NEEDS TO BE CALLED REPEATEDLY UNTIL A RUN WITH THE RIGHT NUMBER
⍝ OF ROLLCALLS PER PLANE IS OBTAINED
PASSCOUNT←1
RC_LOOP:
SEED←⎕RL
MAIN_RC
→(((0.833×6)≤AVG)∧AVG≤1.1666×6)/SKIP_RC
PASSCOUNT←PASSCOUNT+1
→(PASSCOUNT≤6)/RC_LOOP
→(PASSCOUNT=7)/TRY_AGAIN ⍝ COULDN'T GET RIGHT ROLL-CALL NUMBER, REROLL THE
    DICE
SKIP_RC:
RC_INTERFERENCE ⍝ MOVE THIS HERE FROM MAIN_RC TO SAVE TIME
STATISTICS[1+ι10;3]←HOW_MANY_PLANES,NUM_MODE_S,(¯1↑ρRC_ARRIVAL_TIMES),AVG,
   MIN,MAX,PROBABILITIES[1 2 1],SEED
⍝
⍝ STEP 3 - CALL TCAS/SQUITTER MODEL
SEED←⎕RL
TCAS_SQUIT
TS_SWITCH←0 ⍝ DO TS_INTERFERENCE ONLY FOR TS ARRIVAL TIMES
TS_INTERFERENCE
STATISTICS[1+ι10;4]←HOW_MANY_PLANES,¯1,(¯1↑ρTS_ARRIVAL_TIMES),AVG,MIN,MAX,
   PROBABILITIES[1 2 1],SEED
⍝
⍝ STEP 4 - GET COMBINED MODE S STATS
SEED←¯1
TS_SWITCH←1 ⍝ DO TS_INTERFERENCE FOR TS AND RC ARRIVAL TIMES
TS_INTERFERENCE
STATISTICS[1+ι10;5]←HOW_MANY_PLANES,¯1,(+/STATISTICS[4 5;3 4]), ¯1 ¯1 ,PRO
   BABILITIES[1 2 1],SEED
⍝
⍝ STEP 5 - OVERALL STATISTICS
SEED←¯1
CB_INTERFERENCE
STATISTICS[1+ι10;6]←HOW_MANY_PLANES,¯1,(+/STATISTICS[4 5 ; 2 3 4]), ¯1 ¯1
   ¯1 ¯1, SUCCESS_PROB,SEED
⍝
⍝ STEP 6 - SAVE RESULTS
INTERFERE←INTERFERE,⊂STATISTICS
⎕SAVE 'ASTARC'
→(STATISTICS[10;6]>.41)/MASTER_LOOP
∇

∇ MAIN_AC;TIMESTEP;LOOPCOUNT;A;B;SENSOR;CHOOSE;MIN_ANGLE;MAX_ANGLE;LENGTH;OU
   T;CHOOSEVEC;TIMEVEC;TEMPVEC;PRINTSTRING
⍝ SIMULATE ALLCALL REPLY AC_ARRIVALS AT AN ANTENNA DUE TO INTERROGATIONS
⍝ BY REMOTE SENSORS
⍝
⍝ EMANUEL RINGEL  4/94
⍝
⍝
⍝ STEP 1  -  INITIALIZE VARIABLES
'ALLCALL REPLY MODEL'
```

```
[9]   ' '
[10]  'INITIALIZING'
[11]  GLOBALS ⍝ RUN THE PROGRAM 'GLOBALS' TO INITIALIZE GLOBAL VARIABLES
[12]  AC_ARRIVALS← 2 1 ⍴0 ⍝ FOR EACH REPLY, RECORD PLANE AND INTERROGATING SENSO
        R
[13]  AC_ARRIVAL_TIMES←⍬ ⍝ INITIALIZE ARRIVAL TIME VECTOR
[14]  CHOOSEVEC←⍳NUM_PLANES ⍝ USED IN MAIN LOOP TO GET PLANE NUMBERS
[15]  PRINTSTRING←⎕TCNL,(1024⍴⎕TCBS),'          ',10⍴⎕TCBS ⍝ FOR SCREEN OUTPUT W
        ITH ⍞
[16]  ⍝
[17]  ⍝ STEP 2  -  GENERATE POPULATION OF PLANES AND OF REMOTE SENSORS
[18]  'CREATE POPULATION OF PLANES AND REMOTE SENSORS'
[19]  MATRIX←(NUM_PLANES,2)⍴0
[20]  ⍝ FIRST COLUMN OF MATRIX WILL HAVE PLANE RANGES UNIFORMLY DISTRIBUTED
[21]  MATRIX[;1]←?NUM_PLANES⍴MAX_PLANE_RANGE
[22]  ⍝ SECOND COLUMN OF MATRIX WILL HAVE PLANE AZIMUTHS (AU)
[23]  ⍝ UNIFORMLY DISTRIBUTED FROM 0 TO 16383
[24]  MATRIX[;2]←?NUM_PLANES⍴MAX_AU
[25]  ⍝ MATRIX[;2]←?NUM_PLANES⍴⌈MAX_AU÷6
[26]  ⍝ SAVE THE ORIGINAL PLANE POSITIONS RELATIVE TO THE RECEIVING ANTENNA
[27]  POSITIONS←MATRIX
[28]  ⍝ NOW COPY MATRIX INTO 3 DIMENSIONS, ONE COPY FOR EACH REMOTE SENSOR
[29]  MATRIX←(NUM_REMOTES,NUM_PLANES,2)⍴MATRIX
[30]  ⍝ AT THIS POINT, EACH COPY OF MATRIX CONTAINS THE RHO-THETA
[31]  ⍝ COORDINATES OF THE PLANE RELATIVE TO THE RECEIVING ANTENNA.
[32]  ⍝ LATER, THESE WILL BE REPLACED WITH COORDINATE INFO RELATIVE
[33]  ⍝ TO EACH REMOTE SENSOR
[34]  SENSORS←(NUM_REMOTES,5)⍴0
[35]  ⍝ COLS 1 AND 2 ARE THE A AND B FOR LOCATION OF REMOTE SENSORS
[36]  ⍝ LIKE IN FAA-E-2716 3.4.8.8.5
[37]  SENSORS[;1]←(-MAX_REMOTE_RANGE)+?NUM_REMOTES⍴2×MAX_REMOTE_RANGE
[38]  SENSORS[;2]←(-MAX_REMOTE_RANGE)+?NUM_REMOTES⍴2×MAX_REMOTE_RANGE
[39]  ⍝ COL 5 IS THE INTERROGATION FREQUENCY OF THE REMOTE SENSOR
[40]  SENSORS[;5]←AVG_FREQ+(-⌊FREQ_RNG÷2)+?NUM_REMOTES⍴FREQ_RNG+1
[41]  ⍝ IF THE COLOCATION PARAMETER IS SET TO 1, FORCE REMOTE SENSOR
[42]  ⍝ NUMBER 1 TO BE LOCATED AT OFFSET 0,0 IE COLOCATED WITH RECEIVER
[43]  ⍎(COLOCATE=1)/'SENSORS[1;1 2]←0 0'
[44]  ⍝ FORCE THE MODE S SENSORS TO HAVE AN 8 MS INTERROGATION FREQ
[45]  SENSORS[⍳NUM_MODE_S;5]←128000
[46]  ⍝ COL 3 IS THE TIME THAT THE NEXT INTERROGATION IS DUE FOR
[47]  ⍝ THIS SENSOR.  IE, AT TIME ZERO ALL THE REMOTES ARE NOT STARTING WITH
[48]  ⍝ AN INTERROGATION, THEY ARE NOT SYNCHRONIZED.
[49]  ⍝ TO GET OUR FULL RUNTIME, HOWEVER, WE WILL NORMALIZE THE FIRST
[50]  ⍝ INTERROGATION TIMES SO THAT THE EARLIEST OCCURS AT THE START OF THE RUN
[51]  SENSORS[;3]←?SENSORS[;5]
[52]  SENSORS[;3]←SENSORS[;3]-⌊/SENSORS[;3]
[53]  FIRST_AC_INTER←SENSORS[;3] ⍝ SAVE THESE TIMES FOR USE BY MAIN_RC
[54]  ⍝ COL 4 IS THE STARTING AZIMUTH OF THE REMOTE SENSOR
[55]  SENSORS[;4]←?NUM_REMOTES⍴MAX_AU
[56]  ⍝
[57]  ⍝ STEP 3  -  CALCULATE AIRPLANE COORDINATES
[58]  ⍝ CONVERT THE RHO THETA COORDINATES OF THE PLANES INTO LOCAL
[59]  ⍝ COORDINATES RELATIVE TO EACH SENSOR, USING THE EQUATIONS OF
[60]  ⍝ FAA-E-2716 3.4.8.8.5.  HERE, EACH REMOTE SENSOR PLAYS THE ROLE
[61]  ⍝ OF LOCAL SENSOR IN 2716.  m, s, AND BETA IN 2716 ARE TAKEN TO
[62]  ⍝ BE ZERO FOR SIMPLICITY, SINCE ALL LOCATIONS ARE RANDOM ANYWAY.
[63]  'CALCULATE REMOTE SENSOR AIRPLANE RHO-THETA COORDINATES'
```

```
LOOPCOUNT←0
COORD_LOOP:LOOPCOUNT←LOOPCOUNT+1
⍝ A = a + ρ SIN θ
A←SENSORS[LOOPCOUNT;1]+MATRIX[LOOPCOUNT;;1]×1○MATRIX[LOOPCOUNT;;2]×(○2)÷MA
   X_AU
⍝ B = b + ρ COS θ
B←SENSORS[LOOPCOUNT;2]+MATRIX[LOOPCOUNT;;1]×2○MATRIX[LOOPCOUNT;;2]×(○2)÷MA
   X_AU
⍝ NOW COMPUTE THE ANGLE RELATIVE TO THE REMOTE SENSOR AND STORE IT
MATRIX[LOOPCOUNT;;2]←A ARCTAN B
⍝ COMPUTE THE RANGE RELATIVE TO THE REMOTE SENSOR, ADD TO IT THE
⍝ ATCRBS TURNAROUND DELAY AND THE RANGE TO THE RECEIVING ANTENNA TO GET
⍝ THE TIME THAT A REPLY ARRIVES AT THE RECEIVER AFTER AN INTERROGATION
⍝ FROM THIS REMOTE SENSOR
MATRIX[LOOPCOUNT;;1]←MATRIX[LOOPCOUNT;;1]+48+⌈((A×A)+B×B)*0.5
→(LOOPCOUNT<NUM_REMOTES)/COORD_LOOP
⍝
⍝ STEP 4  -  NOW WE DO THE WORK
→(NUM_ATCRBS=0)/NO_ATCRBS ⍝ HANDLE SPECIAL CASE OF MODE S ONLY
'SIMULATE AN INTERVAL OF ',(⍕MAX_TIME),' RU'
OUT←0
TIMEVEC←SENSORS[⍳NUM_ATCRBS;3] ⍝ WORK WITH THE ATCRBS INTERROGATORS
⍝ START_TIME HOLDS THE START TIME OF THE FIRST INTERROGATION
START_TIME←⌊/TIMEVEC
MAINLOOP:
⍝ COMPUTE TIME OF NEXT INTERROGATION BY A SENSOR
TIMESTEP←⌊/TIMEVEC ⍝ TIME OF NEXT INTERROGATION
OUT←OUT+1
⍎(0=15|OUT)/'⎕←''.'''
⍎(OUT≥150)/'⎕←(⍕TIMESTEP),PRINTSTRING⋄OUT←0'
→(TIMESTEP>MAX_TIME)/DONE
SENSOR←TIMEVEC⍳TIMESTEP ⍝ SENSOR CORRESPONDING TO THAT TIME
⍝ COMPUTE LEADING AND TRAILING EDGE OF SENSOR BEAM AT INT TIME
⍝ CORRECT FOR NORTHMARK IF NECESSARY
MIN_ANGLE←MAX_AU|SENSORS[SENSOR;4]+(⌈ROT_RATE×TIMESTEP)-HALF_BEAM
MAX_ANGLE←MAX_AU|MIN_ANGLE+2×HALF_BEAM
⍝ CHOOSE PLANES IN THE BEAM
TEMPVEC←MATRIX[SENSOR;;2]
CHOOSE←(TEMPVEC≤MAX_ANGLE)∧MIN_ANGLE≤TEMPVEC
⍝ SPECIAL CASE FOR BEAM STRADDLING NORTHMARK
 ⍎(MAX_ANGLE<MIN_ANGLE)/'CHOOSE←(TEMPVEC≤MAX_ANGLE)∨TEMPVEC≥MIN_ANGLE'
 →CHOOSE/UPDATE
 →NEXT
⍝ IF THERE ARE NO PLANES AFFECTED BY THIS INTERROGATION, MOVE ON
UPDATE:
 CHOOSE←,CHOOSE/CHOOSEVEC ⍝ GET PLANE INDICES
⍝ UPDATE REPLY INFO FOR THESE PLANES WITH SENSOR AND TIME
 AC_ARRIVAL_TIMES←AC_ARRIVAL_TIMES,TIMESTEP+MATRIX[SENSOR;CHOOSE;1]
 LENGTH←ρCHOOSE
 AC_ARRIVALS←AC_ARRIVALS,(2,LENGTH)ρCHOOSE,(LENGTHρSENSOR)
⍝ UPDATE THE NEXT INTERROGATION TIME FOR THIS PLANE
NEXT:
 TIMEVEC[SENSOR]←TIMESTEP+SENSORS[SENSOR;5]
 →MAINLOOP
⍝
⍝ STEP 5  -  COMPUTE PROBABILITY
DONE:
```

```
 SENSORS[⍳NUM_ATCRBS;3]←TIMEVEC
 RUN_TIME←MAX_TIME-START_TIME
 ⎕ERASE 'TIMEVEC TEMPVEC CHOOSE LENGTH'
 AC_ARRIVALS← 0 1 ↓AC_ARRIVALS ⍝ DROP THE '2 1⍴0' THAT WE USED TO
⍝                                  INITIALIZE AC_ARRIVALS
 ' '
 'COMPUTE STATISTICS'
 ⍝ AC_INTERFERENCE ⍝ CALL PROBABILITY SUBROUTINE - MOVED TO RUN_MODEL
 PROB0←PROBABILITIES[1]
 PROB1←PROBABILITIES[2]
⍝ COMPUTE MIN AND MAX REPLIES PER PLANE
 MAX←0
 MIN←¯1↑⍴AC_ARRIVALS
 LOOPCOUNT←0
REPLY_LOOP:LOOPCOUNT←LOOPCOUNT+1
 A←+/LOOPCOUNT=AC_ARRIVALS[1;]
 MIN←MIN⌊A
 MAX←MAX⌈A
 →(LOOPCOUNT<NUM_PLANES)/REPLY_LOOP
⍝
⍝ STEP 6  -  OUTPUT
OUTPUT: ⍝ NEED A LABEL IN CASE WE HAVE TO BRANCH TO HERE FROM THE SPECIAL
⍝          CASE OF NO ATCRBS INTERROGATIONS
 ' '
 'PARAMETER ECHO:'
 '==============='
 'NUMBER OF PLANES            ',⍕NUM_PLANES
 'RUN TIME                    ',(⍕MAX_TIME÷16000000),' SEC'
 'NUMBER OF INTERROGATORS     ',⍕NUM_ATCRBS
 '    ROTATION RATE           ',(1⍕MAX_AU÷ROT_RATE×16000000),' SEC'
 '    AVG ALLCALL RATE        ',(1⍕16000000÷AVG_FREQ),' PER SEC'
 '    BEAMWIDTH               ',(2⍕HALF_BEAM×2×360÷MAX_AU),' DEGREES'
 ' '
 'MODEL OUTPUT FOR THIS RUN:'
 '=========================='
 'NUMBER OF ALLCALL REPLIES         ',⍕¯1↑⍴AC_ARRIVALS
 'AVG REPLIES PER PLANE             ',1⍕AVG←(¯1↑⍴AC_ARRIVALS)÷NUM_PLANES
 'FEWEST REPLIES FROM A PLANE       ',⍕MIN
 'MOST REPLIES FROM A PLANE         ',⍕MAX
 ' '
 'PROBABILITY OF A LONG SQUITTER NOT BEING INTERFERED WITH BY ANY'
 'ALLCALL REPLIES                   ',4⍕PROB0
 'PROBABILITY OF A LONG SQUITTER BEING INTERFERED WITH BY AT MOST'
 'ONE ALLCALL REPLY                 ',4⍕PROB1+PROB0
 ⍝
 ⍝ STEP 7 - SPECIAL CASE OF MODE S ONLY (NO ATCRBS INTERROGATORS)
 →0 ⍝ IF WE REACH HERE BY FALLING THROUGH FROM ABOVE, WE ARE DONE
 NO_ATCRBS: ⍝ OTHERWISE, NEED TO ASSIGN VALUES TO OUTPUT PARAMETERS
 PROB0←1 ⍝ GUARANTEED NOT TO INTERFERE IF THERE AREN'T ANY
 PROB1←0 ⍝ CAN'T HAVE ONE INTERFERING REPLY IF THERE AREN'T ANY
 MIN←0
 MAX←0
 AC_ARRIVALS←⍬
 →OUTPUT ⍝ NOW PRINT THIS STUFF OUT
∇
```

```
∇ GLOBALS
  ⍝
  ⍝ INITIALIZE GLOBAL VARIABLES FOR SIMULATION RUN
  ⍝
  ⍝ EMANUEL RINGEL  4/94
  ⍝
  NUM_PLANES←HOW_MANY_PLANES
  MAX_PLANE_RANGE←4943 ⍝ 4943 RU = 50 NMI
  MAX_REMOTE_RANGE←2×MAX_PLANE_RANGE
  MAX_AU←16384
  ROT_RATE←MAX_AU÷4.8×16000000 ⍝ ROTATION RATE IN AU PER RU
  HALF_BEAM←⌈MAX_AU×1.8÷360 ⍝ HALF ANTENNA BEAMWIDTH IN AU
  MAX_TIME←16000000 ⍝ 16000000 RU = 1 SECOND
  AVG_FREQ←⌈128000÷3 ⍝MIDPOINT OF SENSOR ALLCALL INTERROGATION RATES IN RU
  FREQ_RNG←⌈64000÷3 ⍝RANGE OF SENSOR ALLCALL INT RATES CENTER ON AVG_FREQ
  COLOCATE←1 ⍝ 1 FORCES REMOTE SENSOR #1 TO BE COLOCATED WITH RECEIVER
  NUM_ATCRBS←30 ⍝ NUMBER OF REMOTE ATCRBS INTERROGATORS THE MODEL TAKES
  ⍝                THE FIRST NUM_ATCRBS OF THE REMOTE INTERROGATORS
  ⍝                AND USES THEM AS ATCRBS ALL CALL INTERROGATORS.
  NUM_MODE_S←5 ⍝ NUMBER OF REMOTE MODE S INTERROGATORS. THE MODEL TAKES
  ⍝                THE FIRST NUM_MODE_S OF THE REMOTE INTERROGATORS
  ⍝                AND USES THEM AS MODE S ROLL CALL INTERROGATORS.
  NUM_REMOTES←NUM_ATCRBS⌈NUM_MODE_S ⍝ NUMBER OF REMOTE INTERROGATORS
  MAX_SCHEDS_PER_PERIOD←8 ⍝ MAXIMUM # OF SCHEDULES PER ROLLCALL PERIOD
  COMM_DONE_PROB←¯0.25 ⍝ USED IN MAIN_RC TO DETERMINE THE PROBABILITY
  ⍝       THAT A PLANE HAS NO MORE COMM THIS PERIOD.   SET ¯1+Q WHERE Q IS
  ⍝       THE GEOMETRIC PROBABILITY OF HAVING A COMM FOR THE UPCOMING
  ⍝       SCHEDULE AND P = 1-Q IS THE PROBABILITY THAT THERE IS NO MORE
  ⍝       COMM FOR THE PLANE THIS PERIOD.  THEN THE EXPECTED NUMBER OF
  ⍝       SCHEDULES FOR THE PLANE IN THE PERIOD IS (1/P) - 1.  SET THIS
  ⍝       EQUAL TO THE DESIRED NUMBER OF COMMS PER PLANE PER PERIOD AND
  ⍝       SOLVE FOR P.  THEN COMM_DONE_PROB = -P.  EG, COMM_DONE_PROB =
  ⍝       ¯.25 → EXPECTED VALUE OF 3 COMMS/PLANE/PERIOD
  ⍝
  LONG_REPLY←1920 ⍝ LENGTH OF LONG MODE S REPLY = 1920 RU (120 USEC)
  SHORT_REPLY←1024 ⍝ LENGTH OF SHORT MODE S REPLY = 1024 RU (64 USEC)
  ATCRBS_REPLY←320 ⍝ LENGTH OF ATCRBS REPLY = 320 RU (20 USEC)
∇
```

```
∇ Z←A ARCTAN B;ASIGNS;ANGLES;ANGSIGNS;LENGTH;CHOOSE
  ⍝ TWO ARGUMENT ARCTAN, RETURNS 0 TO 2 PI ANGLE OF
  ⍝ ARCTAN A/B.  A AND B ARE VECTORS
  ⍝ E. RINGEL 1/94
  A←,A ⍝ RAVEL A AND B TO AVOID PROBLEMS WITH SCALAR INPUTS
  B←,B
  LENGTH←⍴A
  →(LENGTH≠⍴B)/ERROR
  ANGLES←¯3○A÷B ⍝ GET -PI/2 TO PI/2 ARCTAN
  ASIGNS←A≥0 ⍝ GET 1 IF A IS POSITIVE
  ANGSIGNS←ANGLES≥0
  Z←LENGTH⍴0
  CHOOSE←(ANGSIGNS∧ASIGNS)/⍳LENGTH ⍝ FIRST QUADRANT
  Z[CHOOSE]←ANGLES[CHOOSE]
  CHOOSE←((~ANGSIGNS)∧ASIGNS)/⍳LENGTH ⍝ SECOND QUADRANT
  Z[CHOOSE]←ANGLES[CHOOSE]+○1 ⍝ ADD PI
  CHOOSE←(ANGSIGNS∧~ASIGNS)/⍳LENGTH ⍝ THIRD QUADRANT
  Z[CHOOSE]←ANGLES[CHOOSE]+○1 ⍝ ADD PI
  CHOOSE←((~ASIGNS)∧~ANGSIGNS)/⍳LENGTH ⍝ FOURTH QUADRANT
  Z[CHOOSE]←ANGLES[CHOOSE]+○2 ⍝ ADD TWO PI
  Z←⌈Z×16384÷○2 ⍝ CONVERT RADIANS TO AU
  →0
  ERROR:'ARCTAN INPUTS OF DIFFERENT LENGTHS'
  Z←⍬
∇

∇ AC_INTERFERENCE;REPLY;SQUIT;NEXT_INDEX;REPLY_VEC;TIMES;SQUIT_HEAD;SQUIT_TA
    IL;LEAD_REPLY;NEXT_TIME;END_OF_LEAD_REPLY;START_OF_NEXT_REPLY;COUNT;FIN
    ISH
  ⍝ COMPUTE THE PROBABILITY OF A SQUITTER INTERFERING WITH THE REPLY
  ⍝ TIME SEQUENCE CONTAINED IN AC_ARRIVAL_TIMES.
  ⍝
  ⍝ E. RINGEL  1/94
  ⍝
  ⍝ THE IDEA HERE IS TO TIME ORDER THE ARRIVAL TIMES, THEN MOVE A
  ⍝ SLIDING WINDOW OF LENGTH = SQUITTER REPLY (120 USEC) THROUGH
  ⍝ THE TIMES, KEEPING TRACK OF HOW MANY REPLIES ARE IN THE WINDOW
  ⍝ AND HOW FAR WE HAVE MOVED IT.  PROBABILITIES[N] IS HOW MANY
  ⍝ RU OF TIME THE MOVING WINDOW CONTAINED N REPLIES.  WE MOVE THE
  ⍝ WINDOW FROM WHERE WE ARE NOW UNTIL THE NEXT EVENT THAT CHANGES
  ⍝ THE NUMBER OF REPLIES IN THE WINDOW, EITHER THE LEADING EDGE OF THE
  ⍝ WINDOW HITS THE NEXT REPLY START TIME OR THE TRAILING EDGE OF THE
  ⍝ WINDOW PASSES THE END TIME OF THE FIRST REPLY IN THE WINDOW.  AT
  ⍝ THAT POINT, WE LOOK AT HOW MANY RU WE JUST MOVED AND ADD THAT MUCH
  ⍝ TIME TO PROBABILITIES[N] WHERE N IS THE NUMBER OF REPLIES IN THE
  ⍝ WINDOW.  THEN WE EITHER DROP THE FIRST REPLY IN THE WINDOW OR ADD
  ⍝ THE NEXT REPLY TO THE WINDOW, DEPENDING ON WHICH EDGE OF THE WINDOW
  ⍝ HIT A REPLY EVENT.  NOW REPEAT, UNTIL WE HIT THE LAST REPLY.
  ⍝ THEN NORMALIZE PROBABILITIES BY DIVIDING BY THE TOTAL TIME PERIOD
  ⍝ BETWEEN EARLIEST AND LATEST REPLIES.
  ⍝
  ⍝ PROBABILITIES HOLDS THE TIMES WE HIT EACH NUMBER OF REPLIES
  ⍝ I PROBABLY MADE IT TOO LONG, BUT BETTER SAFE THAN SORRY
  ' '
  '    RUNNING ATCRBS INTERFERENCE PROBABILITY CALCULATION'
  ' '
  PROBABILITIES←0,(20⌈NUM_PLANES)⍴0
```

```
REPLY←ATCRBS_REPLY
SQUIT←LONG_REPLY
TIMES←AC_ARRIVAL_TIMES,START_TIME,MAX_TIME
TIMES←TIMES[⍋TIMES] ⍝ SORT THE TIMES
FINISH←⍴TIMES

⍝ TO GET STARTED, I NEED THE FIRST WINDOW'S WORTH OF TIMES
NEXT_INDEX←1
LL:
⍎(SQUIT>TIMES[NEXT_INDEX+1]-1↑TIMES)/'NEXT_INDEX←NEXT_INDEX+1⋄→LL'

⍝ REPLY_VEC HOLDS THE ENDING TIMES OF REPLIES IN THE WINDOW
REPLY_VEC←REPLY+NEXT_INDEX↑TIMES
⍝ SQUIT_HEAD IS THE START TIME OF THE SQUITTER WHICH IS THE TRAILING
⍝ EDGE OF OUR SLIDING WINDOW
SQUIT_HEAD←(1↑REPLY_VEC)-REPLY ⍝ INITIALIZE TO START TIME OF FIRST REPLY
⍝ SQUIT_TAIL IS THE END TIME OF THE SQUITTER WHICH IS THE LEADING EDGE OF
⍝ THE SLIDING WINDOW
SQUIT_TAIL←SQUIT_HEAD+SQUIT
⍝ LEAD_REPLY AND NEXT_TIME ARE THE REPLY EVENT TIMES FOR THE TRAILING
⍝ AND LEADING EDGES OF THE WINDOW, RESPECTIVELY.
NEXT_INDEX←NEXT_INDEX+1
LEAD_REPLY←1↑REPLY_VEC
NEXT_TIME←TIMES[NEXT_INDEX]

⍝ NOW ALL THE INITIALIZATION AND SETUP IS DONE, LET'S START
⍝ THAT WINDOW SLIDING!

LOOP:
⍝ TIME FOR TRAILING EDGE TO PASS THE FIRST REPLY IN THE WINDOW
END_OF_LEAD_REPLY←LEAD_REPLY-SQUIT_HEAD
⍝ TIME FOR LEADING EDGE TO HIT THE NEXT REPLY NOT YET IN THE WINDOW
START_OF_NEXT_REPLY←NEXT_TIME-SQUIT_TAIL
⍝ MOVE THE WINDOW BY THE SMALLER OF THESE TWO TIMES
SQUIT_HEAD←SQUIT_HEAD+END_OF_LEAD_REPLY⌊START_OF_NEXT_REPLY
SQUIT_TAIL←SQUIT_HEAD+SQUIT
⍝ NOW LET'S SEE WHICH ONE OF THESE THINGS HAPPENED FIRST

→(END_OF_LEAD_REPLY≥START_OF_NEXT_REPLY)/ENDCASE
⍝ WE GET HERE IF THE TRAILING EDGE PASSED THE FIRST REPLY
⍝ FIRST, UPDATE THE PROBABILITY VECTOR.  WE HAVE TO ADD 1 TO THE INDEX
⍝ BECAUSE I AM NOT USING ZERO-BASED INDEXING, SO [1] HOLDS P(0),
⍝ [2] HOLDS P(1), ETC.
PROBABILITIES[1+⍴REPLY_VEC]←PROBABILITIES[1+⍴REPLY_VEC]+END_OF_LEAD_REPLY
⍝ DROP THE REPLY WE JUST PASSED
REPLY_VEC←1↓REPLY_VEC
⍝ LEAD_REPLY IS NOW UPDATED TO BE THE END TIME OF THE NEW FIRST REPLY IN
⍝ REPLY_VEC, UNLESS REPLY_VEC IS NOW EMPTY, IN WHICH CASE IT IS THE END
⍝ TIME OF THE NEXT UPCOMING REPLY
LEAD_REPLY←NEXT_TIME+REPLY
⍎(0≠⍴REPLY_VEC)/'LEAD_REPLY←1↑REPLY_VEC'
→ENDLOOP

ENDCASE:
⍝ WE GET HERE IF THE LEADING EDGE HIT THE NEXT REPLY, OR IF BOTH
⍝ EVENTS HAPPENED SIMULTANEOUSLY
⍝ FIRST, UPDATE THE PROBABILITY VECTOR
```

```
[86]  PROBABILITIES[1+⍴REPLY_VEC]←PROBABILITIES[1+⍴REPLY_VEC]+START_OF_NEXT_REPL
         Y
[87]  ⍝ NOW ADD THE REPLY WE JUST HIT TO REPLY_VEC
[88]  REPLY_VEC←REPLY_VEC,NEXT_TIME+REPLY
[89]  ⍝ NEXT_INDEX IS UPDATED TO BE THE NEXT UPCOMING REPLY TIME
[90]  NEXT_INDEX←1+NEXT_INDEX
[91]  ⍝ IF WE HAVE USED ALL THE REPLY TIMES, WE'RE DONE
[92]  →(NEXT_INDEX>FINISH)/DONE
[93]  NEXT_TIME←TIMES[NEXT_INDEX]
[94]  ⍝ WE CAN JUMP TO THE END UNLESS THE LEADING AND TRAILING EDGES HIT
[95]  ⍝ THEIR EVENTS SIMULTANEOUSLY
[96]
[97]  →(END_OF_LEAD_REPLY≠START_OF_NEXT_REPLY)/ENDLOOP
[98]  ⍝ IF THE WINDOW EDGES HIT EVENTS SIMULTANEOUSLY, THEN THE LEAD REPLY HAS
[99]  ⍝ TO BE DROPPED AND UPDATED.  WE ALREADY UPDATED THE NEXT REPLY
[100] REPLY_VEC←1↓REPLY_VEC
[101] LEAD_REPLY←NEXT_TIME+REPLY
[102] ⍎(0≠⍴REPLY_VEC)/'LEAD_REPLY←1↑REPLY_VEC'
[103]
[104] ENDLOOP:
[105] ⍝ TIME TO GO BACK UP AND SLIDE THAT WINDOW AGAIN
[106]  →LOOP
[107]
[108] DONE:
[109] ⍝ PROBABILITIES IS A VECTOR OF TIMES, LET'S DIVIDE BY TOTAL TIME
[110] ⍝ TO GET PROBABILITIES
[111]  PROBABILITIES←PROBABILITIES÷RUN_TIME
[112]
[113]
[114]
[115]
[116]
[117]
[118]
    ∇

    ∇ MAIN_RC;TIMESTEP;LOOPCOUNT;A;B;SENSOR;CHOOSE;MIN_ANGLE;MAX_ANGLE;LENGTH;OU
         T;CHOOSEVEC;TIMEVEC;TEMPVEC;INTER_TIME;REMAINING_PERIOD;TURNAROUND;RPTE
         ST;SCHEDULE_LIMITER;COMMTEST;SCHEDULE_LENGTH;MODE_S_PERIOD;REPLY_LENGTH
         S;LENGTH_VEC;PROPORTION;PRINTSTRING
[1]   ⍝ SIMULATE ROLLCALL REPLY ARRIVALS AT AN ANTENNA DUE TO INTERROGATIONS
[2]   ⍝ BY REMOTE SENSORS
[3]   ⍝
[4]   ⍝ EMANUEL RINGEL  4/94
[5]   ⍝
[6]   ⍝
[7]   ⍝ STEP 1  -  INITIALIZE VARIABLES
[8]   'ROLLCALL REPLY MODEL'
[9]   ' '
[10]  'INITIALIZING'
[11]  GLOBALS ⍝ RUN THE PROGRAM 'GLOBALS' TO INITIALIZE GLOBAL VARIABLES
[12]  RC_ARRIVALS← 2 1 ⍴0 ⍝ FOR EACH REPLY, RECORD PLANE AND INTERROGATING SENSO
         R
[13]  RC_ARRIVAL_TIMES←⍬ ⍝ INITIALIZE ARRIVAL TIME VECTOR
[14]  CHOOSEVEC←⍳NUM_PLANES ⍝ USED IN MAIN LOOP TO GET PLANE NUMBERS
[15]  PRINTSTRING←⎕TCNL,(80⍴⎕TCBS),'          ',10⍴⎕TCBS ⍝ FOR SCREEN OUTPUT WIT
         H ⍞
```

```
[16]  REPLY_LENGTHS←⍬ ⍝ INITIALIZE THE REPLY LENTH VECTOR
[17]  ⍝ THE PROPORTION IS 2 OUT OF 6 REPLIES ARE SHORT,
[18]  ⍝ BASED ON THE ORLANDO ADS-MODE S PAPER {ROLLCALL COMM IS 4 LONG
[19]  ⍝ AND 1 SHORT, MODE S ALLCALL IS 1 SHORT, ALL IN A ONE SECOND INTERVAL}
[20]  PROPORTION←2÷6
[21]  ⍝
[22]  ⍝ STEP 2  -  GET POPULATION OF PLANES AND OF REMOTE SENSORS
[23]  'GET POPULATION OF PLANES USED FOR ROLL CALLS'
[24]  MATRIX←POSITIONS
[25]  ⍝ NOW COPY MATRIX INTO 3 DIMENSIONS, ONE COPY FOR EACH REMOTE SENSOR
[26]  MATRIX←(NUM_MODE_S,NUM_PLANES,2)⍴MATRIX
[27]  ⍝ AT THIS POINT, EACH COPY OF MATRIX CONTAINS THE RHO-THETA
[28]  ⍝ COORDINATES OF THE PLANE RELATIVE TO THE RECEIVING ANTENNA.
[29]  ⍝ LATER, THESE WILL BE REPLACED WITH COORDINATE INFO RELATIVE
[30]  ⍝ TO EACH REMOTE SENSOR
[31]  ⍝ ADD A THIRD COLUMN TO HOLD TURNAROUND_TIME FOR THE REMOTE SENSOR
[32]  MATRIX←MATRIX,MATRIX[;;1]
[33]  ⍝
[34]  ⍝ GET THE REMOTE SENSORS WHICH ARE MODE S ROLL CALL SENSORS
[35]  RC_SENSORS←SENSORS[⍳NUM_MODE_S;]
[36]  ⍝
[37]  ⍝ RESET THE TIME OF NEXT INTERROGATION TO THE ORIGINAL AC START TIMES.
[38]  ⍝ BUMP THE TIME OF NEXT INTERROGATION BY 1/4 OF THE ALLCALL
[39]  ⍝ FREQUENCY.  THIS GIVES THE PROPER OFFSET OF ALLCALL AND ROLLCALL
[40]  ⍝ PERIODS, ASSUMING THE SAME FRAME PROPORTIONS AS MODE S SENSOR
[41]  ⍝ OF 8 MS FREQUENCY = 2 MS ALLCALL, 6 MS ROLLCALL
[42]  RC_SENSORS[;3]←FIRST_AC_INTER[⍳NUM_MODE_S]+⌈0.25×RC_SENSORS[;5]
[43]  ⍝
[44]  ⍝
[45]  ⍝ STEP 3  -  CALCULATE AIRPLANE COORDINATES
[46]  ⍝ CONVERT THE RHO THETA COORDINATES OF THE PLANES INTO LOCAL
[47]  ⍝ COORDINATES RELATIVE TO EACH SENSOR, USING THE EQUATIONS OF
[48]  ⍝ FAA-E-2716 3.4.8.8.5.  HERE, EACH REMOTE SENSOR PLAYS THE ROLE
[49]  ⍝ OF LOCAL SENSOR IN 2716.  m, s, AND BETA IN 2716 ARE TAKEN TO
[50]  ⍝ BE ZERO FOR SIMPLICITY, SINCE ALL LOCATIONS ARE RANDOM ANYWAY.
[51]  'CALCULATE REMOTE SENSOR AIRPLANE RHO-THETA COORDINATES'
[52]  LOOPCOUNT←0
[53]  COORD_LOOP:LOOPCOUNT←LOOPCOUNT+1
[54]  ⍝ A = a + ρ SIN θ
[55]  A←RC_SENSORS[LOOPCOUNT;1]+MATRIX[LOOPCOUNT;;1]×1○MATRIX[LOOPCOUNT;;2]×(○2)
        ÷MAX_AU
[56]  ⍝ B = b + ρ COS θ
[57]  B←RC_SENSORS[LOOPCOUNT;2]+MATRIX[LOOPCOUNT;;1]×2○MATRIX[LOOPCOUNT;;2]×(○2)
        ÷MAX_AU
[58]  ⍝ NOW COMPUTE THE ANGLE RELATIVE TO THE REMOTE SENSOR AND STORE IT
[59]  MATRIX[LOOPCOUNT;;2]←A ARCTAN B
[60]  ⍝ COMPUTE THE RANGE RELATIVE TO THE REMOTE SENSOR, ADD TO IT THE
[61]  ⍝ MODE S TURNAROUND DELAY AND THE RANGE TO THE RECEIVING ANTENNA TO GET
[62]  ⍝ THE TIME THAT A REPLY ARRIVES AT THE RECEIVER AFTER AN INTERROGATION
[63]  ⍝ FROM THIS REMOTE SENSOR
[64]  MATRIX[LOOPCOUNT;;1]←MATRIX[LOOPCOUNT;;1]+2124+⌈((A×A)+B×B)*0.5
[65]  ⍝ NOW COMPUTE THE TIME A REPLY ARRIVES AT THE REMOTE SENSOR AFTER AN
[66]  ⍝ INTERROGATION FROM THE REMOTE SENSOR
[67]  MATRIX[LOOPCOUNT;;3]←2124+2×⌈((A×A)+B×B)*0.5
[68]  →(LOOPCOUNT<NUM_MODE_S)/COORD_LOOP
[69]  ⍝
[70]  ⍝ STEP 4  -  NOW WE DO THE WORK
```

```
 'SIMULATE AN INTERVAL OF ',(⍕MAX_TIME),' RU'
 OUT←0
 TIMEVEC←RC_SENSORS[;3]
 ⍝ START_TIME HOLDS THE START TIME OF THE FIRST INTERROGATION
 START_TIME←⌊/TIMEVEC
MAINLOOP:
 ⍝ COMPUTE TIME OF NEXT INTERROGATION BY A SENSOR
 TIMESTEP←⌊/TIMEVEC ⍝ TIME OF NEXT INTERROGATION
 OUT←OUT+1
 ⍎(0=15|OUT)/'⍞←''.'''
 ⍎(OUT≥150)/'⎕←(⍕TIMESTEP),PRINTSTRING⋄OUT←0'
 →(TIMESTEP>MAX_TIME)/DONE
 SENSOR←TIMEVEC⍳TIMESTEP ⍝ SENSOR CORRESPONDING TO THAT TIME
 ⍝ COMPUTE LEADING AND TRAILING EDGE OF SENSOR BEAM AT INT TIME
 ⍝ CORRECT FOR NORTHMARK IF NECESSARY
 ⍝ CUT DOWN MAX_ANGLE BY 1/3 (IE USE 2/3 × HALF_BEAM INSTEAD OF
 ⍝ 2 × HALF_BEAM FOR BEAMWIDTH) TO ACCOUNT FOR THE FACT THAT MOST
 ⍝ MODE S MESSAGES GET DELIVERED IN THE FIRST OR SECOND PERIOD THAT
 ⍝ THE TARGET IS IN THE BEAM
 MIN_ANGLE←MAX_AU|RC_SENSORS[SENSOR;4]+(⌈ROT_RATE×TIMESTEP)-HALF_BEAM
 MAX_ANGLE←MAX_AU|MIN_ANGLE+⌈0.6666666×HALF_BEAM
 ⍝ CHOOSE PLANES IN THE BEAM
 TEMPVEC←MATRIX[SENSOR;;2]
 CHOOSE←(TEMPVEC≤MAX_ANGLE)∧MIN_ANGLE≤TEMPVEC
 ⍝ SPECIAL CASE FOR BEAM STRADDLING NORTHMARK
 ⍎(MAX_ANGLE<MIN_ANGLE)/'CHOOSE←(TEMPVEC≤MAX_ANGLE)∨TEMPVEC≥MIN_ANGLE'
 →CHOOSE/UPDATE
 →NEXT
 ⍝ IF THERE ARE NO PLANES IN THIS MODE S PERIOD, MOVE ON
UPDATE:
 CHOOSE←,CHOOSE/CHOOSEVEC ⍝ GET PLANE INDICES
 ⍝ LET DURATION OF THE MODE S PERIOD BE .75 OF THE FRAME REPEAT
 MODE_S_PERIOD←0.75×RC_SENSORS[SENSOR;5]
 ⍝ THIS WILL DROP THE MOST DISTANT PLANES IF THEY DON'T FIT WITHIN THE
 ⍝ PERIOD - SIMULATES COVERAGE MAP
 CHOOSE←(MATRIX[SENSOR;CHOOSE;3]<MODE_S_PERIOD-LONG_REPLY)/CHOOSE
 CHOOSE←,CHOOSE[⍋MATRIX[SENSOR;CHOOSE;3]] ⍝ RANGE ORDERED INDICES
 ⍝
 ⍝ UPDATE REPLY INFO FOR THESE PLANES WITH SENSOR AND TIME.
 ⍝ THE SENSOR WILL INTERROGATE EACH PLANE AS OFTEN AS POSSIBLE
 ⍝ WITHIN THE PERIOD, UP TO MAX_SCHEDS_PER_PERIOD.
 ⍝ NOTE THAT WE ARE NOT TRYING TO DUPLICATE THE ROLL CALL SCHEDULING
 ⍝ ALOGORITHM HERE - ALL SCHEDULES ARE ONE CYCLE, ETC.
 LENGTH←⍴CHOOSE
 ⍝ REPLY TIME FOR THE INTERROGATIONS
 TURNAROUND←MATRIX[SENSOR;CHOOSE;3]
 ⍝ REMAINING TIME IN ROLLCALL PERIOD FOR EACH PLANE.  STARTS OFF AS
 ⍝ 3/4 OF THE FRAME REPEAT (IE THE ENTIRE ROLLCALL PERIOD).
 REMAINING_PERIOD←LENGTH⍴MODE_S_PERIOD
 ⍝ THE NEXT SEVERAL LINES DECIDE WHETHER EACH REPLY WAS A LONG OR
 ⍝ A SHORT REPLY.  THE PROPORTION IS 2 OUT OF 6 REPLIES ARE SHORT,
 ⍝ BASED ON THE ORLANDO ADS-MODE S PAPER {ROLLCALL COMM IS 4 LONG
 ⍝ AND 1 SHORT, MODE S ALLCALL IS 1 SHORT, ALL IN A ONE SECOND INTERVAL}
 LENGTH_VEC←LENGTH⍴LONG_REPLY
 LENGTH_VEC[(PROPORTION≥1E¯18×?LENGTH⍴1E18)/⍳LENGTH]←SHORT_REPLY
 RPTEST←REMAINING_PERIOD>(1↑TURNAROUND)++\LENGTH_VEC
 ⍝ SEE WHICH PLANES ACTUALLY HAVE ENOUGH TIME TO TURN AROUND A REPLY.
```

```
[128]  CHOOSE←RPTEST/CHOOSE
[129]  →(CHOOSE≡⍬)/NEXT ⍝ IF WE CAN'T TALK TO ANYONE, MOVE ON
[130] ⍝ RESTRICT CHOOSE TO THESE PLANES
[131]  REMAINING_PERIOD←RPTEST/REMAINING_PERIOD
[132] ⍝ RESTRICT REMAINING_PERIOD TO THESE PLANES
[133]  LENGTH←ρCHOOSE
[134]  TURNAROUND←MATRIX[SENSOR;CHOOSE;3]
[135]  LENGTH_VEC←RPTEST/LENGTH_VEC
[136] ⍝ UPDATE TURNAROUND
[137]  INTER_TIME←(-1↑LENGTH_VEC)+(+\LENGTH_VEC)+(1↑TURNAROUND)-TURNAROUND
[138] ⍝ START TIME OF INTERROGATION RELATIVE TO START OF PERIOD
[139] ⍝ INTERROGATION TIMES ARE STAGGERED PER ROLLCALL ALGORITHM
[140]  SCHEDULE_LIMITER←0
[141] ⍝ COUNTER OF SCHEDULES TO BE COMPARED TO GLOBAL MAX_SCHEDS_PER_PERIOD
[142] ⍝
[143] RC_LOOP:SCHEDULE_LIMITER←SCHEDULE_LIMITER+1
[144]  →(SCHEDULE_LIMITER>MAX_SCHEDS_PER_PERIOD)/NEXT
[145]  RC_ARRIVAL_TIMES←RC_ARRIVAL_TIMES,TIMESTEP+INTER_TIME+MATRIX[SENSOR;CHOOS
         E;1]
[146]  RC_ARRIVALS←RC_ARRIVALS,(2,LENGTH)ρCHOOSE,(LENGTHρSENSOR)
[147]  REPLY_LENGTHS←REPLY_LENGTHS,LENGTH_VEC
[148] ⍝ WHAT WAS THE DURATION OF THE SCHEDULE JUST COMPLETED?
[149]  SCHEDULE_LENGTH←(1↑TURNAROUND)++/LENGTH_VEC
[150] ⍝ SEE WHO STILL HAS COMM LEFT (RANDOM, SEE GLOBALS FOR EXPLANATION)
[151]  COMMTEST←⌈COMM_DONE_PROB+1E¯18×?LENGTHρ1E18
[152]  CHOOSE←COMMTEST/CHOOSE
[153]  →(CHOOSE≡⍬)/NEXT ⍝ IF WE CAN'T TALK TO ANYONE, MOVE ON
[154]  LENGTH←ρCHOOSE
[155] ⍝ UPDATE TURNAROUND
[156]  TURNAROUND←MATRIX[SENSOR;CHOOSE;3]
[157] ⍝ SUBTRACT OFF THE TIME FOR THE SCHEDULE JUST COMPLETED
[158]  REMAINING_PERIOD←REMAINING_PERIOD-SCHEDULE_LENGTH
[159] ⍝ NOW SEE WHO WE STILL HAVE TIME TO TALK TO
[160]  REMAINING_PERIOD←COMMTEST/REMAINING_PERIOD
[161]  LENGTH_VEC←LENGTHρLONG_REPLY
[162]  LENGTH_VEC[(PROPORTION≥1E¯18×?LENGTHρ1E18)/ιLENGTH]←SHORT_REPLY
[163]  RPTEST←REMAINING_PERIOD>(1↑TURNAROUND)++\LENGTH_VEC
[164] ⍝ SEE WHICH PLANES ACTUALLY HAVE ENOUGH TIME TO TURN AROUND A REPLY.
[165]  CHOOSE←RPTEST/CHOOSE
[166]  →(CHOOSE≡⍬)/NEXT ⍝ IF WE CAN'T TALK TO ANYONE, MOVE ON
[167] ⍝ RESTRICT CHOOSE TO THESE PLANES
[168]  REMAINING_PERIOD←RPTEST/REMAINING_PERIOD
[169] ⍝ RESTRICT REMAINING_PERIOD TO THESE PLANES
[170]  LENGTH←ρCHOOSE
[171]  TURNAROUND←MATRIX[SENSOR;CHOOSE;3]
[172]  LENGTH_VEC←RPTEST/LENGTH_VEC
[173] ⍝ UPDATE TURNAROUND
[174] ⍝ UPDATE INTERROGATION TIMES FOR THESE PLANES
[175] ⍝ INTER_TIME = BEGINNING OF LAST SCHEDULE + DURATION OF LAST SCHEDULE
[176] ⍝ + {GO OUT TO THE LONGEST REPLY TURNAROUND TIME AND PUT A REPLY EVERY
[177] ⍝ REPLY RU FOR EACH PLANE IN THE SCHEDULE, THEN BACK OFF BY TURNAROUND
[178] ⍝ TIME TO GET THE CORRESPONDING INTERROGATION TIME}
[179]  INTER_TIME←(1↑INTER_TIME)+SCHEDULE_LENGTH+(-1↑LENGTH_VEC)+(+\LENGTH_VEC)+
         (1↑TURNAROUND)-TURNAROUND
[180]  →CHOOSE/RC_LOOP
[181] ⍝
[182] ⍝ UPDATE THE NEXT INTERROGATION TIME FOR THIS PLANE
```

```
NEXT:
 TIMEVEC[SENSOR]←TIMESTEP+RC_SENSORS[SENSOR;5]
 →MAINLOOP
⍝
⍝ STEP 5  -  COMPUTE PROBABILITY
DONE:
 RC_SENSORS[;3]←TIMEVEC
 RUN_TIME←MAX_TIME-START_TIME
 ⎕ERASE 'TIMEVEC TEMPVEC CHOOSE INTER_TIME REMAINING_PERIOD TURNAROUND SCH
   EDULE_LIMITER SCHEDULE_LENGTH COMMTEST RPTEST MODE_S_PERIOD LENGTH_VEC
 RC_ARRIVALS← 0 1 ↓RC_ARRIVALS ⍝ DROP THE '¯2 1⍴0' THAT WE USED TO
⍝                                INITIALIZE RC_ARRIVALS
 LENGTH←⍴RC_ARRIVAL_TIMES
 RC_ARRIVAL_TIMES←(2,LENGTH)⍴RC_ARRIVAL_TIMES,REPLY_LENGTHS
 ⎕ERASE 'LENGTH REPLY_LENGTHS'
 ' '
 'COMPUTE STATISTICS'
 ⍝ RC_INTERFERENCE ⍝ CALL PROBABILITY SUBROUTINE - MOVED TO RUN_MODEL
 PROB0←PROBABILITIES[1]
⍝ COMPUTE MIN AND MAX REPLIES PER PLANE
 MAX←0
 MIN←¯1↑⍴RC_ARRIVALS
 LOOPCOUNT←0
REPLY_LOOP:LOOPCOUNT←LOOPCOUNT+1
 A←+/LOOPCOUNT=RC_ARRIVALS[1;]
 MIN←MIN⌊A
 MAX←MAX⌈A
 →(LOOPCOUNT<NUM_PLANES)/REPLY_LOOP
⍝
⍝ STEP 6  -  OUTPUT
 ' '
 'PARAMETER ECHO:'
 '==============='
 'NUMBER OF PLANES            ',⍕NUM_PLANES
 'RUN TIME                    ',(⍕MAX_TIME÷16000000),' SEC'
 'NUMBER OF INTERROGATORS     ',⍕NUM_MODE_S
 '   ROTATION RATE            ',(1⍕MAX_AU÷ROT_RATE×16000000),' SEC'
 '   AVG ROLLCALL RATE        ',(1⍕16000000÷AVG_FREQ),' PERIODS PER SEC'
 '   BEAMWIDTH                ',(2⍕HALF_BEAM×2×360÷MAX_AU),' DEGREES'
 ' '
 'MODEL OUTPUT FOR THIS RUN:'
 '=========================='
 'NUMBER OF ROLLCALL REPLIES       ',⍕¯1↑⍴RC_ARRIVALS
 'AVG REPLIES PER PLANE           ',1⍕AVG←(¯1↑⍴RC_ARRIVALS)÷NUM_PLANES
 'FEWEST REPLIES FROM A PLANE     ',⍕MIN
 'MOST REPLIES FROM A PLANE       ',⍕MAX
 ' '
 'PROBABILITY OF A LONG SQUITTER NOT BEING INTERFERED WITH BY ANY'
 'ROLLCALL REPLIES                ',4⍕PROB0
∇

∇ RC_INTERFERENCE;REPLY;SQUIT;NEXT_INDEX;REPLY_VEC;TIMES;SQUIT_HEAD;SQUIT_TA
    IL;LEAD_REPLY;NEXT_TIME;END_OF_LEAD_REPLY;START_OF_NEXT_REPLY;COUNT;FIN
    ISH;REPLY_LENGTHS;NEXT_LENGTH
 ⍝ COMPUTE THE PROBABILITY OF A SQUITTER INTERFERING WITH THE REPLY
 ⍝ TIME SEQUENCE CONTAINED IN RC_ARRIVAL_TIMES.
 ⍝
```

```
⍝ E. RINGEL  3/94
⍝
⍝ THE IDEA HERE IS TO TIME ORDER THE ARRIVAL TIMES, THEN MOVE A
⍝ SLIDING WINDOW OF LENGTH = SQUITTER REPLY (120 USEC) THROUGH
⍝ THE TIMES, KEEPING TRACK OF HOW MANY REPLIES ARE IN THE WINDOW
⍝ AND HOW FAR WE HAVE MOVED IT.  PROBABILITIES[N] IS HOW MANY
⍝ RU OF TIME THE MOVING WINDOW CONTAINED N REPLIES.  WE MOVE THE
⍝ WINDOW FROM WHERE WE ARE NOW UNTIL THE NEXT EVENT THAT CHANGES
⍝ THE NUMBER OF REPLIES IN THE WINDOW, EITHER THE LEADING EDGE OF THE
⍝ WINDOW HITS THE NEXT REPLY START TIME OR THE TRAILING EDGE OF THE
⍝ WINDOW PASSES THE END TIME OF THE FIRST REPLY IN THE WINDOW.  AT
⍝ THAT POINT, WE LOOK AT HOW MANY RU WE JUST MOVED AND ADD THAT MUCH
⍝ TIME TO PROBABILITIES[N] WHERE N IS THE NUMBER OF REPLIES IN THE
⍝ WINDOW.  THEN WE EITHER DROP THE FIRST REPLY IN THE WINDOW OR ADD
⍝ THE NEXT REPLY TO THE WINDOW, DEPENDING ON WHICH EDGE OF THE WINDOW
⍝ HIT A REPLY EVENT.  NOW REPEAT, UNTIL WE HIT THE LAST REPLY.
⍝ THEN NORMALIZE PROBABILITIES BY DIVIDING BY THE TOTAL TIME PERIOD
⍝ BETWEEN EARLIEST AND LATEST REPLIES.
⍝
⍝ PROBABILITIES HOLDS THE TIMES WE HIT EACH NUMBER OF REPLIES
⍝ I PROBABLY MADE IT TOO LONG, BUT BETTER SAFE THAN SORRY
' '
'    RUNNING ROLLCALL INTERFERENCE PROBABILITY CALCULATION'
' '
PROBABILITIES←0,(20⌈NUM_PLANES)⍴0
SQUIT←LONG_REPLY
TIMES←RC_ARRIVAL_TIMES, 2 2 ⍴START_TIME,MAX_TIME, 0 0
TIMES←TIMES[;⍋TIMES[1;]] ⍝ SORT THE TIMES AND REPLY LENGTHS
REPLY_LENGTHS←TIMES[2;] ⍝ SPLIT REPLY LENGTHS AND TIMES INTO
TIMES←TIMES[1;] ⍝         TWO SEPARATE VECTORS
FINISH←⍴TIMES
⍝ TO GET STARTED, I NEED THE FIRST WINDOW'S WORTH OF TIMES
NEXT_INDEX←1
LL:
⍎(SQUIT>TIMES[NEXT_INDEX+1]-1↑TIMES)/'NEXT_INDEX←NEXT_INDEX+1⋄→LL'

⍝ REPLY_VEC HOLDS THE ENDING TIMES OF REPLIES IN THE WINDOW
REPLY_VEC←(NEXT_INDEX↑REPLY_LENGTHS)+NEXT_INDEX↑TIMES
⍝ SQUIT_HEAD IS THE START TIME OF THE SQUITTER WHICH IS THE TRAILING
⍝ EDGE OF OUR SLIDING WINDOW
SQUIT_HEAD←(1↑REPLY_VEC)-1↑REPLY_LENGTHS
⍝ INITIALIZE SQUIT_HEAD TO START TIME OF FIRST REPLY
⍝ SQUIT_TAIL IS THE END TIME OF THE SQUITTER WHICH IS THE LEADING EDGE OF
⍝ THE SLIDING WINDOW
SQUIT_TAIL←SQUIT_HEAD+SQUIT
⍝ LEAD_REPLY AND NEXT_TIME ARE THE REPLY EVENT TIMES FOR THE TRAILING
⍝ AND LEADING EDGES OF THE WINDOW, RESPECTIVELY.
NEXT_INDEX←NEXT_INDEX+1
LEAD_REPLY←1↑REPLY_VEC
NEXT_TIME←TIMES[NEXT_INDEX]
NEXT_LENGTH←REPLY_LENGTHS[NEXT_INDEX]

⍝ NOW ALL THE INITIALIZATION AND SETUP IS DONE, LET'S START
⍝ THAT WINDOW SLIDING!

LOOP:
⍝ TIME FOR TRAILING EDGE TO PASS THE FIRST REPLY IN THE WINDOW
```

```
END_OF_LEAD_REPLY←LEAD_REPLY-SQUIT_HEAD
⍝ TIME FOR LEADING EDGE TO HIT THE NEXT REPLY NOT YET IN THE WINDOW
START_OF_NEXT_REPLY←NEXT_TIME-SQUIT_TAIL
⍝ MOVE THE WINDOW BY THE SMALLER OF THESE TWO TIMES
SQUIT_HEAD←SQUIT_HEAD+END_OF_LEAD_REPLY⌊START_OF_NEXT_REPLY
SQUIT_TAIL←SQUIT_HEAD+SQUIT
⍝ NOW LET'S SEE WHICH ONE OF THESE THINGS HAPPENED FIRST

→(END_OF_LEAD_REPLY≥START_OF_NEXT_REPLY)/ENDCASE
⍝ WE GET HERE IF THE TRAILING EDGE PASSED THE FIRST REPLY
⍝ FIRST, UPDATE THE PROBABILITY VECTOR.  WE HAVE TO ADD 1 TO THE INDEX
⍝ BECAUSE I AM NOT USING ZERO-BASED INDEXING, SO [1] HOLDS P(0),
⍝ [2] HOLDS P(1), ETC.
PROBABILITIES[1+⍴REPLY_VEC]←PROBABILITIES[1+⍴REPLY_VEC]+END_OF_LEAD_REPLY
⍝ DROP THE REPLY WE JUST PASSED
REPLY_VEC←1↓REPLY_VEC
⍝ LEAD_REPLY IS NOW UPDATED TO BE THE END TIME OF THE NEW FIRST REPLY IN
⍝ REPLY_VEC, UNLESS REPLY_VEC IS NOW EMPTY, IN WHICH CASE IT IS THE END
⍝ TIME OF THE NEXT UPCOMING REPLY
LEAD_REPLY←NEXT_TIME+NEXT_LENGTH
⍎(0≠⍴REPLY_VEC)/'LEAD_REPLY←1↑REPLY_VEC'
→ENDLOOP

ENDCASE:
⍝ WE GET HERE IF THE LEADING EDGE HIT THE NEXT REPLY, OR IF BOTH
⍝ EVENTS HAPPENED SIMULTANEOUSLY
⍝ FIRST, UPDATE THE PROBABILITY VECTOR
PROBABILITIES[1+⍴REPLY_VEC]←PROBABILITIES[1+⍴REPLY_VEC]+START_OF_NEXT_REPLY
⍝ NOW ADD THE REPLY WE JUST HIT TO REPLY_VEC
REPLY_VEC←REPLY_VEC,NEXT_TIME+NEXT_LENGTH
⍝ NEXT_INDEX IS UPDATED TO BE THE NEXT UPCOMING REPLY TIME
NEXT_INDEX←1+NEXT_INDEX
⍝ IF WE HAVE USED ALL THE REPLY TIMES, WE'RE DONE
→(NEXT_INDEX>FINISH)/DONE
NEXT_TIME←TIMES[NEXT_INDEX]
NEXT_LENGTH←REPLY_LENGTHS[NEXT_INDEX]
⍝ WE CAN JUMP TO THE END UNLESS THE LEADING AND TRAILING EDGES HIT
⍝ THEIR EVENTS SIMULTANEOUSLY

→(END_OF_LEAD_REPLY≠START_OF_NEXT_REPLY)/ENDLOOP
⍝ IF THE WINDOW EDGES HIT EVENTS SIMULTANEOUSLY, THEN THE LEAD REPLY HAS
⍝ TO BE DROPPED AND UPDATED.  WE ALREADY UPDATED THE NEXT REPLY
 REPLY_VEC←1↓REPLY_VEC
 LEAD_REPLY←NEXT_TIME+NEXT_LENGTH
 ⍎(0≠⍴REPLY_VEC)/'LEAD_REPLY←1↑REPLY_VEC'

ENDLOOP:
⍝ TIME TO GO BACK UP AND SLIDE THAT WINDOW AGAIN
 →LOOP

DONE:
⍝ PROBABILITIES IS A VECTOR OF TIMES, LET'S DIVIDE BY TOTAL TIME
⍝ TO GET PROBABILITIES
 PROBABILITIES←PROBABILITIES÷RUN_TIME
```

```
∇

∇ TCAS_SQUIT;INTERVALS;PLANE_INDEX;TYPE_INDEX;TIMES;REPLYTIME;REPLYLENGTH;RA
    NGE;REPLIES
⍝
⍝  EMANUEL RINGEL 3/94
⍝
⍝ THIS PROGRAM DISTRIBUTES TCAS AND SQUITTER MODE S REPLIES
⍝ OVER THE SIMULATION INTERVAL.
⍝ TCAS REPLIES ARE SHORT REPLIES MADE EVERY 0.2 +/- 0.04 SECONDS.
⍝ THERE ARE 3 TYPES OF SQUITTER:
⍝   SHORT SQUITTER EVERY 1.0 +/- 0.2 SECOND (TYPE:  TCAS)
⍝   LONG SQUITTER EVERY 0.5 +/- 0.1 SECOND  (TYPE:  ADS)
⍝   LONG SQUITTER EVERY 5.0 +/- 1.0 SECOND  (TYPE:  ID)
⍝ THE PROGRAM WILL RANDOMLY ASSIGN TCAS AND SQUITTER REPLIES MEETING
⍝ THESE CONSTRAINTS TO EACH PLANE OVER THE SIMULATION INTERVAL.
⍝
⍝ STEP 1 - INITIALIZATION
'TCAS AND SQUITTER REPLY MODEL'
' '
INTERVALS← 4 3 ρ0 ⍝ INTERVALS WILL HOLD THE 'X +/- Y' DATA
⍝                    AND THE REPLY LENGTHS GIVEN ABOVE
⍝ ROW 1 = TCAS REPLIES, ROW 2 = TCAS SQUITTER, ROW 3 = ADS SQUITTER,
⍝ ROW 4 = ID SQUITTER
INTERVALS[;1]← 0.2 1 0.5 5 ⍝ THE 'X' BASE TIMES IN SECONDS
INTERVALS[;2]← 0.04 0.2 0.1 1 ⍝ THE '+/- Y' TIMES IN SECONDS
INTERVALS←16000000×INTERVALS ⍝ CONVERT SECONDS TO RU
INTERVALS[;3]←SHORT_REPLY,SHORT_REPLY,LONG_REPLY,LONG_REPLY
⍝ THESE NEXT TWO LINES CHANGE 'X +/- Y' TO '(X-Y) + (O TO 2Y)'
⍝ WHICH IS EASIER TO WORK WITH
INTERVALS[;1]←INTERVALS[;1]-INTERVALS[;2]
INTERVALS[;2]←2×INTERVALS[;2]
TS_ARRIVAL_TIMES← 2 1 ρ0 ⍝ INITIALIZE THE ARRIVAL TIME MATRIX
PLANE_INDEX←0 ⍝ LOOPING INDEX
MAX←0 ⍝     THESE 2 VARIABLE WILL TRACK THE MIN AND MAX
MIN←1000 ⍝  NUMBER OF REPLIES PER PLANE
⍝
⍝ STEP 2 - MAIN LOOP
⍝ PASS THROUGH THIS LOOP FOR EACH PLANE.  GENERATE REPLY TRANSMIT TIMES
⍝ FOR TCAS AND SQUITTER, ADD PLANE RANGE TO GET REPLY ARRIVAL TIMES, AND
⍝ APPEND THE ARRIVAL TIMES AND REPLY LENGTHS TO TS_ARRIVAL_TIMES
PLANE_LOOP:PLANE_INDEX←PLANE_INDEX+1
→(PLANE_INDEX>NUM_PLANES)/END
TIMES← 2 1 ρ0 ⍝ RESET THE PER-PLANE VECTOR OF REPLY TIMES AND LENGTHS
TYPE_INDEX←0 ⍝ RESET REPLY TYPE INDEX
RANGE←POSITIONS[PLANE_INDEX;1] ⍝ GET THE RANGE OF THE PLANE
REPLIES←0 ⍝ COUNTER OF REPLIES FOR MIN, AVG, MAX
⍝
TYPE_LOOP:TYPE_INDEX←TYPE_INDEX+1
→(TYPE_INDEX>4)/DONE_PLANE
⍝ THE FIRST REPLY OF THE TYPE WILL BE EMITTED ANYWHERE FROM 0 TO X+Y
```

```
⍝ AFTER START_TIME, SINCE THE PERIODIC EMISSION OF REPLIES IS NOT
⍝ SYNCHRONIZED WITH THE START OF THE SIMULATION INTERVAL
REPLYTIME←START_TIME+?INTERVALS[TYPE_INDEX;1]+?INTERVALS[TYPE_INDEX;2]
REPLYLENGTH←INTERVALS[TYPE_INDEX;3]
⍝ IF THIS TIME IS BEYOND THE END OF THE SIMULATION INTERVAL, WE'RE DONE
→(REPLYTIME>MAX_TIME)/DONE_TYPE
⍝ OTHERWISE, ADJUST FOR RANGE DELAY TO RECEIVER AND APPEND TO TIMES
TIMES←TIMES,(REPLYTIME+RANGE),REPLYLENGTH
⍝ SUBSEQUENT REPLIES AT X +/- Y SPACING
NEXT_REPLY:
REPLYTIME←REPLYTIME+INTERVALS[TYPE_INDEX;1]+?INTERVALS[TYPE_INDEX;2]
REPLYLENGTH←INTERVALS[TYPE_INDEX;3]
⍝ IF THIS TIME IS BEYOND THE END OF THE SIMULATION INTERVAL, WE'RE DONE
→(REPLYTIME>MAX_TIME)/DONE_TYPE
⍝ OTHERWISE, ADJUST FOR RANGE DELAY TO RECEIVER AND APPEND TO TIMES
TIMES←TIMES,(REPLYTIME+RANGE),REPLYLENGTH
→NEXT_REPLY
⍝
DONE_TYPE:
→TYPE_LOOP
⍝
DONE_PLANE:
TIMES← 0 1 ↓TIMES ⍝ GET RID OF THE INITIAL '2 1⍴0'
TS_ARRIVAL_TIMES←TS_ARRIVAL_TIMES,TIMES ⍝ APPEND DATA FOR THIS PLANE
REPLIES←¯1↑⍴TIMES ⍝ NUMBER OF REPLIES FROM THIS PLANE
MAX←MAX⌈REPLIES
MIN←MIN⌊REPLIES
→PLANE_LOOP
⍝
END:
TS_ARRIVAL_TIMES← 0 1 ↓TS_ARRIVAL_TIMES ⍝ GET RID OF THE INITIAL '2 1⍴0'
AVG←(¯1↑⍴TS_ARRIVAL_TIMES)÷NUM_PLANES ⍝ AVERAGE # OF REPLIES/PLANE

∇

∇ TS_INTERFERENCE;REPLY;SQUIT;NEXT_INDEX;REPLY_VEC;TIMES;SQUIT_HEAD;SQUIT_TA
    IL;LEAD_REPLY;NEXT_TIME;END_OF_LEAD_REPLY;START_OF_NEXT_REPLY;COUNT;FIN
    ISH;REPLY_LENGTHS;NEXT_LENGTH
⍝ COMPUTE THE PROBABILITY OF A SQUITTER INTERFERING WITH THE REPLY
⍝ TIME SEQUENCE CONTAINED IN TS_ARRIVAL_TIMES OR TS_ARRIVAL_TIMES
⍝ AND RC_ARRIVAL_TIMES.
⍝
⍝ E. RINGEL  3/94
⍝
⍝ THE IDEA HERE IS TO TIME ORDER THE ARRIVAL TIMES, THEN MOVE A
⍝ SLIDING WINDOW OF LENGTH = SQUITTER REPLY (120 USEC) THROUGH
⍝ THE TIMES, KEEPING TRACK OF HOW MANY REPLIES ARE IN THE WINDOW
⍝ AND HOW FAR WE HAVE MOVED IT.  PROBABILITIES[N] IS HOW MANY
⍝ RU OF TIME THE MOVING WINDOW CONTAINED N REPLIES.  WE MOVE THE
⍝ WINDOW FROM WHERE WE ARE NOW UNTIL THE NEXT EVENT THAT CHANGES
⍝ THE NUMBER OF REPLIES IN THE WINDOW, EITHER THE LEADING EDGE OF THE
⍝ WINDOW HITS THE NEXT REPLY START TIME OR THE TRAILING EDGE OF THE
⍝ WINDOW PASSES THE END TIME OF THE FIRST REPLY IN THE WINDOW.  AT
⍝ THAT POINT, WE LOOK AT HOW MANY RU WE JUST MOVED AND ADD THAT MUCH
⍝ TIME TO PROBABILITIES[N] WHERE N IS THE NUMBER OF REPLIES IN THE
⍝ WINDOW.  THEN WE EITHER DROP THE FIRST REPLY IN THE WINDOW OR ADD
⍝ THE NEXT REPLY TO THE WINDOW, DEPENDING ON WHICH EDGE OF THE WINDOW
```

```
⍝ HIT A REPLY EVENT.  NOW REPEAT, UNTIL WE HIT THE LAST REPLY.
⍝ THEN NORMALIZE PROBABILITIES BY DIVIDING BY THE TOTAL TIME PERIOD
⍝ BETWEEN EARLIEST AND LATEST REPLIES.
⍝
⍝ PROBABILITIES HOLDS THE TIMES WE HIT EACH NUMBER OF REPLIES
⍝ I PROBABLY MADE IT TOO LONG, BUT BETTER SAFE THAN SORRY
' '
'   RUNNING ',('TCAS/SQUIT' 'MODE S')[1+TS_SWITCH],' PROBABILITY CALCULATI
  ON'
' '
PROBABILITIES←0,(20⌈NUM_PLANES)ρ0
SQUIT←LONG_REPLY
TIMES←TS_ARRIVAL_TIMES, 2 2 ρSTART_TIME,MAX_TIME, 0 0
⍎(TS_SWITCH=1)/'TIMES←TIMES,RC_ARRIVAL_TIMES'
TIMES←TIMES[;⍋TIMES[1;]] ⍝ SORT THE TIMES AND REPLY LENGTHS
REPLY_LENGTHS←TIMES[2;] ⍝ SPLIT REPLY LENGTHS AND TIMES INTO
TIMES←TIMES[1;] ⍝         TWO SEPARATE VECTORS
FINISH←ρTIMES
⍝ TO GET STARTED, I NEED THE FIRST WINDOW'S WORTH OF TIMES
NEXT_INDEX←1
LL:
⍎(SQUIT>TIMES[NEXT_INDEX+1]-1↑TIMES)/'NEXT_INDEX←NEXT_INDEX+1⋄→LL'

⍝ REPLY_VEC HOLDS THE ENDING TIMES OF REPLIES IN THE WINDOW
REPLY_VEC←(NEXT_INDEX↑REPLY_LENGTHS)+NEXT_INDEX↑TIMES
⍝ SQUIT_HEAD IS THE START TIME OF THE SQUITTER WHICH IS THE TRAILING
⍝ EDGE OF OUR SLIDING WINDOW
SQUIT_HEAD←(1↑REPLY_VEC)-1↑REPLY_LENGTHS
⍝ INITIALIZE SQUIT_HEAD TO START TIME OF FIRST REPLY
⍝ SQUIT_TAIL IS THE END TIME OF THE SQUITTER WHICH IS THE LEADING EDGE OF
⍝ THE SLIDING WINDOW
SQUIT_TAIL←SQUIT_HEAD+SQUIT
⍝ LEAD_REPLY AND NEXT_TIME ARE THE REPLY EVENT TIMES FOR THE TRAILING
⍝ AND LEADING EDGES OF THE WINDOW, RESPECTIVELY.
NEXT_INDEX←NEXT_INDEX+1
LEAD_REPLY←1↑REPLY_VEC
NEXT_TIME←TIMES[NEXT_INDEX]
NEXT_LENGTH←REPLY_LENGTHS[NEXT_INDEX]

⍝ NOW ALL THE INITIALIZATION AND SETUP IS DONE, LET'S START
⍝ THAT WINDOW SLIDING!

LOOP:
⍝ TIME FOR TRAILING EDGE TO PASS THE FIRST REPLY IN THE WINDOW
END_OF_LEAD_REPLY←LEAD_REPLY-SQUIT_HEAD
⍝ TIME FOR LEADING EDGE TO HIT THE NEXT REPLY NOT YET IN THE WINDOW
START_OF_NEXT_REPLY←NEXT_TIME-SQUIT_TAIL
⍝ MOVE THE WINDOW BY THE SMALLER OF THESE TWO TIMES
SQUIT_HEAD←SQUIT_HEAD+END_OF_LEAD_REPLY⌊START_OF_NEXT_REPLY
SQUIT_TAIL←SQUIT_HEAD+SQUIT
⍝ NOW LET'S SEE WHICH ONE OF THESE THINGS HAPPENED FIRST

→(END_OF_LEAD_REPLY≥START_OF_NEXT_REPLY)/ENDCASE
⍝ WE GET HERE IF THE TRAILING EDGE PASSED THE FIRST REPLY
⍝ FIRST, UPDATE THE PROBABILITY VECTOR. WE HAVE TO ADD 1 TO THE INDEX
⍝ BECAUSE I AM NOT USING ZERO-BASED INDEXING, SO [1] HOLDS P(0),
⍝ [2] HOLDS P(1), ETC.
```

```
PROBABILITIES[1+⍴REPLY_VEC]←PROBABILITIES[1+⍴REPLY_VEC]+END_OF_LEAD_REPLY
⍝ DROP THE REPLY WE JUST PASSED
REPLY_VEC←1↓REPLY_VEC
⍝ LEAD_REPLY IS NOW UPDATED TO BE THE END TIME OF THE NEW FIRST REPLY IN
⍝ REPLY_VEC, UNLESS REPLY_VEC IS NOW EMPTY, IN WHICH CASE IT IS THE END
⍝ TIME OF THE NEXT UPCOMING REPLY
LEAD_REPLY←NEXT_TIME+NEXT_LENGTH
⍎(0≠⍴REPLY_VEC)/'LEAD_REPLY←1↑REPLY_VEC'
→ENDLOOP

ENDCASE:
⍝ WE GET HERE IF THE LEADING EDGE HIT THE NEXT REPLY, OR IF BOTH
⍝ EVENTS HAPPENED SIMULTANEOUSLY
⍝ FIRST, UPDATE THE PROBABILITY VECTOR
PROBABILITIES[1+⍴REPLY_VEC]←PROBABILITIES[1+⍴REPLY_VEC]+START_OF_NEXT_REPL
   Y
⍝ NOW ADD THE REPLY WE JUST HIT TO REPLY_VEC
REPLY_VEC←REPLY_VEC,NEXT_TIME+NEXT_LENGTH
⍝ NEXT_INDEX IS UPDATED TO BE THE NEXT UPCOMING REPLY TIME
NEXT_INDEX←1+NEXT_INDEX
⍝ IF WE HAVE USED ALL THE REPLY TIMES, WE'RE DONE
→(NEXT_INDEX>FINISH)/DONE
NEXT_TIME←TIMES[NEXT_INDEX]
NEXT_LENGTH←REPLY_LENGTHS[NEXT_INDEX]
⍝ WE CAN JUMP TO THE END UNLESS THE LEADING AND TRAILING EDGES HIT
⍝ THEIR EVENTS SIMULTANEOUSLY

→(END_OF_LEAD_REPLY≠START_OF_NEXT_REPLY)/ENDLOOP
⍝ IF THE WINDOW EDGES HIT EVENTS SIMULTANEOUSLY, THEN THE LEAD REPLY HAS
⍝ TO BE DROPPED AND UPDATED.  WE ALREADY UPDATED THE NEXT REPLY
 REPLY_VEC←1↓REPLY_VEC
 LEAD_REPLY←NEXT_TIME+NEXT_LENGTH
 ⍎(0≠⍴REPLY_VEC)/'LEAD_REPLY←1↑REPLY_VEC'

ENDLOOP:
⍝ TIME TO GO BACK UP AND SLIDE THAT WINDOW AGAIN
 →LOOP

DONE:
⍝ PROBABILITIES IS A VECTOR OF TIMES, LET'S DIVIDE BY TOTAL TIME
⍝ TO GET PROBABILITIES
 PROBABILITIES←PROBABILITIES÷RUN_TIME
∇

∇ CB_INTERFERENCE;REPLY;SQUIT;NEXT_INDEX;REPLY_VEC;TIMES;SQUIT_HEAD;SQUIT_TA
   IL;LEAD_REPLY;NEXT_TIME;END_OF_LEAD_REPLY;START_OF_NEXT_REPLY;COUNT;FIN
   ISH;REPLY_LENGTHS;NEXT_LENGTH;MODES;ATCRBS;LENGTH_VEC
⍝ COMPUTE THE PROBABILITY OF A SQUITTER INTERFERING WITH THE REPLY
⍝ TIME SEQUENCE CONTAINED IN TS_ARRIVAL_TIMES OR TS_ARRIVAL_TIMES
```

```
⍝ AND RC_ARRIVAL_TIMES.
⍝
⍝ E. RINGEL  3/94
⍝
⍝ THE IDEA HERE IS TO TIME ORDER THE ARRIVAL TIMES, THEN MOVE A
⍝ SLIDING WINDOW OF LENGTH = SQUITTER REPLY (120 USEC) THROUGH
⍝ THE TIMES, KEEPING TRACK OF HOW MANY REPLIES ARE IN THE WINDOW
⍝ AND HOW FAR WE HAVE MOVED IT.  SUCCESS_PROB IS THE RU OF TIME THAT THE
⍝ MOVING WINDOW CONTAINED 0 MODE S AND 0 OR 1 ATCRBS REPLIES. WE MOVE THE
⍝ WINDOW FROM WHERE WE ARE NOW UNTIL THE NEXT EVENT THAT CHANGES
⍝ THE NUMBER OF REPLIES IN THE WINDOW, EITHER THE LEADING EDGE OF THE
⍝ WINDOW HITS THE NEXT REPLY START TIME OR THE TRAILING EDGE OF THE
⍝ WINDOW PASSES THE END TIME OF THE FIRST REPLY IN THE WINDOW.  AT
⍝ THAT POINT, WE LOOK AT HOW MANY RU WE JUST MOVED AND HOW MANY OF WHAT
⍝ TYPE OF REPLIES ARE IN THE WINDOW AND UPDATE SUCCESS_PROB ACCORDINGLY.
⍝ THEN WE EITHER DROP THE FIRST REPLY IN THE WINDOW OR ADD
⍝ THE NEXT REPLY TO THE WINDOW, DEPENDING ON WHICH EDGE OF THE WINDOW
⍝ HIT A REPLY EVENT.  NOW REPEAT, UNTIL WE HIT THE LAST REPLY.
⍝ THEN NORMALIZE SUCCESS_PROB BY DIVIDING BY THE TOTAL TIME PERIOD
⍝ BETWEEN EARLIEST AND LATEST REPLIES.
⍝
' '
'     RUNNING OVERALL INTERFERENCE PROBABILITY CALCULATION'
' '
SUCCESS_PROB←0
MODES←0 ⍝ THE NUMBER OF MODE S AND ATCRBS REPLIES CURRENTLY IN
ATCRBS←0 ⍝ THE SLIDING WINDOW, INITIALIZED TO 0
SQUIT←LONG_REPLY
⍝ ADD AC ARRIVAL TIMES TO TIMES WITH ATCRBS REPLY LENGTH
TIMES←AC_ARRIVAL_TIMES
REPLY_LENGTHS←(⍴AC_ARRIVAL_TIMES)⍴ATCRBS_REPLY
⍝ ADD TCAS/SQUITTER AND ROLLCALL ARRIVAL TIMES TO TIMES
TIMES←TIMES,TS_ARRIVAL_TIMES[1;]
REPLY_LENGTHS←REPLY_LENGTHS,TS_ARRIVAL_TIMES[2;]
TIMES←TIMES,RC_ARRIVAL_TIMES[1;],START_TIME,MAX_TIME
REPLY_LENGTHS←REPLY_LENGTHS,RC_ARRIVAL_TIMES[2;], 0 0
⍝ SORT THE TIMES AND REPLY LENGTHS
REPLY_LENGTHS←REPLY_LENGTHS[⍋TIMES]
TIMES←TIMES[⍋TIMES]
FINISH←⍴TIMES
⍝ TO GET STARTED, I NEED THE FIRST WINDOW'S WORTH OF TIMES
NEXT_INDEX←1
LL:
⍎(SQUIT>TIMES[NEXT_INDEX+1]-1↑TIMES)/'NEXT_INDEX←NEXT_INDEX+1⋄→LL'

⍝ REPLY_VEC HOLDS THE ENDING TIMES OF REPLIES IN THE WINDOW
REPLY_VEC←(NEXT_INDEX↑REPLY_LENGTHS)+NEXT_INDEX↑TIMES
⍝ LENGTH_VEC HOLDS THE LENGTHS OF REPLIES IN THE WINDOW
LENGTH_VEC←NEXT_INDEX↑REPLY_LENGTHS
⍝ SQUIT_HEAD IS THE START TIME OF THE SQUITTER WHICH IS THE TRAILING
⍝ EDGE OF OUR SLIDING WINDOW
SQUIT_HEAD←(1↑REPLY_VEC)-1↑REPLY_LENGTHS
⍝ INITIALIZE SQUIT_HEAD TO START TIME OF FIRST REPLY
⍝ SQUIT_TAIL IS THE END TIME OF THE SQUITTER WHICH IS THE LEADING EDGE OF
⍝ THE SLIDING WINDOW
SQUIT_TAIL←SQUIT_HEAD+SQUIT
⍝ LEAD_REPLY AND NEXT_TIME ARE THE REPLY EVENT TIMES FOR THE TRAILING
```

```
⍝ AND LEADING EDGES OF THE WINDOW, RESPECTIVELY.
NEXT_INDEX←NEXT_INDEX+1
LEAD_REPLY←1↑REPLY_VEC
NEXT_TIME←TIMES[NEXT_INDEX]
NEXT_LENGTH←REPLY_LENGTHS[NEXT_INDEX]
ATCRBS←+/ATCRBS_REPLY=LENGTH_VEC ⍝ HOW MANY ATCRBS REPLIES IN WINDOW
MODES←+/ATCRBS_REPLY<LENGTH_VEC ⍝ HOW MANY MODE S REPLIES IN WINDOW

⍝ NOW ALL THE INITIALIZATION AND SETUP IS DONE, LET'S START
⍝ THAT WINDOW SLIDING!

LOOP:
⍝ TIME FOR TRAILING EDGE TO PASS THE FIRST REPLY IN THE WINDOW
END_OF_LEAD_REPLY←LEAD_REPLY-SQUIT_HEAD
⍝ TIME FOR LEADING EDGE TO HIT THE NEXT REPLY NOT YET IN THE WINDOW
START_OF_NEXT_REPLY←NEXT_TIME-SQUIT_TAIL
⍝ MOVE THE WINDOW BY THE SMALLER OF THESE TWO TIMES
SQUIT_HEAD←SQUIT_HEAD+END_OF_LEAD_REPLY⌊START_OF_NEXT_REPLY
SQUIT_TAIL←SQUIT_HEAD+SQUIT
⍝ NOW LET'S SEE WHICH ONE OF THESE THINGS HAPPENED FIRST

→(END_OF_LEAD_REPLY≥START_OF_NEXT_REPLY)/ENDCASE
⍝ WE GET HERE IF THE TRAILING EDGE PASSED THE FIRST REPLY
⍝ FIRST, UPDATE THE SUCCESS_PROB VECTOR.
⍎((MODES=0)∧ATCRBS≤1)/'SUCCESS_PROB←SUCCESS_PROB+END_OF_LEAD_REPLY'
⍝ DROP THE REPLY WE JUST PASSED
REPLY_VEC←1↓REPLY_VEC
⍎(ATCRBS_REPLY=1↑LENGTH_VEC)/'ATCRBS←ATCRBS-1'
⍎(ATCRBS_REPLY<1↑LENGTH_VEC)/'MODES←MODES-1'
LENGTH_VEC←1↓LENGTH_VEC

⍝ LEAD_REPLY IS NOW UPDATED TO BE THE END TIME OF THE NEW FIRST REPLY IN
⍝ REPLY_VEC, UNLESS REPLY_VEC IS NOW EMPTY, IN WHICH CASE IT IS THE END
⍝ TIME OF THE NEXT UPCOMING REPLY
LEAD_REPLY←NEXT_TIME+NEXT_LENGTH
⍎(0≠ρREPLY_VEC)/'LEAD_REPLY←1↑REPLY_VEC'
→ENDLOOP

ENDCASE:
⍝ WE GET HERE IF THE LEADING EDGE HIT THE NEXT REPLY, OR IF BOTH
⍝ EVENTS HAPPENED SIMULTANEOUSLY
⍝ FIRST, UPDATE THE PROBABILITY VECTOR
⍎((MODES=0)∧ATCRBS≤1)/'SUCCESS_PROB←SUCCESS_PROB+START_OF_NEXT_REPLY'
⍝ NOW ADD THE REPLY WE JUST HIT TO REPLY_VEC
REPLY_VEC←REPLY_VEC,NEXT_TIME+NEXT_LENGTH
LENGTH_VEC←LENGTH_VEC,NEXT_LENGTH
⍎(ATCRBS_REPLY=NEXT_LENGTH)/'ATCRBS←ATCRBS+1'
⍎(ATCRBS_REPLY<NEXT_LENGTH)/'MODES←MODES+1'
⍝ NEXT_INDEX IS UPDATED TO BE THE NEXT UPCOMING REPLY TIME
NEXT_INDEX←1+NEXT_INDEX
⍝ IF WE HAVE USED ALL THE REPLY TIMES, WE'RE DONE
→(NEXT_INDEX>FINISH)/DONE
NEXT_TIME←TIMES[NEXT_INDEX]
NEXT_LENGTH←REPLY_LENGTHS[NEXT_INDEX]
```

```
⍝ WE CAN JUMP TO THE END UNLESS THE LEADING AND TRAILING EDGES HIT
⍝ THEIR EVENTS SIMULTANEOUSLY

 →(END_OF_LEAD_REPLY≠START_OF_NEXT_REPLY)/ENDLOOP
⍝ IF THE WINDOW EDGES HIT EVENTS SIMULTANEOUSLY, THEN THE LEAD REPLY HAS
⍝ TO BE DROPPED AND UPDATED.  WE ALREADY UPDATED THE NEXT REPLY
 REPLY_VEC←1↓REPLY_VEC
 ⍎(ATCRBS_REPLY=1↑LENGTH_VEC)/'ATCRBS←ATCRBS-1'
 ⍎(ATCRBS_REPLY<1↑LENGTH_VEC)/'MODES←MODES-1'
 LENGTH_VEC←1↓LENGTH_VEC
 LEAD_REPLY←NEXT_TIME+NEXT_LENGTH
 ⍎(0≠⍴REPLY_VEC)/'LEAD_REPLY←1↑REPLY_VEC'

ENDLOOP:
⍝ TIME TO GO BACK UP AND SLIDE THAT WINDOW AGAIN
 →LOOP

DONE:
⍝ SUCCESS_PROB IS A TIME, LET'S DIVIDE BY TOTAL TIME
⍝ TO GET PROBABILITY
 SUCCESS_PROB←SUCCESS_PROB÷RUN_TIME
∇

∇ Z←SUMMARY INPUT;LAMBDA;PLANES;COLUMN_HEADS;ALLCALLS;MS_SHORTS;MS_LONGS;PRO
    BS;POISSON
⍝
⍝ TAKE AS INPUT A NESTED ARRAY LIKE INTERFERE PRODUCED BY RUNNING RUN_MODE
    L
⍝ PRODUCE A SUMMARY SHOWING INTERFERENCE PROBABILITIES BY NUMBER OF PLANES
⍝ FOR ATRCBS, MODE S, AND ALL REPLIES FROM THE MODEL.  ALSO PROVIDE POISSO
    N
⍝ PROBABILITIES FOR COMPARISON.
⍝
⍝  E. RINGEL  3/94
⍝
⍝ STEP 1 - INITIALIZE VARIABLES
ALLCALLS←(⊃INPUT[1])[1] ⍝ AVERAGE ALLCALL REPLIES IS THE FIRST ELEMENT OF
⍝                         THE FIRST ELEMENT OF THE NESTED INPUT ARRAY
PLANES←(⊃1↓INPUT)[;2;2] ⍝ NUMBER OF PLANES FOR EACH RUN WITHIN THE INPUT
PROBS←(⊃1↓INPUT)[;10;2 3 4 5 6] ⍝ PROBABILITIES FOR EACH RUN WITHIN THE IN
    PUT
MS_SHORTS←8 ⍝ 8 OF THE 14.2 MODE S REPLIES PER PLANE ARE SHORT REPLIES
MS_LONGS←6.2 ⍝ 6.2 OF THE 14.2 MODE S REPLIES PER PLANE ARE LONG REPLIES
COLUMN_HEADS←1 9⍴'Planes' 'ATCRBS' 'RollCall' 'TCAS/Squit' 'Mode S' 'Overa
    ll' 'Poisson ATCRBS' 'Poisson Mode S' 'Poisson Overall'
POISSON←((⍴PLANES),3)⍴0 ⍝ INITIALIZE POISSON PROBABILITES ARRAY
⍝
```

```
⍝ STEP 2 - COMPUTE POISSON PROBABILITIES
⍝ FOR EACH PROBABILITY HERE, LAMDA IS COMPUTED AS:
⍝  (REPLY LENGTH + SQUITTER LENGTH IN USEC)×(REPLIES PER USEC)×(1-REPLIES
   PER USEC)
⍝  WHERE REPLIES PER USEC = PLANES × REPLIES PER SEC PER PLANE × 1E¯6 SEC/
   USEC
⍝
⍝ STEP 2A  ATCRBS
LAMBDA←140×PLANES×ALLCALLS×1E¯6×1-PLANES×ALLCALLS×1E¯6
⍝ 140 = 20 USEC + 120 USEC
POISSON[;1]←(1+LAMBDA)×*-LAMBDA ⍝ (1+L) EXP(¯L) IS POISSON PROB OF 0 OR 1
⍝                                 INTERFERING REPLY [ONE INTERFERING ATCR
   BS
⍝                                 REPLY IS OK]
⍝
⍝ STEP 2B MODE S SHORT REPLIES
LAMBDA←184×PLANES×MS_SHORTS×1E¯6×1-PLANES×MS_SHORTS×1E¯6
⍝ 184 = 64 USEC + 120 USEC
POISSON[;2]←*-LAMBDA ⍝ EXP(¯L) IS POISSON PROB OF 0 INTERFERING REPLIES
⍝
⍝ STEP 2C MODE S LONG REPLIES
LAMBDA←240×PLANES×MS_LONGS×1E¯6×1-PLANES×MS_LONGS×1E¯6
⍝ 240 = 120 USEC + 120 USEC
POISSON[;2]←POISSON[;2]×*-LAMBDA ⍝ EXP(¯L) IS POISSON PROB OF 0 INTERFERIN
   G
⍝ REPLIES.  MULTIPLY BY THE SHORT REPLY PROBABILITIES ALREADY IN POISSON[;
   2]
⍝ TO GET {ASSUMING INDEPENDENCE} THE TOTAL MODE S REPLY PROBABILITY
⍝
⍝ STEP 2D OVERALL PROBABILITY
POISSON[;3]←POISSON[;1]×POISSON[;2] ⍝ ASSUMING INDEPENDENCE, OVERALL =
⍝                                     ATCRBS × MODE S
⍝
⍝
⍝ STEP 3 - ASSEMBLE OUTPUT ARRAY
Z←((⍴PLANES),1)⍴PLANES ⍝ MAKE PLANES THE FIRST COLUMN
Z←Z,PROBS,POISSON ⍝ ADD SIMULATION AND POISSON PROBABILITIES
Z←COLUMN_HEADS⍪Z ⍝ ADD COLUMN HEADINGS
∇
```

The model works in the ρ–θ coordinate system used by the Mode S system. The model first computes multiple sets of polar coordinates for each plane: the coordinates relative to the receiving antenna, and the coordinate relative to each interrogator. The coordinate conversion equations of the FAA Mode S specification, FAA-E-2716 section 3.4.8.8.5 are used to do the coordinate transforms, with β, m, and s taken as 0 for simplicity, since the interrogator starting azimuths are random anyway. The converted range is used along with the original range to compute ρ as described below, and is stored along with the converted θ. Again, this is being done for each plane, for each sensor.

ρ is the time delay from an interrogation by the remote sensor until the reply arrives at the receiving antenna (not back at the remote sensor). For an ATCRBS interrogator, ρ equals the distance from the remote sensor to the plane, plus the ATCRBS turnaround delay (48 RU), plus the distance from the plane to the receiving antenna. For an ATCRBS/Mode S interrogator, a value of ρ using the Mode S turnaround delay (2124 RU) is computed as above to determine the arrival time of the reply at the receiving antenna, as well as a round-trip time back to the interrogator for use in creating the RollCall schedules.

A vector of times is maintained for each interrogator, giving the time in RUs(range units 1/16 of a microsecond); of the start of the next AllCall period. The ATCRBS reply simulation operates by finding the next upcoming event in the vector of times. Current time is set to that event time. Using the starting boresight azimuth and antenna rotation rate, the current boresight azimuth of the interrogator is calculated. Using the antenna beamwidth and the local polar coordinates of the planes, the set of planes in the beamwidth of that interrogator is determined. Using ρ as defined above, the times of arrival of the ATCRBS replies for the planes in the beam at the receiving antenna are computed and recorded, along with the plane number and interrogator number. The value in the vector of times is then updated using the frame information to the start of the next AllCall period, and the process begins again. This continues until the current time surpasses the end of the simulation interval.

The process for RollCall replies is similar, except that in place of a single AllCall interrogation, the Mode S scheduling algorithm is actually implemented in a slightly simplified form to produce the proper pattern of interrogations and replies within the Mode S period. The simplification is that each schedule has only one cycle; that is, even if transmissions would start to overlap the replies, the schedule is not broken up into a second cycle. Experience from Lost Channel Time simulation work, confirmed in this model, is that even at heavy target loads, 90% or more of schedules are in fact single cycle anyway, so it was not worth the added complication of modeling this level of detail. Another simplification is that only short and long standard transactions are being scheduled; ELM message traffic is not modeled. The number of messages sent to each plane in each period is determined randomly in such a way that the expected value yields the desired average message loading per plane.

For TCAS and squitter replies, the model distributes TCAS and squitter Mode S replies over the simulation interval. TCAS replies are short replies made every 0.2+/–0.04 seconds. There are 3 types of squitter:

short squitter every 1.0+/–0.2 seconds (type: TCAS)

long squitter every 0.5+/–0.1 seconds (type: ADS)

long squitter every 5.0+/–1.0 seconds (type: ID)

The model will randomly assign TCAS and squitter replies meeting these constraints to each plane over the simulation interval.

When a simulation run is completed, the reply arrival time data is used to compute an estimate of the probability of an ADS squitter arriving at the receiving antenna being interfered with by a reply. The overall probability of interference from all replies is calculated, as well as probabilities of interference from each class of replies (ATCRBS, RollCall, and TCAS/squitter), but the method is the same in each case. The idea here is to time order the reply arrival times, then move a sliding window of length=squitter reply (120 μsec) through the times, keeping track of how many replies are in the window and how far we have moved it. Success_prob is the RU of time that the moving window contained 0 Mode S and 0 or 1 ATCRBS replies. We move the window from where we are now until the next event that changes the number of replies in the window; either the leading edge of the window hits the next reply start time or the trailing edge of the window passes the end time of the first reply in the window. At that point, we look at how many RU we just moved and how many of what type of replies were in the window and update success_prob accordingly. Then we either drop the first reply in the window or add the next reply to the window, depending on which edge of the window hit a reply event. Now repeat, until we hit the last reply. Then normalize success_prob by dividing by the total time period between earliest and latest replies, to obtain a probability.

Because the number of replies per plane is dependent on interrogator and plane location, as well as interrogator starting azimuth, all of which are random elements, we can't predict if a given run will yield a desired number of average messages per plane. It is necessary to make multiple runs with different starting random seeds until a data point for a given message workload is obtained. A control program is used to iteratively call the various component programs of the model, see FIG. 1. To collect data for various numbers of planes for a given workload, an initial choice of a number of ATCRBS and Mode S interrogators is made, based on experience with trial runs about how many interrogators yield what average message rates. The control program starts with a population of 5 planes. The ATCRBS model is run repeatedly (randomly generating a different spatial distribution of interrogators and planes each time) until a run is obtained with an average message rate within 15% of the desired rate. The Mode S model is then run repeatedly (using the interrogator and plane distribution of the last ATCRBS run) until a run is obtained with an average message rate within 17% of the desired rate. If this doesn't happen in a reasonable number of trials, go back to the ATCRBS step and start over. Otherwise, run the TCAS/squitter model with the same population of planes and interrogators. Compute all the probabilities and store the estimates and other statistics. Then increment the number of planes by 5 and start again.

The statistics which are stored on each pass are grouped as a matrix:

| Statistics for each model pass (pass = a given number of planes) | AllCall | RollCall | TCAS/ squitter | Total Mode S | Overall |
| --- | --- | --- | --- | --- | --- |
| number of planes | | | same for all | | |
| number of sensors | ATCRBS interrogators only | Mode S interrogators only | | N/A | |
| number of replies | Total AllCall | Total RollCall | Total TCAS/ squit | RollCall + TCAS/ Squit | All |
| average replies per plane | ATCRBS | RollCall | TCAS/ squit | RollCall + TCAS/ Squit | All |
| minimum replies per plane | | | | | N/A |
| maximum replies per plane | | | | | N/A |
| probability of a long squitter interfering with 0 replies P[0] | | | | | N/A |
| probability of a long squitter interfering with 1 reply P[1] | | | | | N/A |
| overall probability of a long squitter not being interfered with | P[0] + P[1] | P[0] | P[0] | P[0] | P[0 Mode S and 0 or 1 ATCRBS] |
| value of random seed at start of the model | seed for final ATCRBS run | seed for final RollCall run | seed for TCAS/ squit run | N/A | |

The model is applicable to a wide variety of combinations of aircraft, message workload, interrogators, and receiving antenna, because it allows the user to specify values for many aspects of the problem. The user-adjustable input parameters are listed below, along with the values that were assigned to them for the first model runs.

| | |
| --- | --- |
| max_plane_range = 4943 | planes are uniformly distributed in range from 0 to 4943 RU = 50 nmi |
| max_remote_range = 2 × 4943 | interrogators are uniformly distributed in range from 0 to 100 nmi |
| rot_rate = max_au ÷ 4.8 × 1600000 | 4.8 second antenna rotation rate in au per RU |
| half_beam = max_au × 1.8 ÷ 360 | 1.8° half antenna beamwidth in au |
| max_time = 16000000 | model run time 16000000 RU = 1 second |
| avg_freq = 128000 ÷ 3 | midpoint of sensor allcall interrogation repetition times in RU; used by ATCRBS only interrogators (3 times the nominal Mode S rate) |
| freq_rng = 64000 ÷ 3 | range of variation in sensor allcall nit times centered on avg_freq; used by ATCRBS only interrogators (3 times the nominal Mode S rate) |
| collocate = 1 | 1 forces remote sensor #1 to be collocated with receiver; simulates collocated Mode S terminal system |
| num_atcrbs = {various} | number of remote ATCRBS interrogators. the model takes the first num_atcrbs of the remote interrogators and uses them as ATCRBS all call interrogators. |
| num_mode_s = {various} | number of remote mode s interrogators. the model takes the first num_mode_s of the remote interrogators and uses them as mode s roll call interrogators. The effect of the above two parameters is that there are num_atcrbs ATCRBS interrogators, num_mode_s of which are also ModeS interrogators (using the Mode S frame pattern) and the remaining num_atcrbs - num_mode_s of which are ATCRBS only interrogators using the 3 times faster ATCRBS only frame pattern. |
| max_scheds_per_period = 8 | maximum number of schedules per RollCall period |
| comm_done_prob = −0.25 | used in main_rc to determine the probability that a plane has no more comm this period. set to −1+q where q is the geometric |

-continued

| | |
|---|---|
| | probability of having a comm for the upcoming schedule and p = 1−q is the probability that there is no more comm for the plane this period. then the expected number of schedules for the plane in the period is (1/p) − 1. set this equal to the desired number of comms per plane per period and solve for p. then comm_done_prob = −p. e.g., comm done_prob = −.25 for expected value if 3 comms/plane/period |
| long_reply = 1920 | length of long mode s reply = 1920 ru (120 μsec) |
| short_reply = 1024 | length of short mode s reply = 1024 RU (64 μsec) |
| atcrbs_reply = 320 | length of ATCRBS reply = 320 RU (20 μsec) |

The Mode S Frequency Space model allows for a complete, accurate answer to the question of how many aircraft can co-exist in a given region of the sky before interference effects cause ADS-Mode S operation to fall below acceptable levels. It can provide this answer for a wide variety of user-selectable initial conditions.

In their paper, Knittel and Orlando considered reply interference effects on ADS Mode S squitter and developed estimates of the maximum number of aircraft which can be handled by an ADS ground station, as a function of ATCRBS and Mode S reply levels. These estimates were made analytically, which required several explicit and implicit assumptions to make the problem analytically tractable. This resulted in a conservative estimate of capacity, because many of these assumptions are not representative of actual Mode S system behavior.

The following is a listing of the explicit and implicit assumptions that underlie the Knittel and Orlando reply interference estimates, along with comments on why they cause conservatism in the estimate.

1. The replies arrivals are uncorrelated with one another.
2. The rate of reply arrivals is steady over time.
3. The probability of a reply arriving at any one given instant is the same as for any other instant.
4. Since the Poisson distribution is a one parameter distribution, only the total number of replies in a second is relevant, i.e. 10 plane at 150 replies/plane/sec is treated the same as 100 planes at 15 replies/plane/sec.

Unfortunately, all four of these are false for ATCRBS replies:

1. Since all aircraft receiving an allcall interrogation will reply to that interrogation, if a reply arrives at the antenna then most likely several more will be arriving shortly, i.e. the reply arrivals are correlated.
2. Simulation shows that there is considerable variation from second to second in the rate of reply arrivals.
3. Aircraft issue ATCRBS replies only in response to allcall interrogations, which are made at periodic intervals (frame pattern). The pattern of replies will thus tend to have clumps and gaps.
4. The pattern of reply arrival times is significantly different for a small number of planes with a large number of replies per plane than for a large number of planes with a small number of replies per plane. As an example, with 1500 ATCRBS replies in a second:

Squitter Interference Probabilities
One Second Interval, 1500 ATCRBS Replies

| Number of Interfering Replies | Simulation Results: 10 planes, 153 replies/plane | Simulation Results: 100 planes, 14.7 replies/plane | Poisson 1500 replies |
|---|---|---|---|
| 0 | .8154 | .8861 | .8108 |
| 1 | .1595 | .0702 | .1700 |
| 0 or 1 | .9749 | .9563 | .9808 |

The probability of interference from Mode S replies can be calculated just like ATCRBS interference, as a Poisson process.

Clearly the same types of objections will apply here as in the ATCRBS case. Their effects, however, will be less because:

(a) there are fewer Mode S messages per target.

(b) more than half of the Mode S messages [8 out of 14.2] are TCAS/squitter type transmissions which really are independent of other planes' replies and antenna interrogations.

(c) since the Mode S period occupies a much larger fraction of the frame structure than the ATCRBS period, the clumping effect of replies is less extreme, although the RollCall scheduling algorithm which deliberately clumps the replies in each cycle somewhat counteracts this.

There is still a significant difference in the simulation vs. Poisson predictions for max number of targets possible.

Probabilities can be calculated separately for ATCRBS and Mode S interference and combined as a product, i.e. it is assumed that ATCRBS and Mode S replies are independently distributed over the interval of interest.

This assumption is not true, although it turns out to be a good approximation. Mode S replies are going to be scheduled during RollCall intervals of the interrogator's frame structure, which by definition are not going to overlap the allcall intervals for that interrogator. In other words, going back to the clump and gap timeline structure of ATCRBS replies mentioned earlier, Mode S replies are more likely to occur in the gaps, maximizing their likelihood of causing interference.

The Mode S Frequency Space model avoids the drawbacks of the Poisson assumption by not making that assumption. The model instead simulates the actual patterns of interrogations and replies for a population of aircraft over a period of time.

Another key advantage of this model over the Knittel and Orlando paper's approach is the wide variety of input parameters, which allow the Mode S Frequency Space model to distinguish between cases that would return identical results from the Knittel and Orlando paper's approach.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. A method for simulating the operation of interrogators, transponders and receivers, comprising the steps of:

(a) specifying the number of reply signal(s) per transponder;

(b) setting the number of transponders to zero;

(c) incrementing the number of transponders by a fixed amount;

(d) defining the positions of the interrogators and the transponders;

(e) determining the number of transponder replies over a predetermined interval;

(f) determining whether the correct number of reply signals per interrogator has been found in step (e);

(g) using a sliding window for determining probability in the following steps;

(h) determining the probability of interference between one type of transponder reply signal and a regularly repeated transponder signal;

(i) determining the number of a second type of transponder reply signal over the predetermined interval;

(j) determining the probability of interference between the second type of transponder reply signal and the regularly repeated signal; and (k) from the results of steps (h) and (j) determining the overall probability of interference with the regularly repeated signal.

2. A method as defined in claim 1 wherein step (d) comprises randomly defining the positions of the interrogators and the transponders.

3. An apparatus for simulating the operation of interrogators, transponders and receivers, comprising:

(a) means for specifying the number of reply signal(s) per transponder;

(b) means for setting the number of transponders to zero;

(c) means for incrementing the number of transponders by a fixed amount;

(d) means for defining the positions of the interrogators and the transponders;

(e) means for determining the number of transponder replies over a predetermined interval;

(f) means for determining whether the correct number of reply signals per interrogator has been found in step (e); and (g) sliding window means for determining the probability of interference between transponder reply signals, comprising:

(1) means for determining the probability of interference between one type of transponder reply signal and a regularly repeated transponder signal;

(2) means for determining the number of a second type of transponder reply signal over the predetermined interval; and (3) means for determining the probability of interference between the second type of signal of means (2) and the regularly repeated signal of means (1).

4. An apparatus as defined in claim 3 wherein means (d) comprises means for randomly assigning the positions of the interrogators and the transponders.

* * * * *